US006507678B2

(12) United States Patent
Yahagi

(10) Patent No.: US 6,507,678 B2
(45) Date of Patent: Jan. 14, 2003

(54) APPARATUS AND METHOD FOR RETRIEVING CHARACTER STRING BASED ON CLASSIFICATION OF CHARACTER

(75) Inventor: Hironori Yahagi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/246,992

(22) Filed: Feb. 8, 1999

(65) Prior Publication Data

US 2002/0064311 A1 May 30, 2002

(30) Foreign Application Priority Data

Jun. 19, 1998 (JP) .......................................... 10-173648
Jul. 9, 1998 (JP) .......................................... 10-193833

(51) Int. Cl.$^7$ ............................ G06K 9/54; G06K 9/62; H04N 2/00; G06F 17/21; G06F 17/30
(52) U.S. Cl. ........................ 382/305; 382/151; 382/181; 382/200; 382/224; 382/225; 382/229; 382/292; 358/403; 704/10; 707/3
(58) Field of Search ................................. 382/181, 185, 382/187, 224, 225, 229, 231, 305, 151, 159, 184, 200, 289, 290, 291, 292, 295; 707/1, 3, 6, 533; 704/4, 10

(56) References Cited

U.S. PATENT DOCUMENTS

| 3,717,851 | * | 2/1973 | Cocke et al. ............... 711/220 |
| 4,903,206 | * | 2/1990 | Itoh et al. ................... 707/533 |
| 4,979,101 | * | 12/1990 | Takahashi ...................... 707/5 |
| 5,357,431 | * | 10/1994 | Nakada et al. ............... 707/531 |
| 5,388,234 | * | 2/1995 | Kanno et al. ................ 711/220 |
| 5,432,890 | * | 7/1995 | Watanabe .................... 707/519 |
| 5,655,129 | * | 8/1997 | Ito ................................ 704/10 |
| 5,721,899 | * | 2/1998 | Namba ........................... 707/3 |
| 5,799,299 | * | 8/1998 | Fujiwara ......................... 707/3 |
| 6,047,283 | * | 4/2000 | Braum ............................ 707/3 |
| 6,137,911 | * | 10/2000 | Zhilyaev ..................... 382/225 |
| 6,189,006 | * | 2/2001 | Fukushima .................... 707/6 |

OTHER PUBLICATIONS

Morita, et al. "A Fast Data Structure of Storing Multi–Attribute Relations among Words", IEEE, Jan. 1998, pp. 2791–2796.*
Aoe, et al "An Efficient Digital Search Algorithm by Using a Double–Array Structure", IEEE, 1989, pp. 1066–1077.*
Jun–ichi Aoi, "A Fast Digital Search Algorithm Using a Double–Array Structure", *The Transactions of the Institute of Electronics, Information and Communication Engineers*, Sep. 25, 1988, pp. 1592–1600.
Jun–ichi Aoi, "Serial Lecture: Key Search Strategies IV–Trie and its Applications", *Information Processing*, Feb. 15, 1993, pp. 244–251.

* cited by examiner

*Primary Examiner*—Leo Boudreau
*Assistant Examiner*—Daniel G. Mariam
(74) *Attorney, Agent, or Firm*—Staas & Halsey LLP

(57) ABSTRACT

A character string retrieval apparatus classifies a plurality of characters following a prefix of a registration character string into a plurality of groups, and registers those following characters in an array structure using a different displacement amount for each group. The character string retrieval apparatus retrieves a given character string based on the displacement amount of a group corresponding to an input character.

33 Claims, 40 Drawing Sheets

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|----|----|----|----|----|----|----|----|----|----|----|----|----|----|----|----|----|----|
| BASE | 1 | -3 | 2 | 1 | 1 | 6 | 1 | 1 | 2 | -4 | -1 | 11 | 2 | -5 | 10 | 6 | 3 | -2 | 1 | 9 | 13 | 17 | 0 | 0 | 0 | 0 | 10 |
| CHECK | 0 | 8 | 4 | 1 | 3 | 3 | 3 | 9 | 7 | 20 | 27 | 1 | 12 | 21 | 6 | 15 | 19 | 22 | 16 | 8 | 13 | 17 | 0 | 0 | 0 | 0 | 5 |

FIG. 1A
PRIOR ART

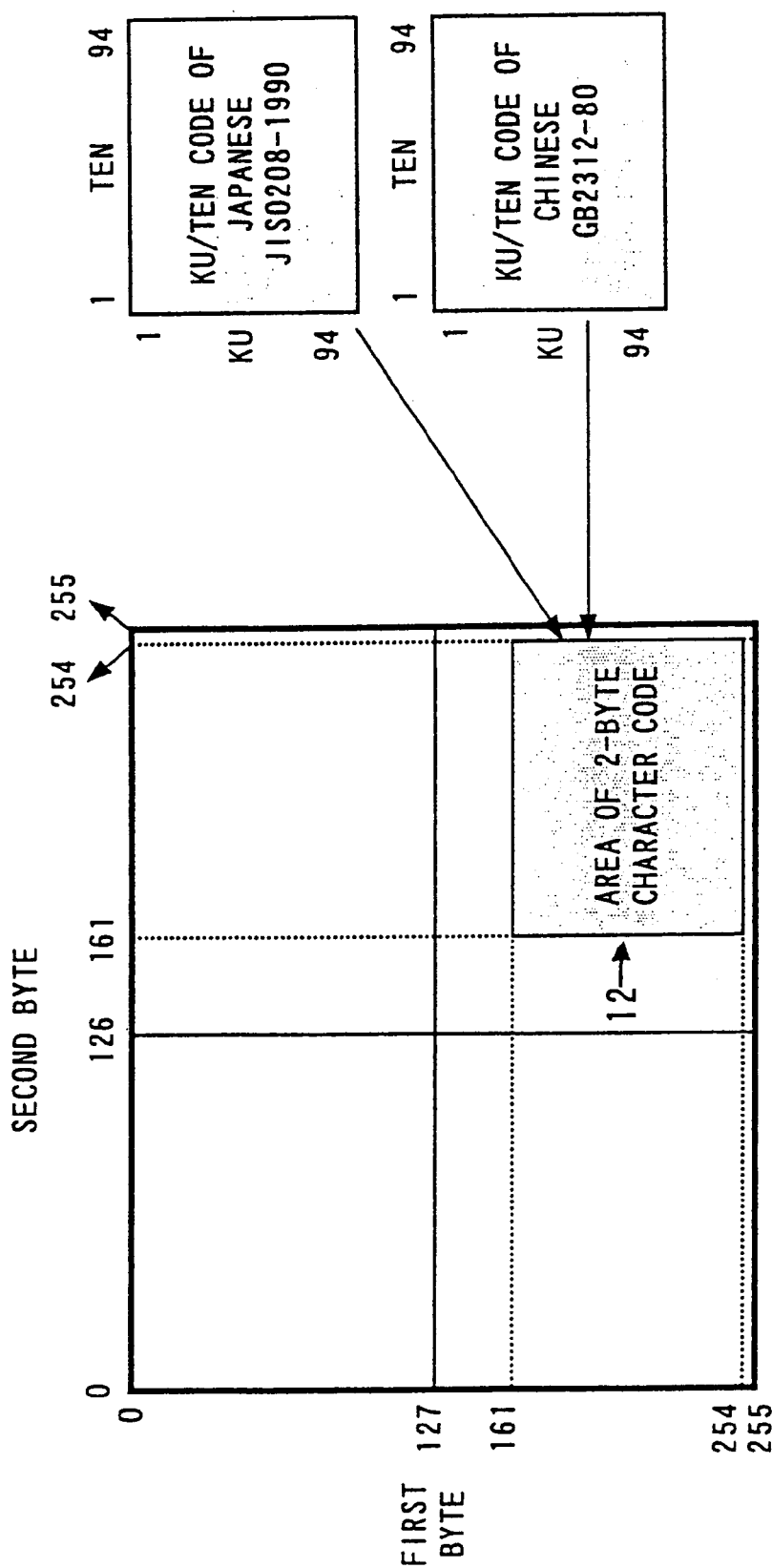
F I G. 3B

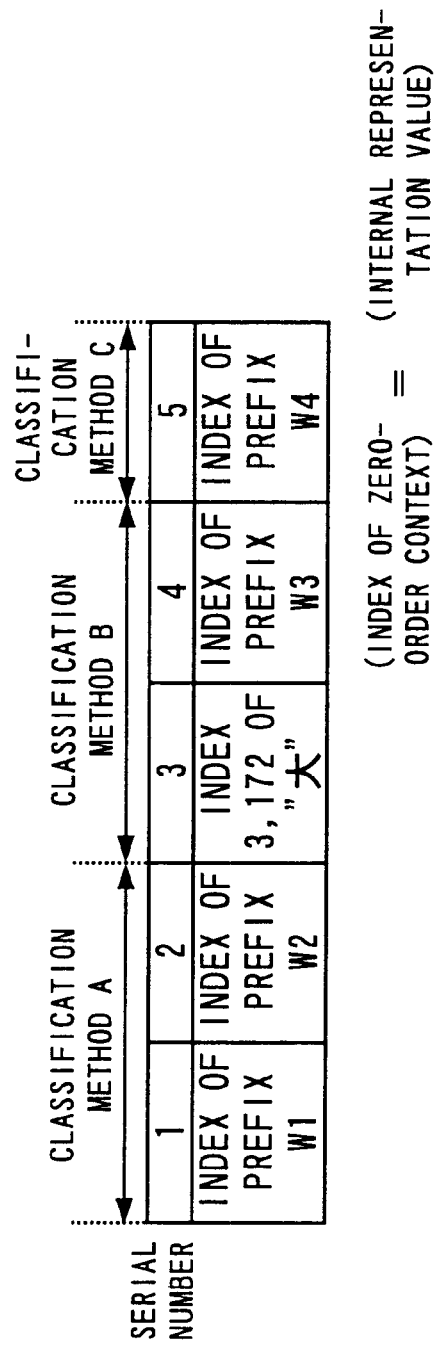
F I G. 14

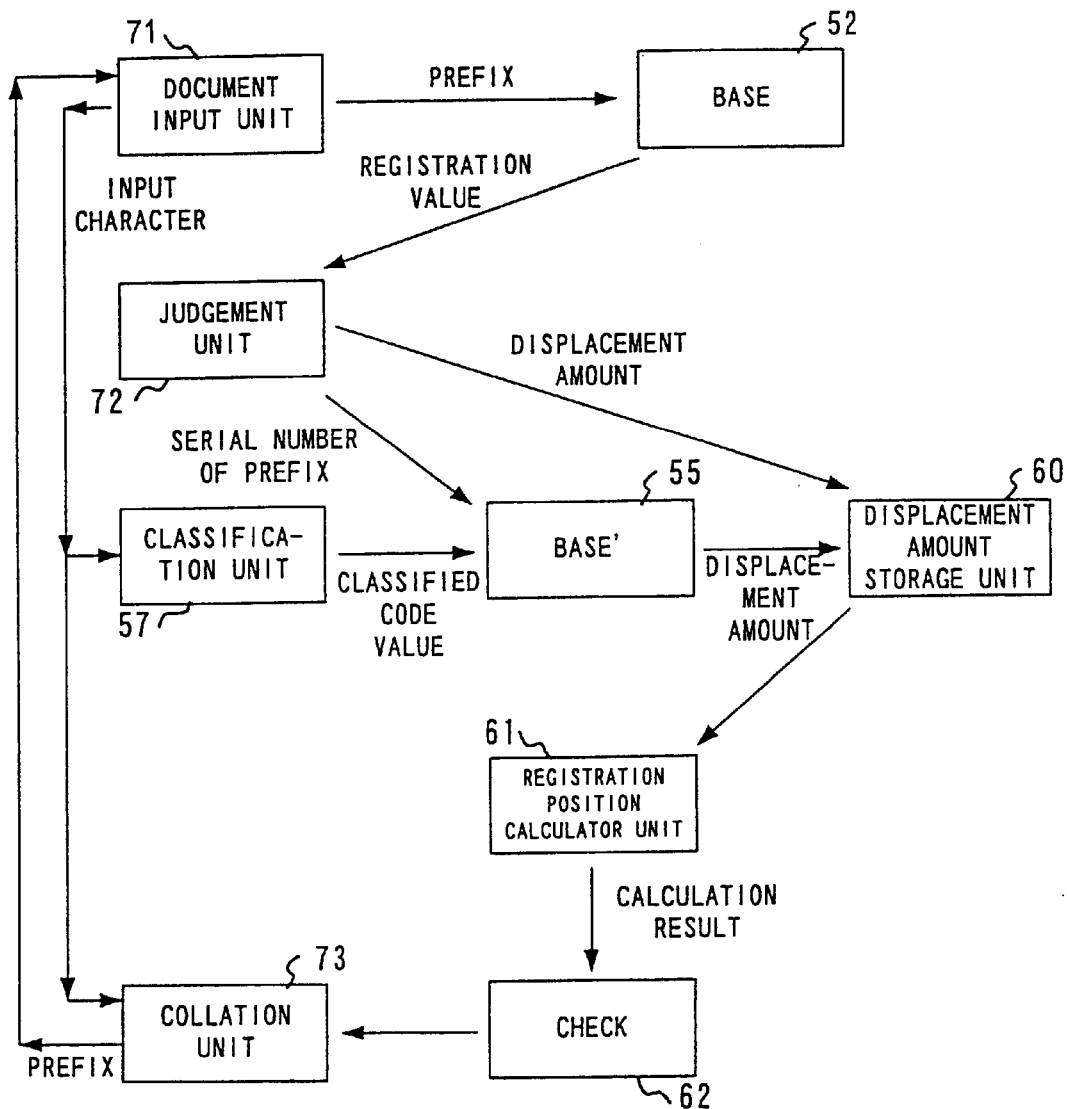
F I G. 2 3

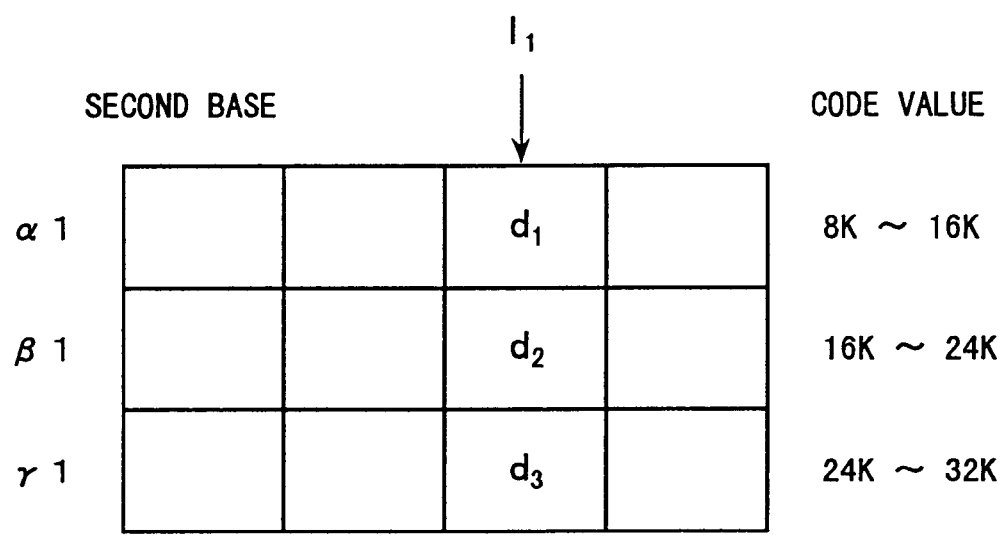
F I G. 2 5

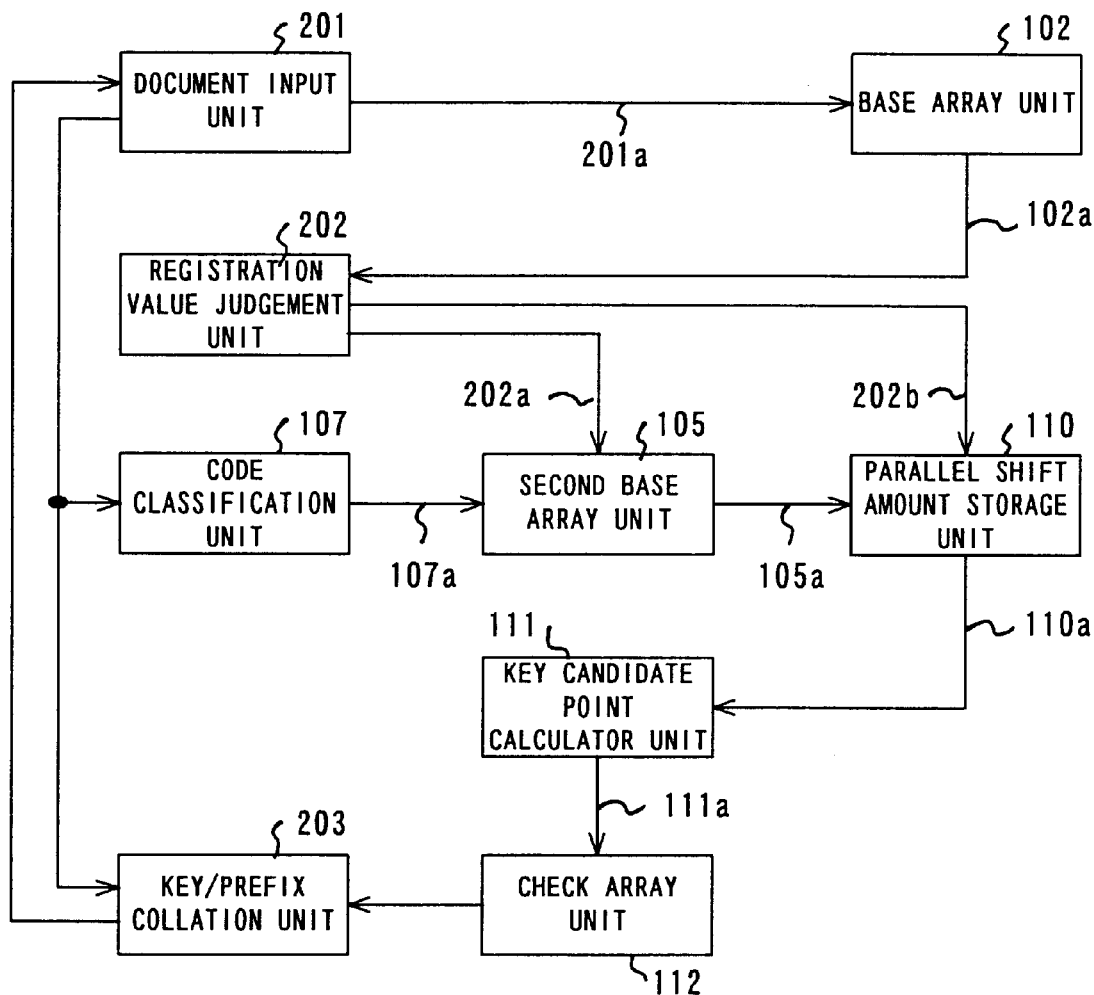
F I G. 3 0

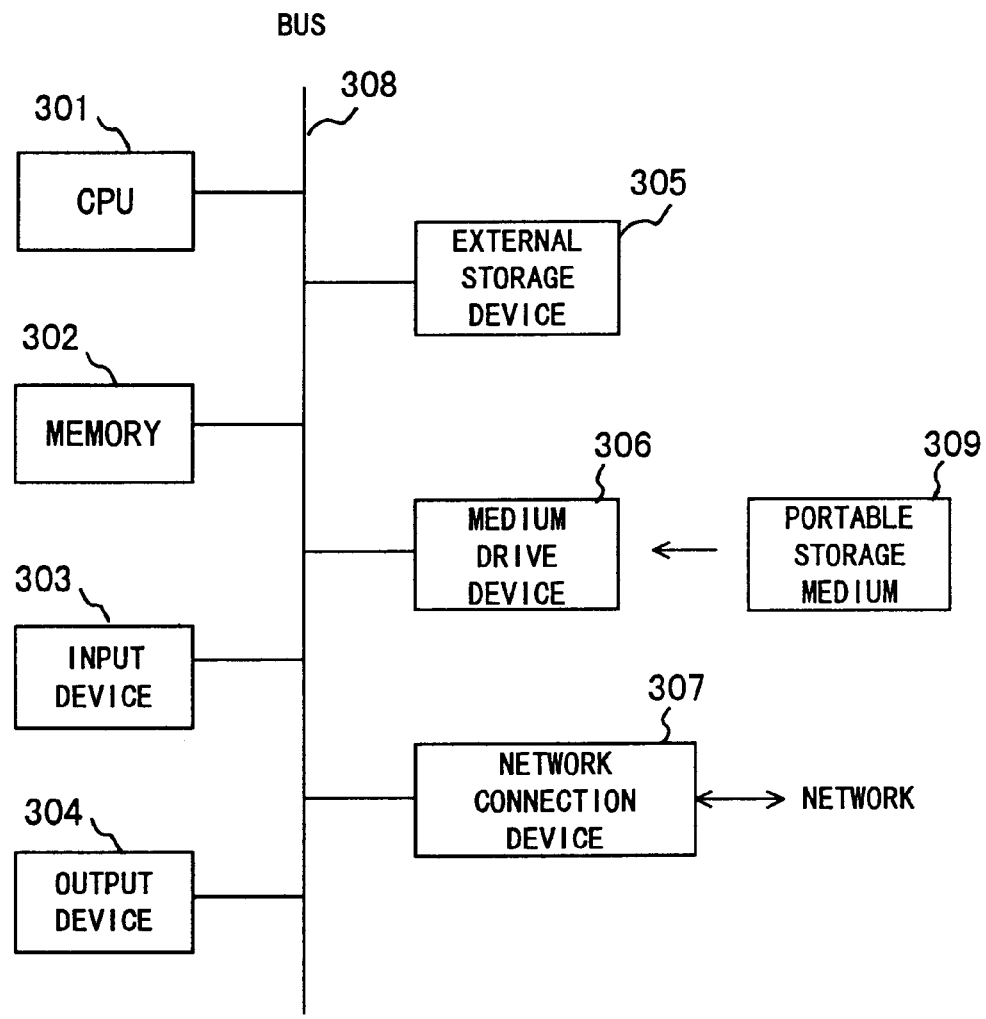
F I G. 3 2

APPARATUS AND METHOD FOR RETRIEVING CHARACTER STRING BASED ON CLASSIFICATION OF CHARACTER

BACKGROUND OF THE INVENTION

1. Field of the Invention

The present invention relates to both a character string retrieval apparatus and a method for registering a plurality of character strings, such as chinese characters, etc. in an array in advance regarding a character string retrieval, and judging whether or not a given character string is registered.

The present invention also relates to both a character code registration retrieval apparatus and a method regarding a key retrieval technology, in particular, for registering character strings, such as Kanji codes being a target to be retrieved using keys in a double array structure being an one-dimensional array of a data structure.

2. Description of the Related Art

Recently, as computer networks, electronic mail, etc. have become widespread, the amount of electronic documents (digital documents) possessed by individuals has rapidly increased. For example, a lot of people receive and process several hundreds to one thousand electronic mails a day. It is not rare that 1 mega-byte (MB) of document data are stored in a day and several hundred mega-bytes to one giga-byte (GB) in a year.

To handle such a large amount of data, it is necessary to reduce the necessary memory capacity and to speed up the transmission of data by omitting redundancy in data and compressing the data amount. The data compression technology has been made indispensable due to the recent trends described above, and for compressing a variety of data by one method, for example, a universal encoding has been proposed.

However, when document data, such as electronicized Japanese, Chinese, etc. are compressed in units of words, first, it is necessary to judge at high speed whether or not a character string inputted from a document is a word registered in a dictionary in advance. Furthermore, since in these languages there are a lot of words to be registered in a dictionary, the dictionary has to be edited in such a way as a useless memory area may not be generated as much as possible. In a well-known TRIE method, a plurality of words being a key are stored in a TRIE dictionary of a tree structure, and a word included in an input character string is retrieved by collating the character string with each node of the tree structure, character by character.

In the following description, names used in an information theory are used as they are, that is, data in one word unit are called a symbol or character, and an arbitrary number of connected data are called a string or character string. Furthermore, a sequence consisting of several leading symbols and characters in a code string or character string is called a prefix, and a sequence consisting of several ending symbols and characters is called a suffix. For example, the prefixes of a character string abc are $\epsilon$ (empty), a, ab and abc, and the suffixes are $\epsilon$, a, ab and abc.

In the compression of language codes it is important to store a string, such as a word, etc. in a data structure with a memory capacity as small as possible, and develop an algorithm to retrieve the string at high speed. In particular, in the case of a dictionary storing words, key aggregates to be registered are known in advance, and the dictionary is often expanded by suitably adding keys later. Therefore, it is also important that keys can be easily added. Such a data structure is called a quasi-static data structure.

Aoe has proposed a double-array as a data structure for pattern-matching a plurality of keys at high speed (Junichi Aoe: "A High-speed Digital Retrieval Algorithm by Double-array", in Proceedings of Papers D of The Electronics Information and Communications Institute, Vol.J71-D, No.9, pp.1,592–1600, 1988).

FIG. 1A shows an example of a double-array. This double-array comprises two one-dimensional arrays of BASE and CHECK, and data stored by these arrays corresponds to a TRIE structure shown in FIG. 1B. The TRIE of FIG. 1B indicates the five English words of baby #, bachelor #, badger #, badge # and jar #, and the index of each node corresponds to the subscripts of the arrays of BASE and CHECK shown in FIG. 1B. A position where the registration values of BASE and CHECK are both 0, corresponds to a space position where nodes are not yet registered.

This TRIE includes a repeat of the parental relation of nodes shown in FIG. 1C, and the index n of a parent node and the index m of a child node correspond to the subscripts of a BASE and a CHECK, respectively. In other words, this parental relation indicates a kind of state transition, and when a character a is inputted in the state of a parent node n, the transition from the state of a parent node n to the state of child node m is made.

When the index of a child node corresponding to the character a following the parent node n is retrieved using a double-array, first, as shown in FIG. 1D, a position corresponding to the subscript n on a BASE is referred to and the content d is obtained. This value d indicates a kind of origin shift amount (displacement amount) for the subscript of the CHECK.

Then, the subscript of a position shifted by the internal representation value of the character a, with the subscript d on the CHECK as a start point, is assumed to be m (=d+the internal representation value of character a). If the content of a position corresponding to the subscript m on the CHECK coincides with the index n of the parent node, the character a is stored below the node n, and it is found that the subscript of a corresponding child node is m. At this time, the index m of the child node is expressed as m=g(n,a) using a goto function g specifying a state transition for a key on a TRIE.

Generally speaking, one or more child nodes are following one parent node, and in a normal TRIE structure, the retrieval speed of a child node is reduced according to the number of the sibling nodes following the same parent node. On the other hand, in the double-array TRIE structure, a high-speed retrieval is available regardless of the number of sibling nodes.

However, the conventional character string retrieval described above has the following problems.

When a double-array is used for a Kanji dictionary of Japanese, Chinese, etc., the number of child nodes following one parent node tends to increase compared with an alphabetical dictionary of English, etc. due to the variety of Kanji idioms.

FIG. 1E shows a case where five Kanji idioms starting with a Kanji "電" (electricity), that is, "電圧" (voltage), "電気" (electricity), "" (electric train), "電脳" (computer) and "電" (telephone) are registered in a double-array. In this case, a Kanji code value corresponds to each of the characters following "電", that is, "圧" (pressure), "気" (atmosphere), "車" (train), "脳" (brain) and "話" (speech), and a relative positional relation is kept constant on a CHECK according to the internal representation values. On the other hand, positions marked with O on the CHECK are already occupied by other Kanji characters, and the respective Kanji following "電" cannot be necessarily simultaneously matched for an empty position.

Therefore, in order to register these Kanji characters on the CHECK with the relative positional relation maintained, as shown in FIG. 1F, it is necessary to expand both arrays of BASE and CHECK. In this case, the minimum displacement amount (parallel shift amount) d which can accommodate all these Kanji characters is calculated, and this value d is written in a position of the code value n of "電" on the BASE. Here, values obtained by adding the internal representation value of each of the Kanji characters following "電" to this displacement amount d are designated for new subscripts of the array, p, q, r, s and t. Then, the index n of the parent node of "電" is written in the positions of p, q, r, s and t on the CHECK.

FIG. 1G shows this TRIE tree structure. In FIG. 1G, "電" is registered below the root node, and "圧", "気", "車", "大円" and "話" are registered below the node n corresponding to nodes p, q, r, s and t, respectively. Here, n=g(root, 電), p=g (n, 圧), q=g(n, 気), r=g(n, 車), s=g(n, 大円) and t=g(n, 話).

Here, the problem is that unlike in the case of letters of the alphabet, in the case of Kanji characters a lot of characters follow one character, and if these characters are registered in the CHECK with the relative positional relation maintained, an array often has to be expanded. If the array is expanded, spaces between characters already registered are left unoccupied and empty. If this expansion of the array is repeated, the number of such spaces remarkably increases. Therefore, it is very difficult to store a lot of Kanji idioms in a small memory capacity.

SUMMARY OF THE INVENTION

It is an object of the present invention to provide a string retrieval apparatus and method for reducing the number of idle spaces of a dictionary without losing the high-speed of retrieval, and retrieving a string using a compressed dictionary.

It is another object of the present invention to provide a character code registration retrieval apparatus and method for registering a lot of character codes with the expansion of an array suppressed as much as possible by proposing a new data structure obtained by further developing a double-array structure being a conventional high-speed low-capacity dictionary data structure, and introducing a new data structure different from the conventional double-array regarding frequently-appearing character codes.

In the first aspect of the present invention, the string retrieval apparatus comprises a first array unit, a second array unit, a third array unit and a retrieval unit, and retrieves a given string out of registration strings.

The first array unit registers number information corresponding to a prefix, at the position of a subscript, which is identical to the index of the prefix followed by a plurality of characters. The second array unit registers a displacement amount corresponding to each of a plurality of groups obtained by classifying the plurality of characters following the prefix, at the position based both on a subscript identical to the number information corresponding to the prefix, and another subscript concerning to a character code. The third array unit registers the index of the prefix, at the position of a subscript identical to the sum of the displacement amount and the internal representation value of a character following the prefix. The retrieval unit retrieves a given string using the first, second and third array units.

By adopting such a string retrieval apparatus, characters following a prefix are classified into a plurality of groups, and a displacement amount is assigned to each group. Since the number of characters included in each group is less than the total number of characters following the prefix, the empty positions in the array unit can be easily utilized as compared with a case where all the characters are registered at one time. Thus, characters can be registered with a smaller displacement amount, and the expansion of both the first and the third array unit can be suppressed with the high-speed of retrieval maintained.

In the second aspect of the present invention, the string retrieval apparatus comprises a register unit and a retrieval unit, and retrieves a given string out of the registration strings. The register unit classifies and registers a plurality of characters following a prefix, and the retrieval unit retrieves the given string using the register unit.

By adopting such a string retrieval apparatus, like the first aspect, empty areas in the register unit can be efficiently utilized, and the data structure of the registered string can be compressed with the high-speed of retrieval maintained.

An apparatus in the third aspect of the present invention is a character code registration retrieval apparatus for registering character code strings to be retrieved using keys, in a double-array structure being a one-dimensional array of a data structure, and retrieving a string, and comprises a parallel shift amount calculator unit for calculating a parallel shift amount needed to register the characters of each string to be retrieved using keys, a first array unit having an index of a prefix of each character string to be retrieved using keys as a subscript, an identifying unit for judging a registration value in the first array unit, a second array unit registering information on a specific character following the prefix of a string indicated in the first array unit, a key candidate point calculator unit for calculating the sum of the parallel shift amount registered in the first and second array units and as internal representation value corresponding to a character following the prefix of the string and a third array unit registering the index of the prefix of the string, with the sum obtained by the key candidate point calculator unit as a subscript.

By introducing as a new data structure obtained by further developing a double-array structure being a one-dimensional array of a conventional high-speed low-capacity dictionary data structure, a new data structure having a first array with the index of the prefix of each string to be retrieved using keys as a subscript, a second array registering information on specific characters following the prefix of the string shown in the first array and a third array registering the index of the prefix of the string using as a subscript the sum of a parallel shift amount needed to register the character of each string to be retrieved using keys calculated by a parallel shift amount calculator unit in the first and second arrays and as internal representation value corresponding to a character following the prefix of the string, such a character code registration retrieval apparatus can provide each character code with a registration position in such a way as character codes may be overlapped with each other on the CHECK array corresponding to the third array. As a result, all the character codes as keys can be registered in spaces on the CHECK array at one time, with the expansion of the CHECK array suppressed as much as possible, all the character codes as keys can be registered on the CHECK array, with the relative positional relation between character codes following a certain character code maintained and with the expansion of the CHECK array suppressed as much as possible, and further the occurrence of idle spaces (sparse areas) can be reduced to the lowest possible level. Thus, a dictionary storing a quasi-static key aggregate, that is, an aggregate of predetermined keys, as retrieval targets can be generated and thereby the memory capacity having a TRIE array structure which can be expanded by properly adding and registering keys later, can be minimized.

An apparatus in the fourth aspect of the present invention is a character code registration retrieval apparatus in the third aspect, and comprises a list unit for generating a list of character codes frequently used in idioms and outputting a character code selected from the list of the character codes, a frequently-appearing character code selector unit for outputting a frequency threshold on up to what frequency order number of character codes should be selected, a frequently-appearing character code storage unit for storing a frequently-appearing character code selected from the list unit and outputting the selected frequently-appearing character code and the index of the frequently-appearing character code, a dictionary unit being a character code dictionary registering idioms composed of character codes, for classifying a job according to whether or not a focused character is the prefix of idioms based on the frequently-appearing character and outputting each of groups obtained by classifying character following the frequently-appearing character of the prefix, a group storage unit for storing each of groups obtained by classifying character following the frequently-appearing character of the prefix inputted by the dictionary unit, a first BASE array unit as the first array unit, for calculating number information of the frequently-appearing character and storing the number information in the position of the index of the internal representation value on the first BASE array, a code classification unit, to classify characters following the frequently-appearing character of the prefix, for classifying the second character of the idiom using several bits of the second character code, a parallel shift amount calculator unit for calculating a minimum parallel shift amount such as any value obtained by adding an arbitrary parallel shift amount to the internal representation value of each character in each group may indicate an empty position on a CHECK array, a parallel shift amount storage unit for storing the parallel shift amount inputted from the parallel shift amount calculator unit and outputting the parallel shift amount to a second BASE array unit, a key candidate point calculator unit for registering the index of the prefix being the parent of the characters at the position of a subscript in the CHECK array, which is identical to the sum of the internal representation value of each character of the group and the parallel shift amount, and designating the value of the sum for the index of a next prefix consisting of (prefix+current character), the second BASE array unit as the second array unit for storing the parallel shift amount for each group outputted by the parallel shift storage unit based on both the code value inputted by the code classification unit and the number information inputted by the list unit, and a CHECK array unit as the third array unit for registering the index of the prefix in a position corresponding to the value of the sum.

In such a character code registration retrieval apparatus, each character code can be provided with a registration position in such a way as character codes may be overlapped with each other on a CHECK array by introducing, as a new data structure-obtained by further developing a double-array structure being a one-dimensional array of a conventional high-speed low-capacity dictionary data structure, a new data structure having a CHECK array unit as a first array unit for registering the index of a prefix in a place of subscript corresponding to the sum of a parallel shift amount and the internal representation value of a character code, a first BASE array unit for calculating the number information of a selected character and simultaneously storing the number information in the position of the index of the character on the first BASE array, and a second BASE array for storing the parallel shift amount of each group inputted by a parallel shift amount storage unit based on both the code value outputted from a code classification unit and the number information outputted by a list unit, by generating two kinds of values to be registered in the first BASE array and applying two kinds of values that is a conventional parallel shift amount (with a low use frequency) and one of the subscripts of the second BASE array, to character not frequently used and a frequently-appearing character respectively, and classifying the subscripts of the second BASE array into three groups according to the code values of characters following the frequently-appearing character code and providing each group with a unique parallel shift amount. As a result, all the character codes as keys can be registered in spaces on the CHECK array at one time, with the expansion of the CHECK array suppressed as much as possible, each character code can be registered in the CHECK array, with the relative positional relation between character following a certain character maintained and with the expansion of the CHECK array suppressed as much as possible, and further the occurrence of idle spaces can be reduced to the lowest possible level. Thus, a dictionary storing a quasi-static key aggregate, that is, an aggregate of predetermined keys, as retrieval targets can be generated and thereby the memory capacity with a TRIE array structure which can be expanded by properly adding and registering keys later, can be minimized.

An apparatus in the fifth aspect of the present invention is a character code registration retrieval apparatus in the third aspect, and comprises a document input unit for first designating the root of a TRIE structure for a prefix, and simultaneously setting an end mark in the prefix, then instructing to input a character code of a character to be retrieved and detecting the prefix of the input character code, a first BASE array unit for outputting a numeric value from a place corresponding to the index of the prefix or the character code, a registration value judgement unit for judging whether the numeric value inputted from the first BASE array unit is the number information of the prefix character or a parallel shift amount, outputting the numeric value as the number information of the prefix character code when the numeric value is out of the scope of an index composing a TRIE, and outputting the numeric value as a parallel shift amount when the numeric value is within the scope of the index, a code classification unit for classifying the input character code using several bits of the character code, when the numeric value inputted from the first BASE array unit is the number information of a frequently-appearing prefix character code, a second BASE array unit for outputting a parallel shift amount from a place corresponding to both the number information of the prefix outputted from the registration value judgement unit and the classification of the character code, a parallel shift amount storage unit, when the numeric value inputted from the first BASE array unit is a parallel shift amount, for storing the parallel shift amount, a key candidate point calculator unit for calculating the sum of the parallel shift amount and the internal representation value of the input character, a CHECK array unit for outputting a key from a place corresponding to the sum calculated by the key candidate point calculator unit, and a key/prefix collation unit for judging whether or not the key inputted by the CHECK array unit coincides with the index of the prefix character code or the index of the prefix, and when the key coincides with the index of the prefix character code or the index of prefix, judging that the idiom is registered in the dictionary.

In such a character code registration retrieval apparatus, a dictionary storing a quasi-static key aggregate, that is, an aggregate of predetermined keys, as retrieval targets can be generated and thereby the memory capacity with a TRIE array structure which can be expanded by properly adding and registering keys later, can be minimized by introducing, as a new data structure obtained by further developing a double-array structure being a one-dimensional array of a conventional high-speed low-capacity dictionary data structure, a new data structure having a CHECK array unit for outputting a key from a place corresponding to the sum inputted from the key candidate point calculator unit, a first BASE array for outputting a numeric value from a place corresponding to the index of a prefix or character code, and a second BASE array for outputting a parallel shift amount from a place corresponding to both the number information of the prefix character code outputted from the registration value judgement unit and the classification of the character code. As a result, a high-speed pattern matching can be implemented by storing data in a double-array structure (that is, a TRIE array structure) being an one-dimensional array with a memory capacity reduced to the lowest possible level and using this TRIE array structure as a retrieval key.

BRIEF DESCRIPTION OF THE DRAWINGS

FIG. 1A shows a double-array.

FIG. 3B shows an area of an 8-bit code.

FIG. 14 shows an example of the registration content of a prefix register unit.

FIG. 23 shows the configuration of a character string retrieval apparatus at the time of retrieval.

FIG. 25 shows the second BASE array in the case of a 7-bit code.

FIG. 30 shows the configuration of a second character code registration retrieval apparatus.

FIG. 32 shows the configuration of an information processing apparatus.

DESCRIPTION OF THE PREFERRED EMBODIMENTS

The detailed embodiments of the present invention are described below with reference to the drawings.

Figure 2:
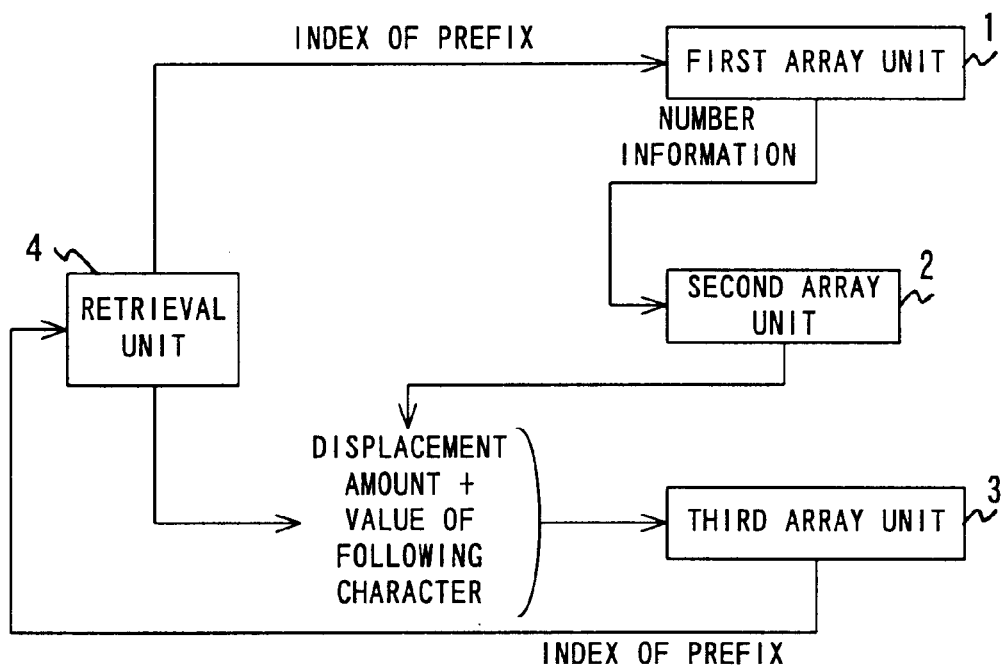
FIG. 2 shows the principle of the character string retrieval apparatus of the present invention.

FIG. 2 shows the principle of the character string retrieval apparatus of the present invention. The character string retrieval apparatus shown in FIG. 2 comprises a first array unit 1, a second array unit 2, a third array unit 3 and a retrieval unit 4, and retrieves a given character string out of registration character strings.

The array unit 1 registers number information (a serial number) corresponding to the prefix, at the position of a subscript that is identical to the index of the prefix followed by a plurality of characters.

The array unit 2 registers a displacement amount corresponding to each of a plurality of groups obtained by classifying the plurality of characters following the prefix, at the position of a subscript identical to the number information corresponding to the prefix.

The array unit 3 registers the index of the prefix, at the position of a subscript identical to the sum of the displacement amount and the internal representation value of the character following the prefix.

The retrieval unit 4 retrieves the given character string using the array units 1, 2 and 3.

A prefix means the leading part of a character string, and usually consists of one or more characters. For example, in FIG. 1E, a Kanji "電" is a prefix, and is followed by a plurality of Kanji characters, "圧", "気", "車", "脳" and "話". The index of a prefix, for example, corresponds to the index of a node in a TRIE. The array unit 1, for example, corresponds to the BASE described above, and stores the number information for the array unit 2 as a registration value corresponding to the index of the prefix.

The plurality of characters following the prefix are classified by a predetermined classification method, and the array unit 2 stores a displacement amount for each of the groups at the position of a subscript, identical to the number information registered in the array unit 1. The array unit 3, for example, corresponds to the CHECK described above, and stores the index of the prefix at the position of a subscript identical to the sum of each displacement amount and the internal representation value of each character. The internal representation value of a character corresponds to the value of a character code or an appropriate value calculated based on the value of the character code.

When a given character string contains a prefix described above and a next character is inputted in succession, the retrieval unit 4 extracts a displacement amount corresponding to a group to which the next character belongs from the array unit 2 using the number information registered in the array unit 1. Then, it checks whether or not the index of the prefix is registered in a position of a subscript in the array unit 3, which is identical to the sum of the extracted displacement amount and the value of the next character.

If the index of a corresponding prefix is registered, the next character is recognized as a character following the prefix, while if not, it is judged that the next character is not linked with the prefix. In this way, it can be checked whether or not a given character string is registered in the array units 1, 2 and 3.

By adopting such a character string retrieval apparatus, characters following a prefix can be classified into a plurality of groups, and a displacement amount is assigned to each group. Since the number of characters in each group is less than the total number of characters following the prefix, empty positions in the array unit 3 can be easily used as compared with a case where all the characters are registered at one time. Thus, characters can be registered with a lower number of displacement amounts, and the extension of the array unit 3 can be suppressed.

If characters following a prefix are registered without classification, the array unit 1 registers a displacement amount common to all the characters, at the position of a subscript identical to the index of the prefix, and the array unit 3 registers the index of the prefix, at the position of a subscript identical to the sum of the displacement amount and the value of each character. The retrieval unit 4 judges whether the value registered in the array unit 1 is number information or a displacement amount. If the value is number information, the displacement amount is obtained from the array unit 2 and thereby the array unit 3 is accessed, while, if the value is a displacement amount, the array unit 3 is directly accessed.

In this way, when a character registered without classification is retrieved, the number of process steps is the same as that in a retrieval using a double-array, while, when a character registered with classification is retrieved, only an access step to the array unit 2 is added. Therefore, the speed of retrieval is hardly lost.

By adopting another principle of the present invention, a character string retrieval apparatus comprises a register unit and a retrieval unit, and retrieves a given character string out of registration character strings. The register unit classifies a plurality of characters following a prefix into a plurality of groups and registers the characters. The retrieval unit retrieves the given character string using the register unit.

By adopting such a character string retrieval apparatus, like the character string retrieval apparatus shown in FIG. 2, space areas in the register unit can be efficiently utilized, and the data structure of a registration character string can be compressed with the speed of retrieval maintained.

For example, the array unit 1, array unit 2 and array unit 3 shown in FIG. 2 correspond to a BASE 52, a BASE' 55 and a CHECK 62 shown in FIG. 13 described later, respectively, and the retrieval unit 4 corresponds to a document input unit 71, a judgement unit 72 and a collation unit 73, shown in FIG. 23, to be described later.

The number of both JIS level-1 and level-2 Kanji characters registered as Kanji codes, whether it may be Japanese or Chinese, is a little less than 7,000. Out of these, the number of Kanji characters used to produce idioms are limited. For example, the number of frequently-appearing Kanji characters producing ten or more kinds of idioms is at most less than 500, even in Chinese.

However, when these frequently-appearing Kanji characters are registered in a dictionary, the more Kanji characters follow a Kanji on a TRIE, the more difficult it becomes to register all the Kanji characters in existing empty positions on a CHECK at one time, and the extension of the CHECK cannot be avoided.

Such being the case, in the present invention, a conventional double-array being a high-speed low-capacity dictionary is further developed, and frequently-appearing Kanji characters are registered/retrieved by a method different from a double-array. To be more specific, if the number of Kanji characters following a certain Kanji on a TRIE is large, Kanji characters are not registered in a dictionary, with relative positional relation between those Kanji characters maintained, but are classified into two or more groups and registered for each group, also taking the maintenance of the speed into consideration.

In this case, although the relative positional relation between Kanji characters belonging to the same group is maintained, the positional relation between different groups is not always maintained, and to judge to which group a Kanji inputted to be retrieved belongs, some additional information is needed. However, the possibility of using existing empty positions on a CHECK is enhanced compared with a case where a lot of Kanji characters are registered as one group as they are, and the use efficiency of a memory area is improved. Thus, the extension of an array can be suppressed and the data structure of the dictionary can be compressed. The number of steps of a retrieval process also hardly increases and the speed is maintained.

Figure 3A:
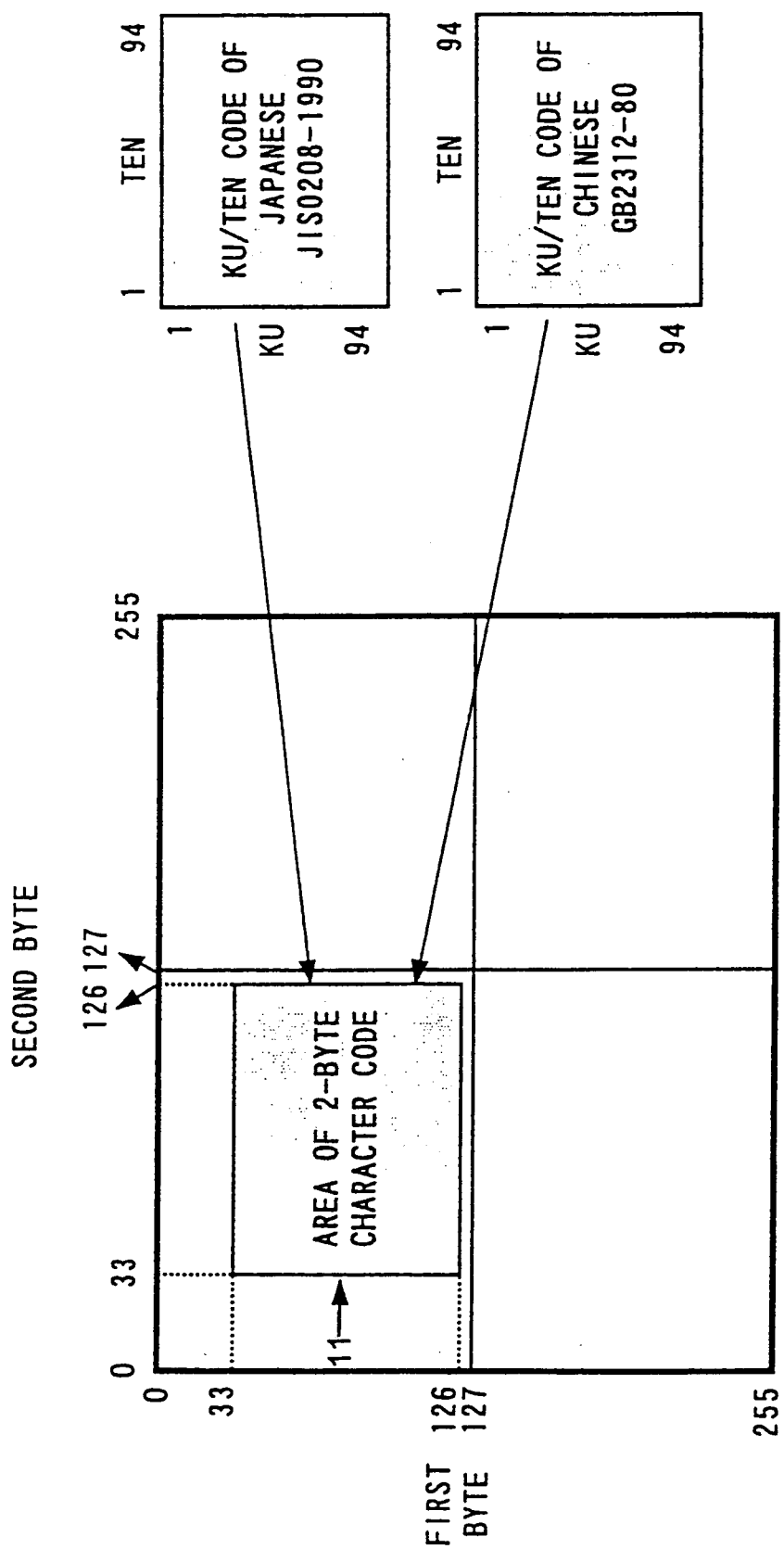
FIG. 3A shows an area of a 7-bit code.

Next, the classification methods of Kanji characters in this embodiment is described. FIGS. 3A and 3B show the area of a character code in the code space of a 2-byte character, such as Japanese, Chinese, etc. This code space corresponds to a two-dimensional space with numbers 0 to 255 indicated by the first byte of the 2-byte character and numbers 0 to 255 indicated by the second byte as the first coordinate and the second coordinate, respectively.

FIG. 3A shows the area 11 of a code in which 1 byte is indicated using 7 bits, such as a Japanese industrial standard (JIS) of Japanese, a GB code (7-bit code) of Chinese, etc., and FIG. 3B shows the area 12 of a code in which 1 byte is indicated using 8 bits, such as an extended UNIX code (EUC) of Japanese, a GB code (8-bit code) of Chinese, etc. In a Japanese graphic character code used as the base of these codes a Kanji code is restricted to a range of 94 ku×94 ten, and the maximum of 8,838 characters can be expressed.

FIGS. 4 to 7 show a method of classifying a 2-byte character by splitting the area 11 of a 7-bit code shown in FIG. 3A. In these FIGS. 4, 5, 6 and 7, the □ mark indicates the position of a plurality of Kanji characters following a certain Kanji, and the first bits of the first and second bytes of a character are both "0".

Figure 4:
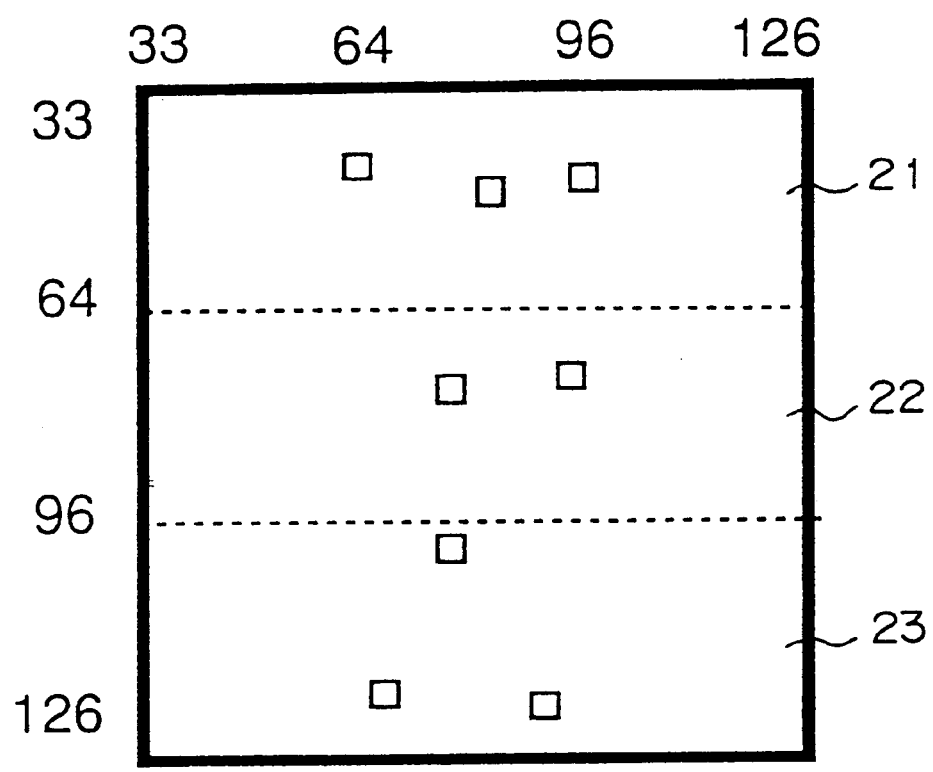
FIG. 4 shows a classification method A.

According to the classification method A shown in FIG. 4, the area 11 is split into three areas 21, 22 and 23 according to the values of the second and third bits of the first byte, and Kanji characters marked with □ are classified into three corresponding groups. Here, characters with "01" for both the second and third bits belong to the area 21, characters with "10" for both of these bits belong to the area 22, and characters with "11" for both of these bits belong to the area 23.

Figure 5:
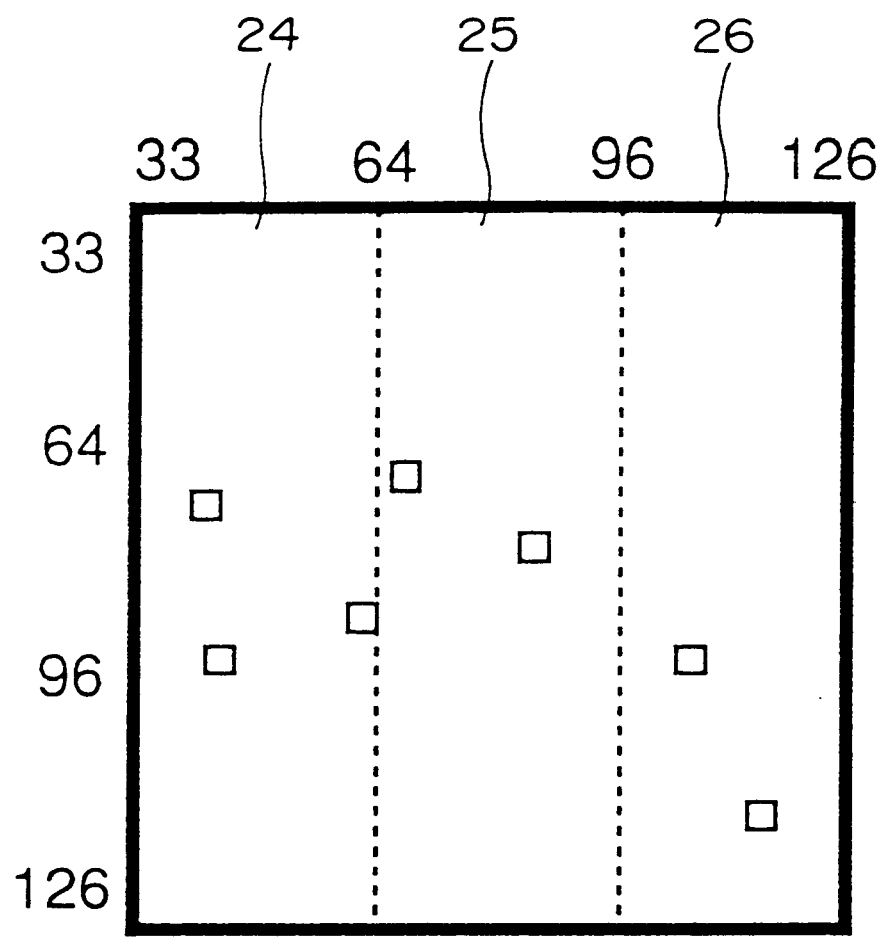
FIG. 5 shows a classification method B.

According to the classification method B shown in FIG. 5, the area 11 is split into three areas 24, 25 and 26 according to the values of the second and third bits of the second byte, and Kanji characters marked with □ are classified into three corresponding groups. Here, characters with "01" for both the second and third bits belong to the area 24, characters with "10" for both of these bits belong to the area 25, and characters with "11" for both of these bits belong to the area 26.

Figure 6:
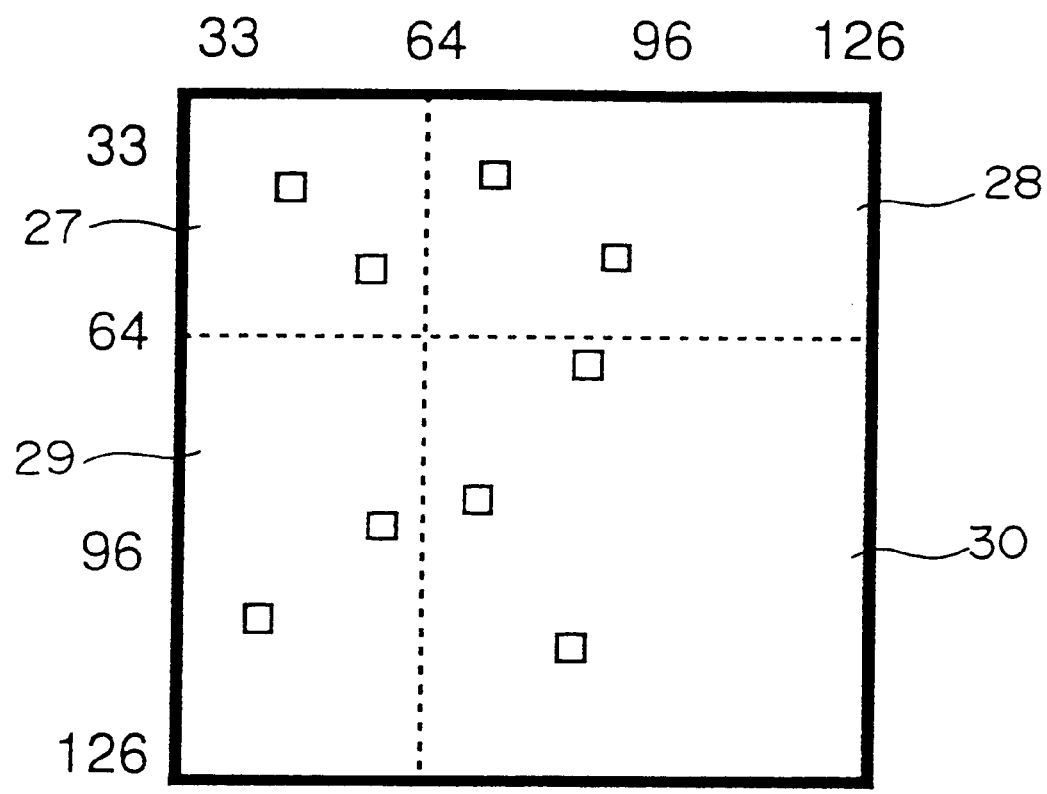
FIG. 6 shows a classification method C.

According to the classification method C shown in FIG. 6, the area 11 is split into four areas 27, 28, 29 and 30 according to the values of the second bits of the first and second bytes, and Kanji characters marked with □ are classified into four corresponding groups. Here, characters with "0" for both the second bit of the first byte and the second bit of the second byte belong to the area 27, characters with "0" for the second bit of the first byte and "1" for the second bit of the second byte belong to the area 28, characters with "1" for the second bit of the first byte and "0" for the second bit of the second byte belong to the area 29, and characters with "1" for both of the bits belong to the area 30.

Figure 7:
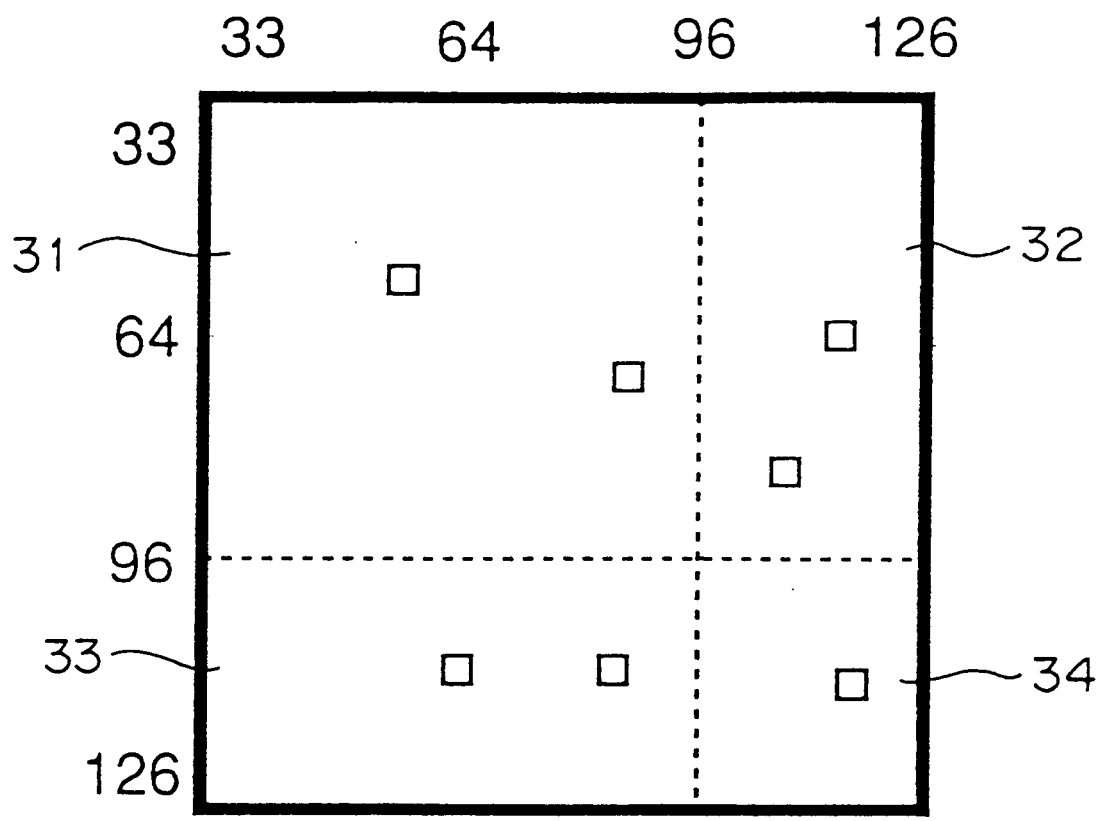
FIG. 7 shows a classification method D.

According to the classification method D shown in FIG. 7, the area 11 is split into four areas 31, 32, 33 and 34 according to the values of the second and third bits of the first and second bytes, and Kanji characters marked with □ are classified into four corresponding groups.

Here, out of characters with "01" or "10" for the second and third bits of the first byte, those with "01" or "10" for the second and third bits of the second byte belong to the area 31, and characters with "11" for the second and third bits of the second byte belong to the area 32. Out of characters with "11" for the second and third bits of the first byte, characters with "01" or "10" for the second and third bits of the second byte belong to the area 33, and characters with "11" for the second and third bits of the second byte belong to the area 34.

FIGS. 8 to 11 show a method of classifying a 2-byte character by splitting the area 12 of an 8-bit code shown in FIG. 3B into several areas. In these FIGS. 8, 9, 10 and 11, the □ mark indicates the position of a plurality of Kanji characters following a certain Kanji, and the first bits of the first and second bytes of a character are both "1".

Figure 8:
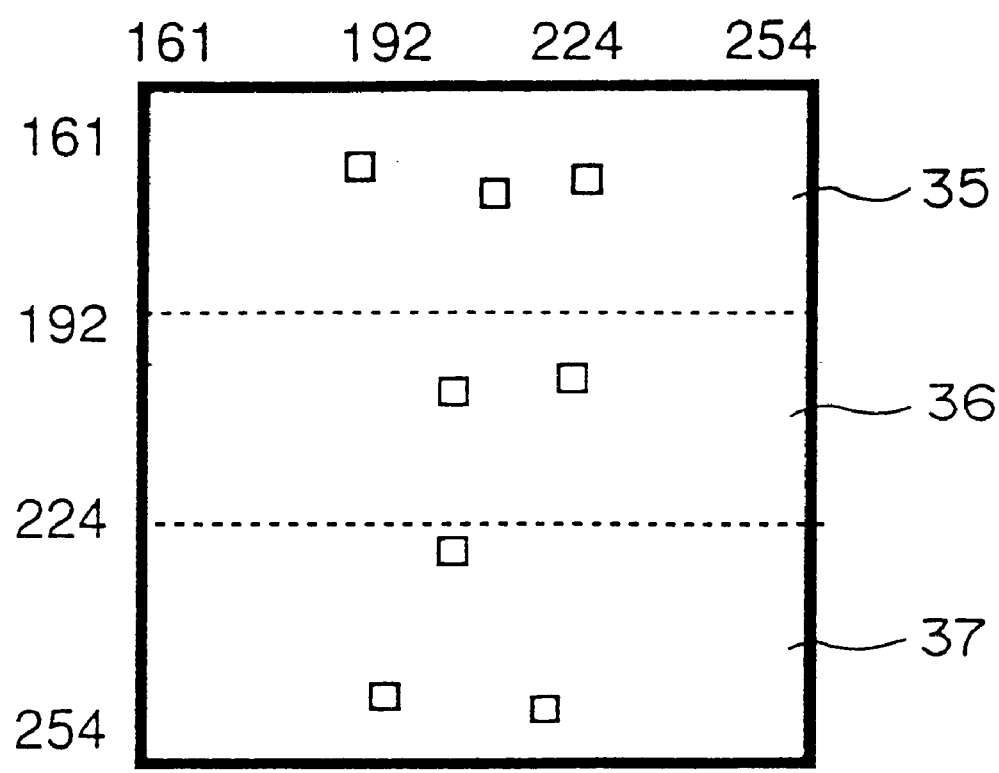
FIG. 8 shows a classification method E.

According to the classification method E shown in FIG. 8, like the classification method A shown in FIG. 4, the area 12 is split into three areas 35, 36 and 37 according to the values of the second and third bits of the first byte, and Kanji characters marked with □ are classified into three corresponding groups.

Figure 9:
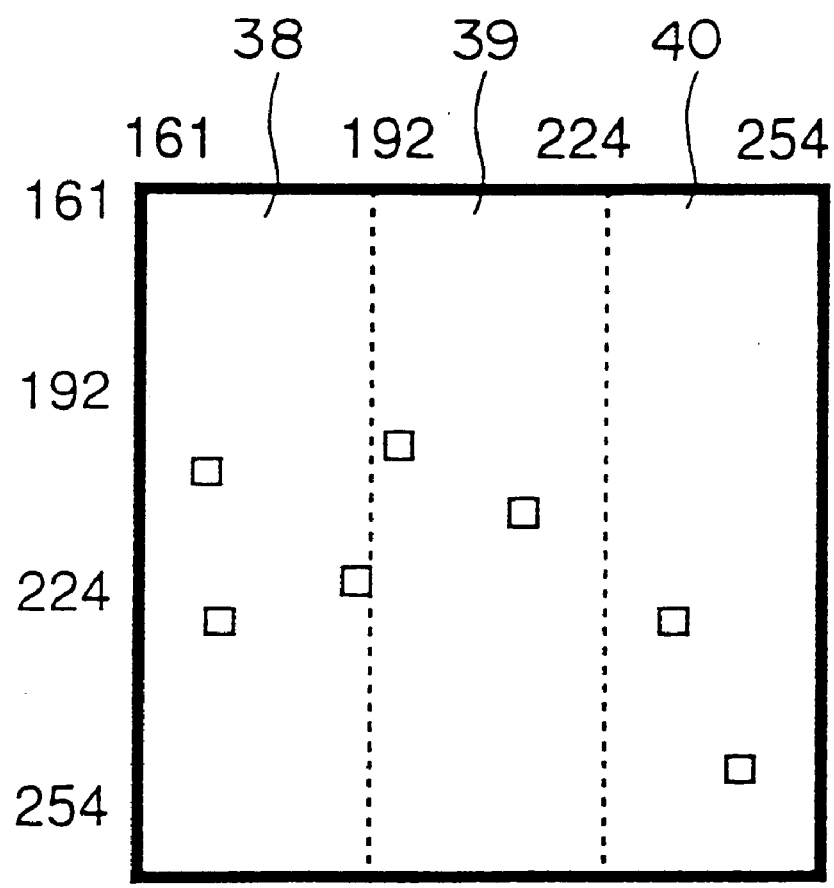
FIG. 9 shows a classification method F.

According to the classification method F shown in FIG. 9, like the classification method B shown in FIG. 5, the area 12 is split into three areas 38, 39 and 40 according to the values of the second and third bits of the second byte, and Kanji characters marked with □ are classified into three corresponding groups.

Figure 10:
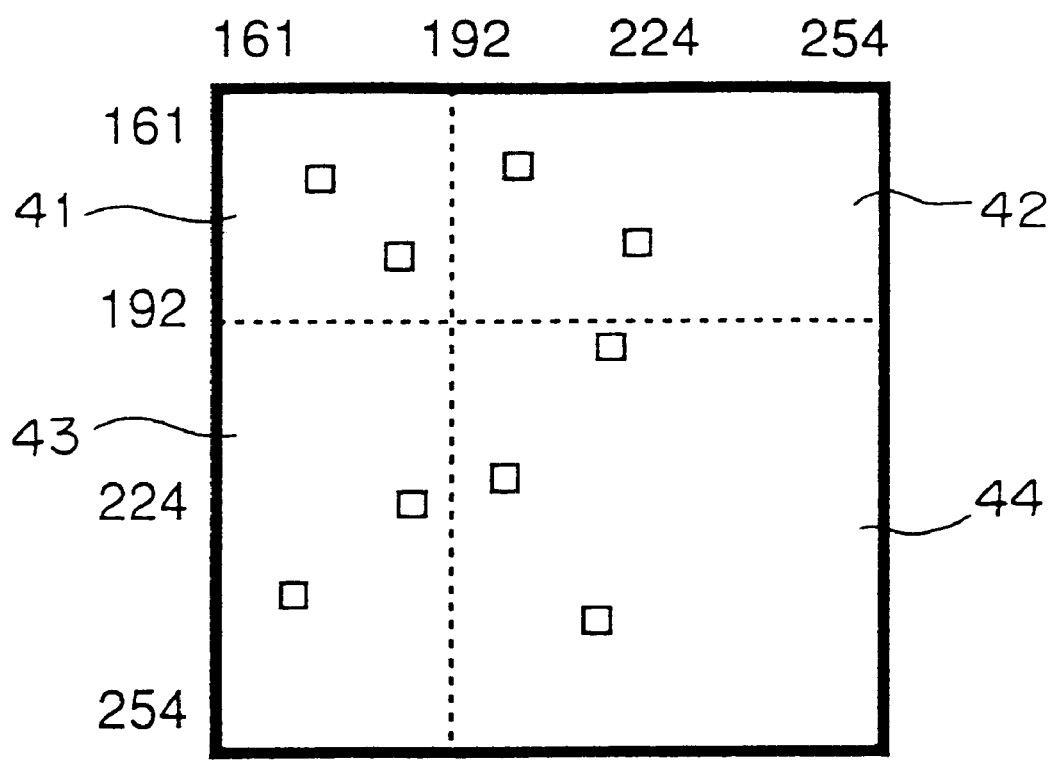
FIG. 10 shows a classification method G.

According to the classification method G shown in FIG. 10, like the classification method C shown in FIG. 6, the area 12 is split into four areas 41, 42, 43 and 44 according to the values of the second bit of the first and second bytes, and Kanji characters marked with □ are classified into four corresponding groups.

Figure 11:
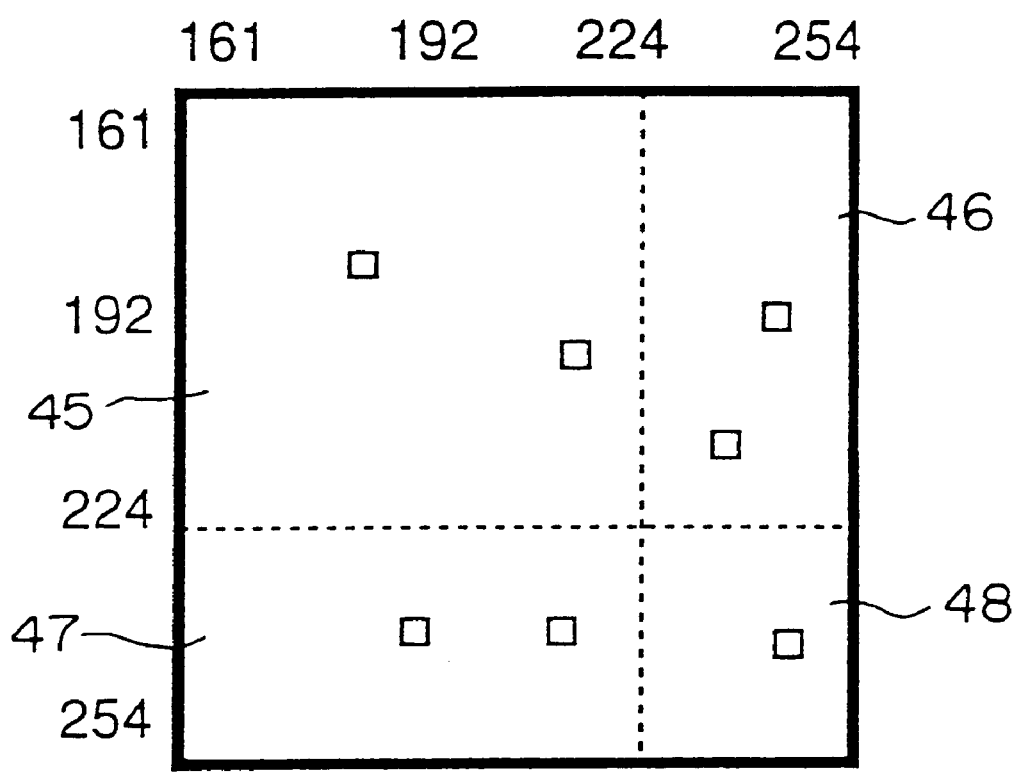
FIG. 11 shows a classification method H.

According to the classification method H shown in FIG. 11, like the classification method D shown in FIG. 7, the area 12 is split into four areas 45, 46, 47 and 48 according to the values of the second and third bits of the first and second bytes, and Kanji characters marked with □ are classified into four corresponding groups.

In this way, 2-byte characters can be classified into several groups by using the appropriate bit values of a character code. Although any of the methods described above is arbitrarily adopted, it is desirable to use a classification method such that Kanji characters marked with □ can be uniformly split as much as possible. In the following embodiments, characters following a prefix are classified by the values of the second and third bits of a character code using one of the classification methods described above, and a displacement amount is calculated for each of the obtained groups. Here, a prefix means the leading part of a word, and usually consists of one or more characters.

Figure 1B:
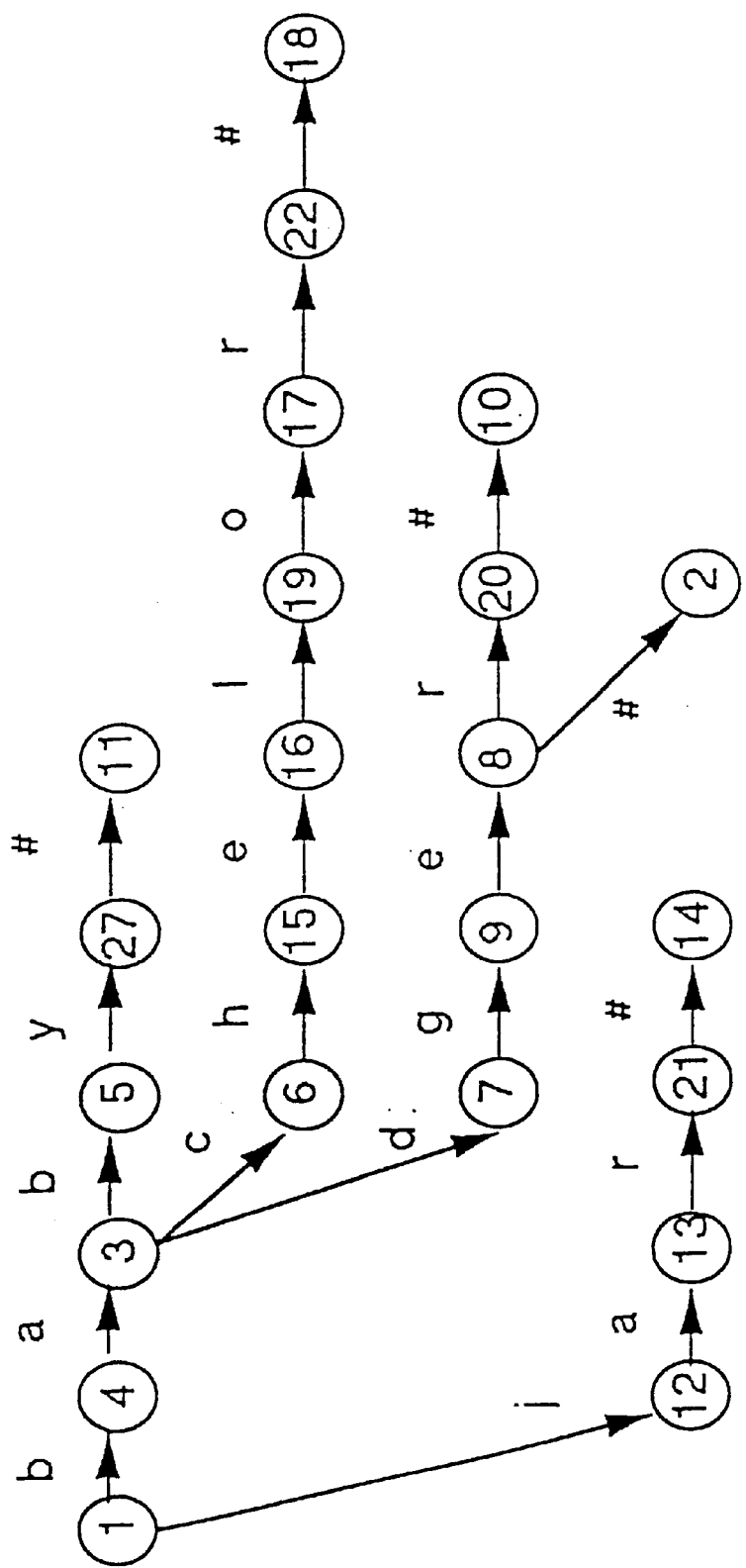
FIG. 1B shows a TRIE structure corresponding to a double-array.
Figure 1C:
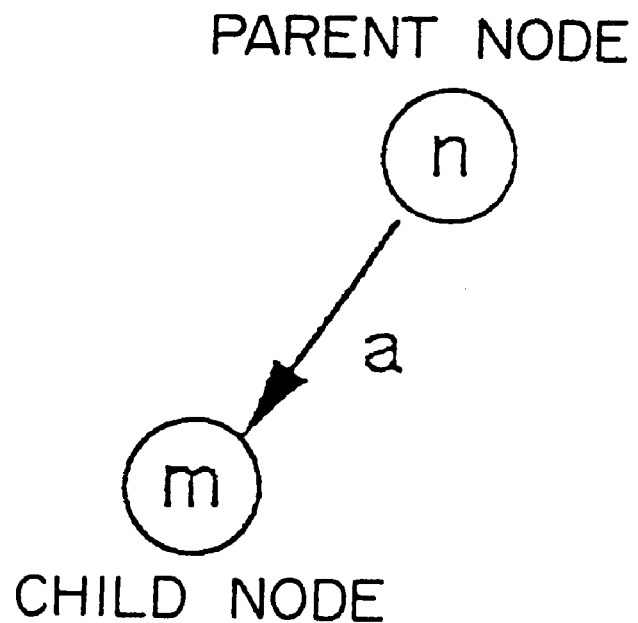
FIG. 1C shows parental relation in a TRIE.
Figure 1D:
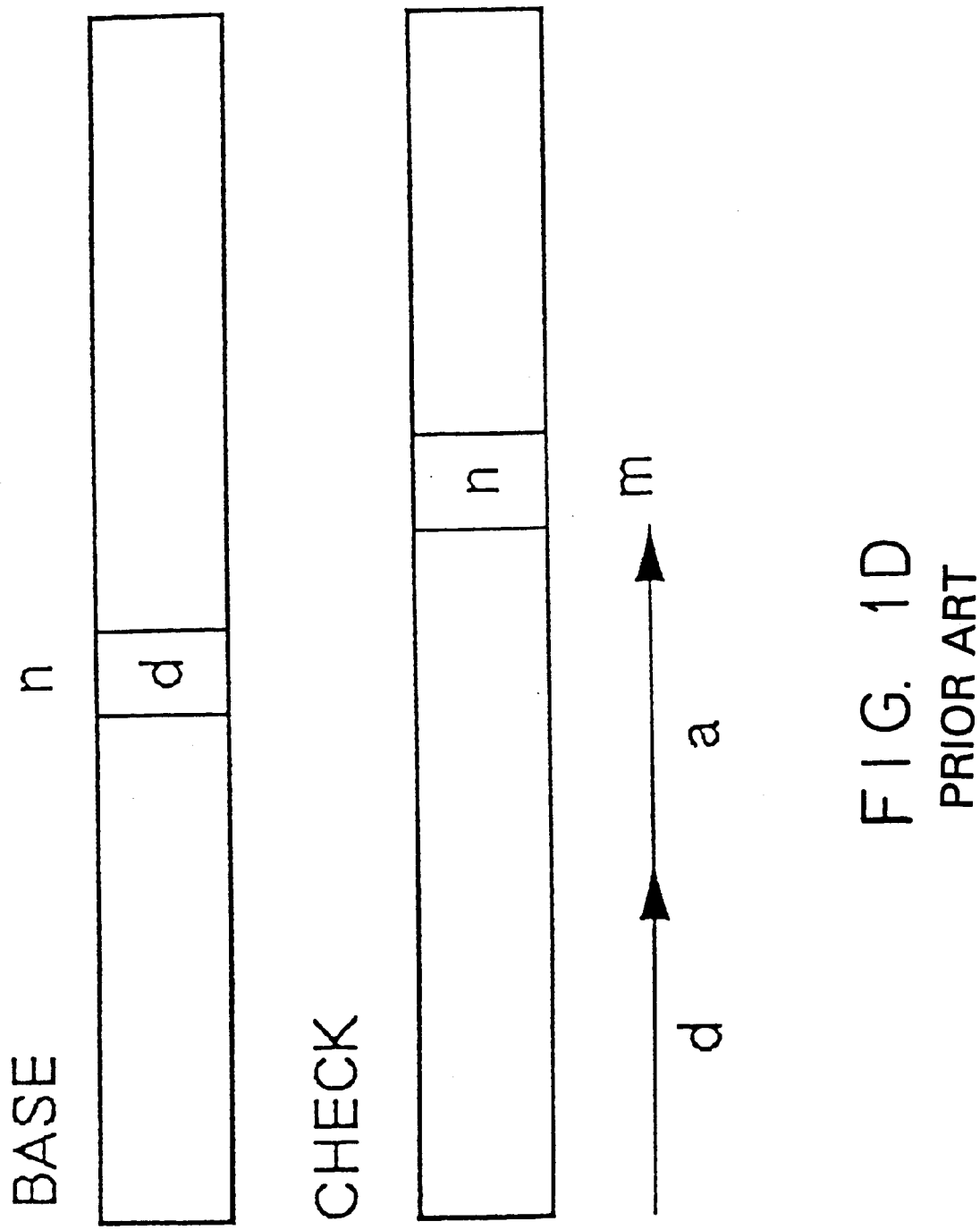
FIG. 1D shows a retrieval using a double-array.
Figure 1E:
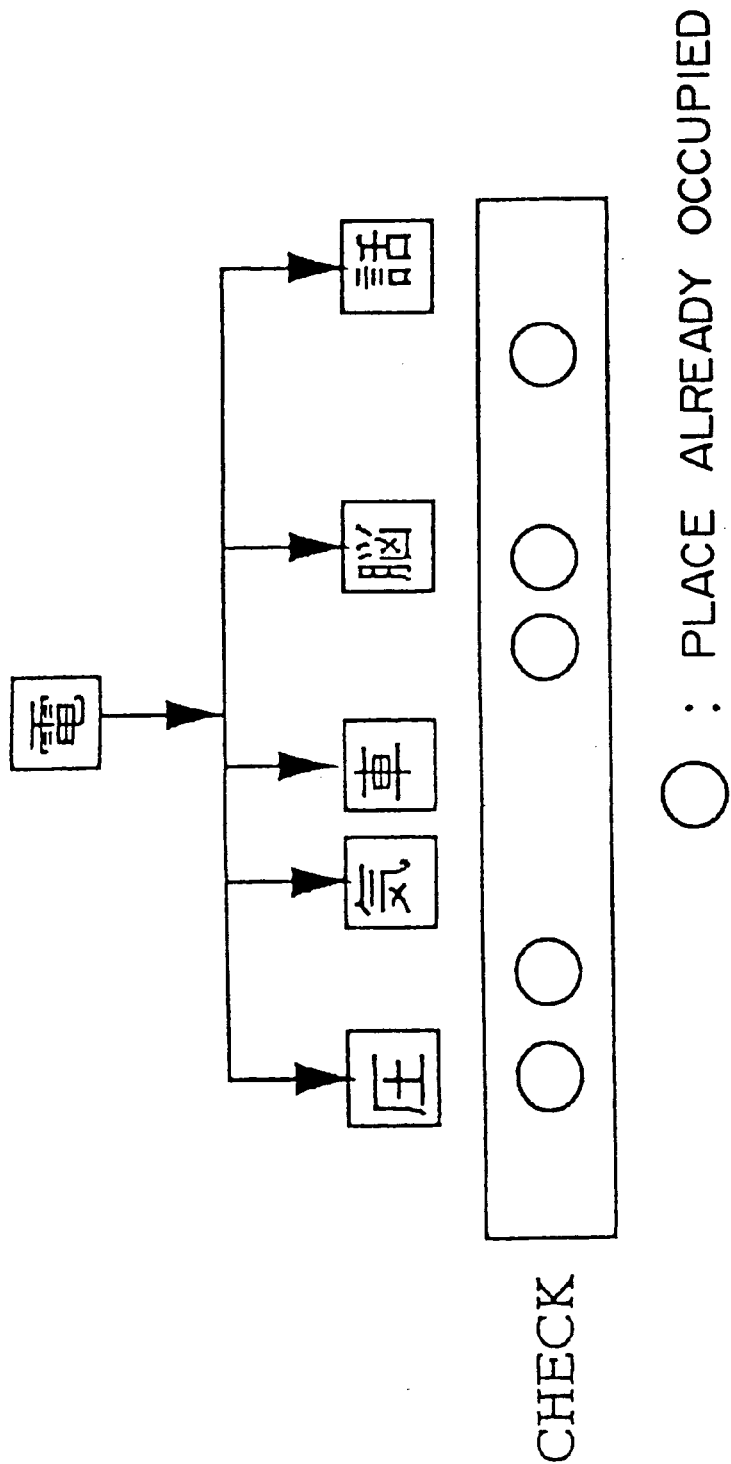
FIG. 1E shows additional registration of a Kanji.
Figure 1F:
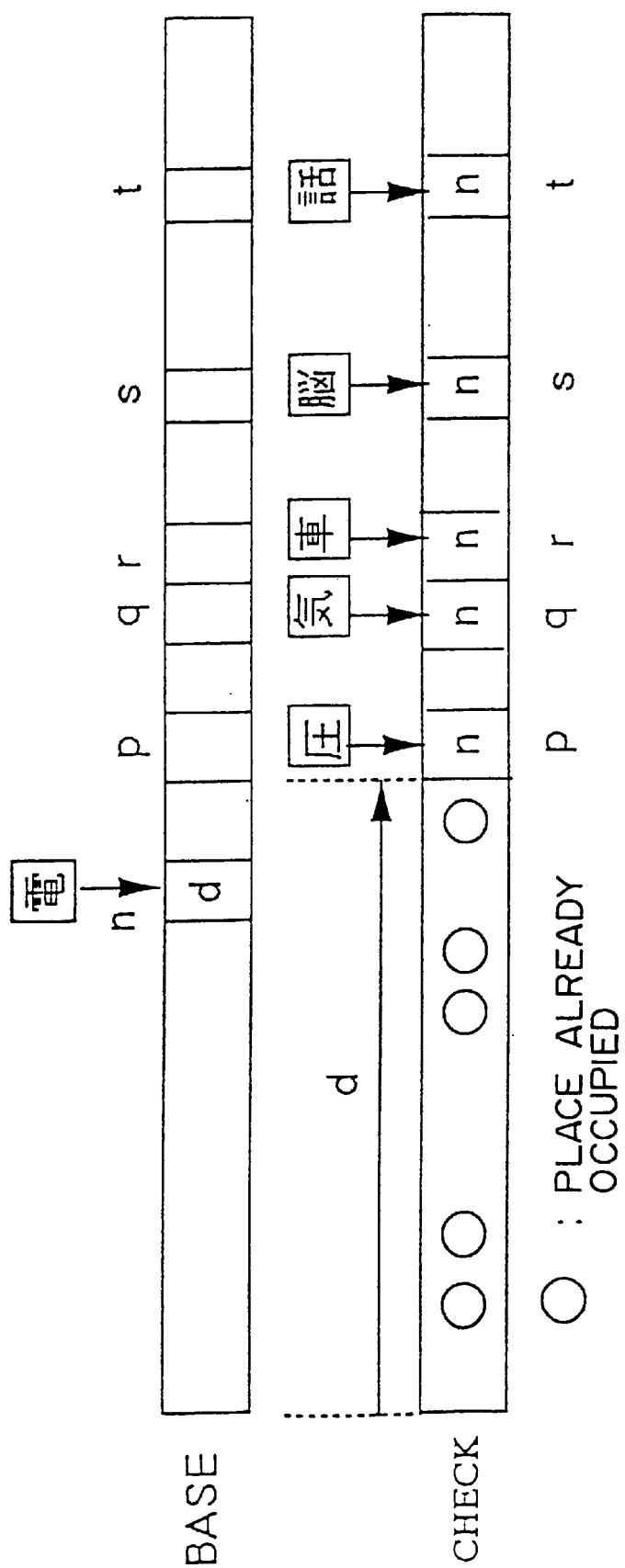
FIG. 1F shows an extended double-array.
Figure 1G:
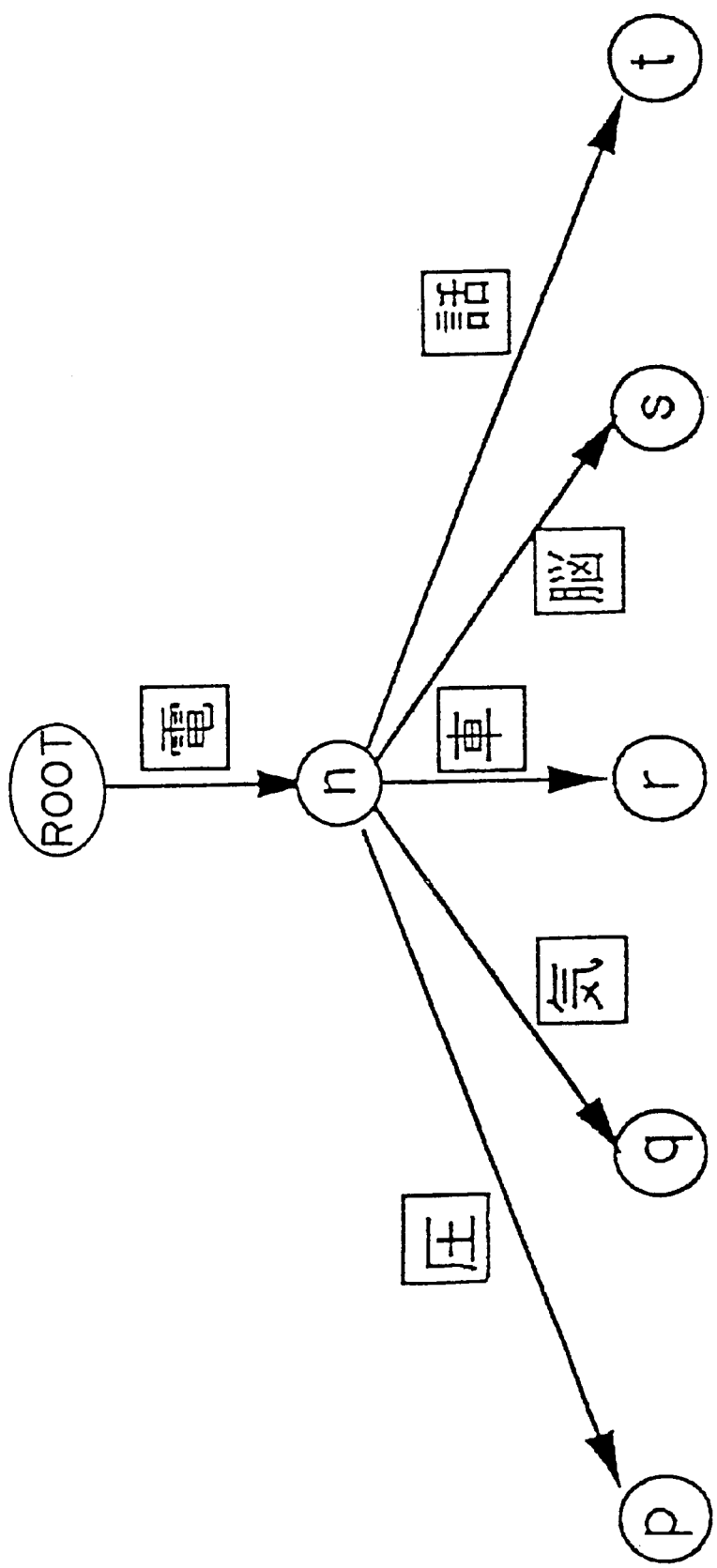
FIG. 1G shows an extended TRIE.

At this time, if the number of characters belonging to each group deviates narrowly, the characters are almost uniformly classified. If there is no group with an extremely large number of characters when calculating a displacement amount for each group, an appropriate destination can be easily found. For example, when the five Kanji characters shown in FIG. 1E are added, by registering the Kanji characters with a classification, the possibility of using empty positions on a CHECK can be enhanced, and thereby the extension of an array can be suppressed.

Furthermore, even when the number of following characters is not great, the appropriate destination of a character whose range of an internal representation value is out of a predetermined threshold can be easily found if the characters are classified and registered. Here, the internal representation value of a character corresponds to the value of the character code or an appropriate value calculated based on the value, and indicates a relative positional relation between characters in a code space. For example, by providing a reference point in the area 11 of FIG. 3A or the area 12 of FIG. 3B, a distance between the reference point and a position corresponding to a character can be used for the internal representation value.

Figure 12:
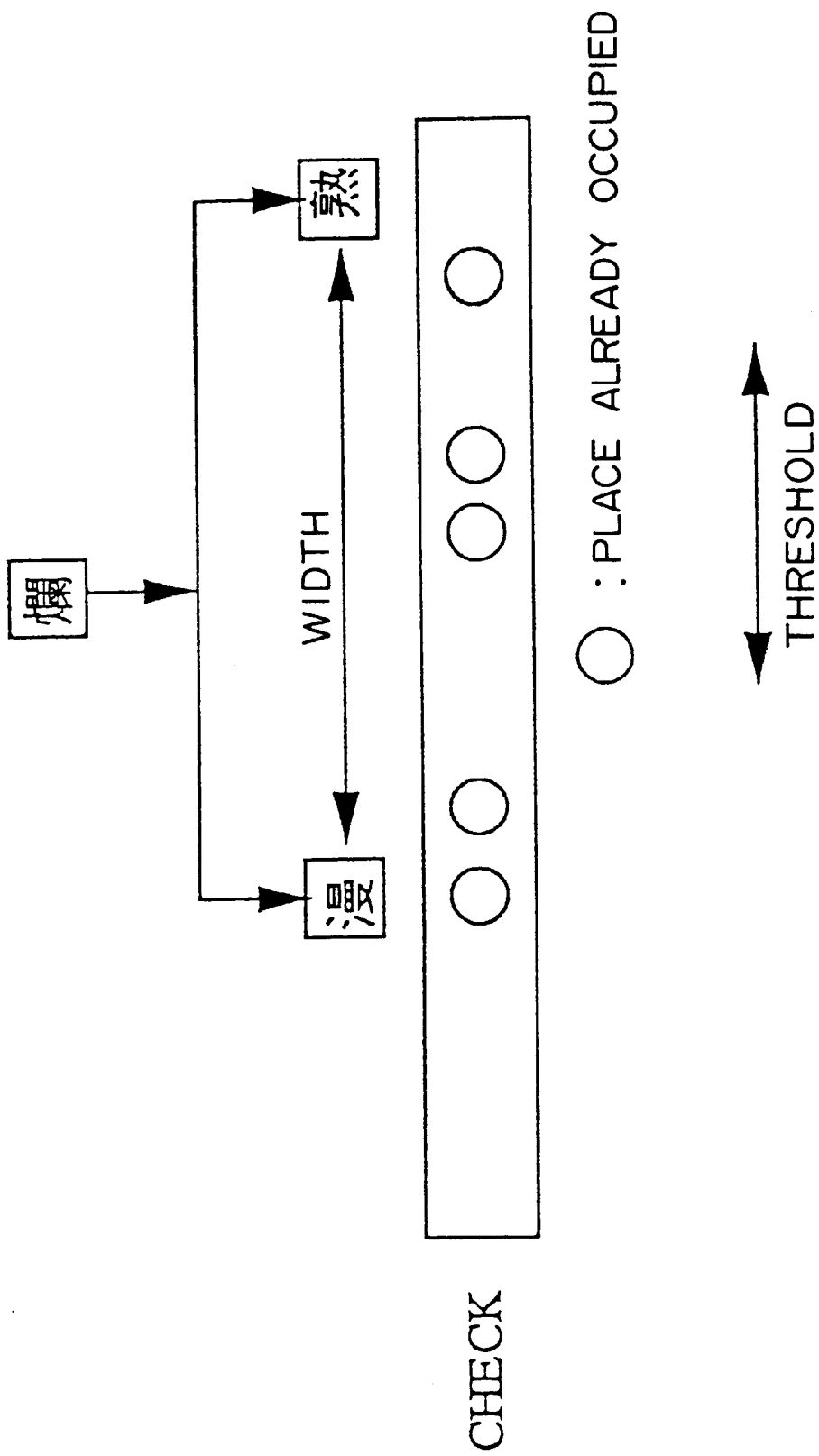
FIG. 12 shows a case where character intervals are wide.

FIG. 12 shows examples of such idioms. It is assumed here that, when two idioms of "爛漫" (in full bloom) and "爛熟" (overripe) are registered, a difference (width) in internal representation values between "漫" (spread) and "熟" (ripe) following "爛漫" (glory) is pretty large, and the characters are not accommodated in empty positions on a CHECK. In this case, in a conventional registration method, the characters are registered by extending the CHECK, while in the registration method of the present invention, empty positions on the CHECK can be used by registering "漫" and "爛漫" in different groups.

However, if the number of following characters is small and the maximum difference in internal representation value between the following characters is less than a threshold, the characters can also be registered as usual without classification.

Next, the configuration and process needed to register characters in a TRIE dictionary are described. FIG. 13 shows the configuration of a character string retrieval apparatus at the time of registration. The character string retrieval apparatus shown in FIG. 13 comprises a frequently-appearing Kanji list 51, a BASE array 52, a prefix register unit 53, a prefix selector unit 54, a BASE' array 55, an idiom dictionary 56, a classification unit 57, a classification result storage unit 58, a displacement amount calculator 59, a displacement amount storage unit 60, a registration position calculator unit 61 and a CHECK array 62.

Out of these, the frequently-appearing Kanji list 51, the BASE array 52, the prefix register unit 53, the BASE' array 55, the idiom dictionary 56, the classification result storage unit 58, the displacement amount storage unit 60 and the CHECK array 62 correspond to a specific memory area of the storage unit of a computer or digital data stored there. The prefix selector unit 54, the classification unit 57, the displacement amount calculator 59 and the registration position calculator 61 correspond to software components described by a program to process these data, and are stored in a specific program code segment of the storage unit of the computer.

The frequently-appearing Kanji list 51 is a list of Kanji characters frequently used in idioms, and the prefix selector 54 selects the number within a certain upper limit of prefixes with one or more Kanji characters contained in the frequently-appearing Kanji list 51. As shown in FIG. 12, the prefix selector 54 also selects prefixes with a wide interval between following characters as process targets in addition to the frequently-appearing Kanji characters.

The classification unit 57 determines the classification method of each of Kanji characters following the selected prefix while referring to the idiom dictionary 56 registering idioms to be processed. Then, the classification unit 57 classifies Kanji characters according the classification method, and stores the classification results in the classification result storage unit 58.

When registering the index of the prefix selected by the prefix selector unit 54 in the prefix register unit 53, the character string retrieval apparatus makes the range of the value of the serial number of a registration position have a meaning and indicates the classification method used to classify Kanji characters following each prefix. That is, different ranges of the value of a serial number are used according to the classification methods.

FIG. 14 shows an example of the registration content of the prefix register unit 53. Here, the positions of serial numbers 1 and 2 correspond to the classification method A shown in FIG. 4, and store the indexes of prefixes W1 and W2, respectively. Therefore, it is found that Kanji characters following each prefix have been classified by the classification method A.

The positions of serial numbers 3 and 4 correspond to the classification method B shown in FIG. 5, and store the indexes of prefixes "大" and W3, respectively. Therefore, it is found that Kanji characters following each prefix have been classified by the classification method B. The position of a serial number 5 corresponds to the classification method C shown in FIG. 6, and stores the index of a prefix W4. Therefore, it is found that Kanji characters following the prefix have been classified by the classification method C.

Here, if the first and second bytes of a JIS code are assumed to be x and y, respectively, x and y are expressed using a ku/ten code as follows.

$$x = (\text{ku code}) + 32 \quad (1)$$

$$y = (\text{ten code}) + 32 \quad (2)$$

For example, since the ku/ten code of "大" is (34, 71), the JIS code (x, y)=(66, 103). The internal representation value z corresponding to the JIS code is defined as follows.

$$z = ((\text{ku code}) - 1) * 94 + ((\text{ten code}) - 1) \quad (3)$$

In this case, the internal representation value of "大" becomes 3,172. Here, a prefix in a TRIE corresponds to a zero-order context next to a root node, and since the index of the zero-order context coincides with the internal representation value, the index of "大" registered in the prefix register unit 53 becomes 3,172.

After registering the prefix in the prefix register unit 53, the character string retrieval apparatus stores the serial number in the prefix register unit 53 or a corresponding value in a position on the BASE 52 having the index of the prefix as a subscript. Thus, a correspondence between each prefix and the serial number in the prefix register unit 53, in other words, a correspondence between each prefix and a classification method, is registered in the BASE 52.

Figure 15:
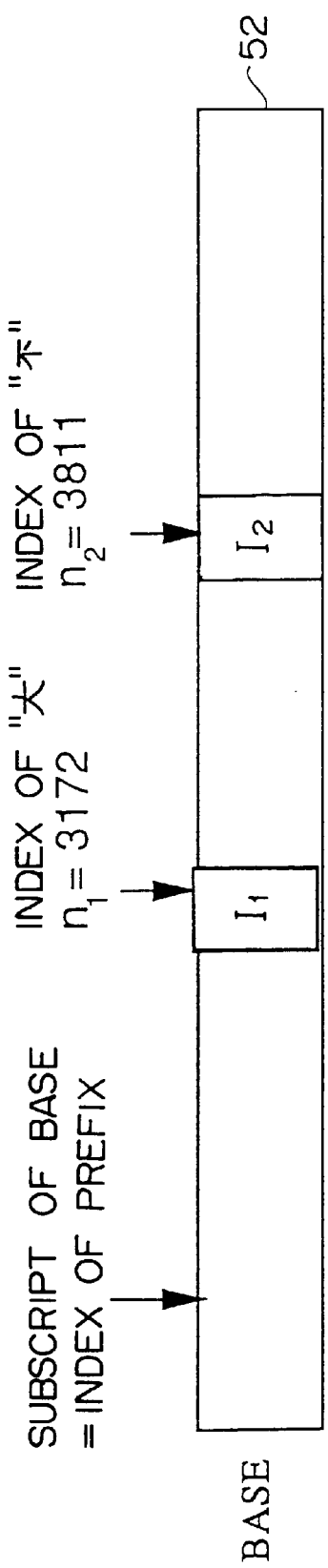
FIG. 15 shows an example of a BASE.

FIG. 15 shows an example of a BASE. The BASE 52 stores two kinds of numeric values according to a prefix. If the number of characters following the prefix is small and the maximum difference in an internal representation value between characters following a prefix is less than a threshold, classification registration is not performed and a conventional displacement amount is stored.

On the other hand, in the case of prefixes other than the above one, a serial number in a BASE' 55 corresponding to the serial number in the prefix register unit 53 is stored. In this example, serial numbers I1 and I2 in the BASE' 55 are stored in positions corresponding to the index 3,172 of the prefix "大" and the index 3,811 of another prefix "不", respectively.

For example, for a serial number in the BASE' 55, a value obtained by adding the serial number of the prefix register unit 53 to the size of the BASE 52 is used, and in the case of a prefix "大", $I_1$=size of BASE 52+3. Therefore, if the BASE 52 is set up within the range of 1 to 64,000 words, $I_1$=64,003.

Figure 16:
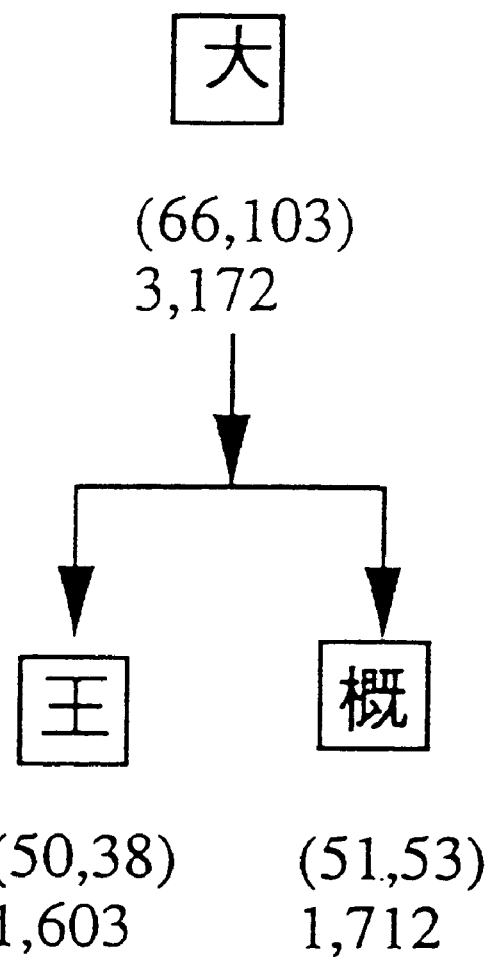
FIG. 16 shows a group ₱.
Figure 17:
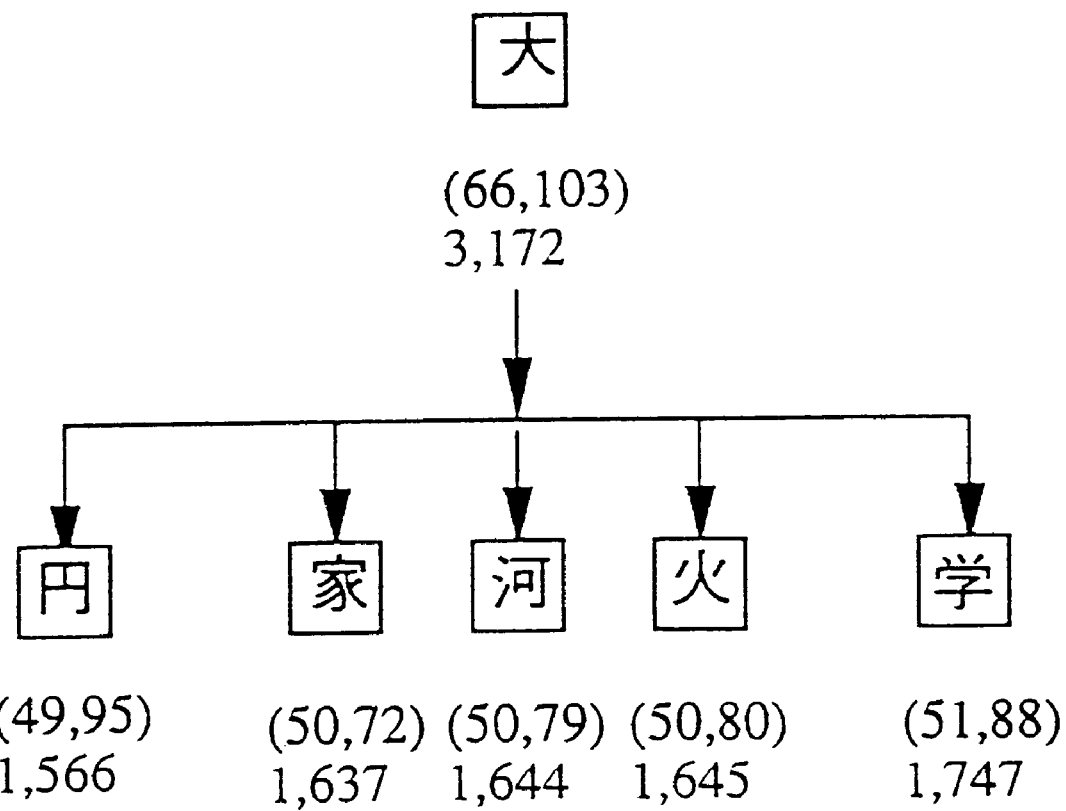
FIG. 17 shows a group ₱.
Figure 18:
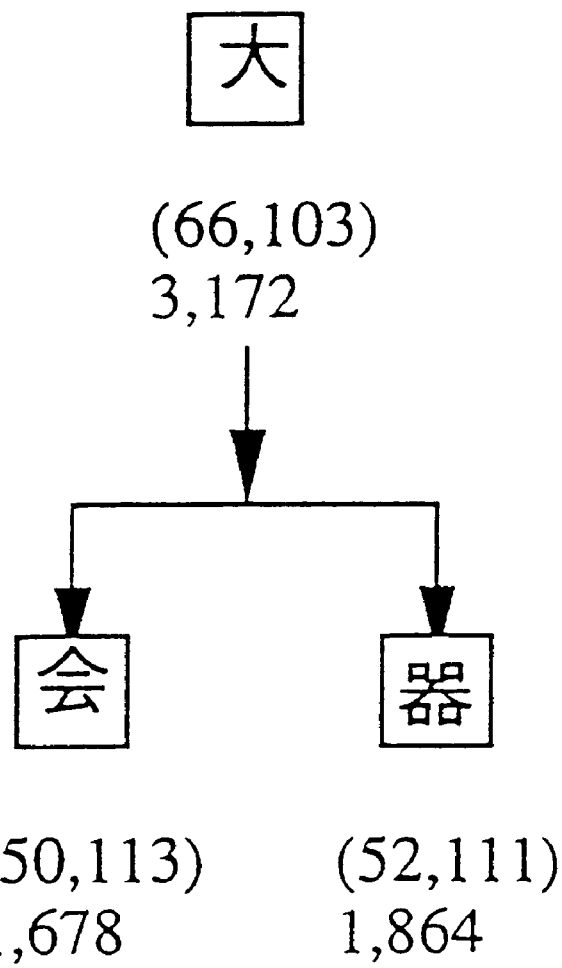
FIG. 18 shows a group ₱.

It is assumed that nine two-character idioms with "大" as a prefix, "大王" (great king), "大概" (generally), "大円" (great circle), "大家" (landlord), "大河" (great river), "" (big fire), "大学" (university), "大会" (mass meeting) and "大器" (a person of real caliber) are registered in the idiom dictionary 56. In this case, Kanji characters following "大" (great), "王" (king), "概" (general), "円" (circle), "家" (house), "河" (river), "火" (fire), "学" (study, school), "会" (meeting) and "器" (caliber) are classified into three groups as shown in FIGS. 16, 17 and 18 by the classification method B shown in FIG. 5.

In the classification method B, Kanji characters are classified based on the values of the second and third bits of the second byte. The second and third bits of Kanji characters " " and "概" of FIG. 16 are both "01", and these Kanji characters are classified into a group α. The second and third bits of Kanji characters, "円", "家", "河", "火" and "学" of FIG. 17 are both "10", and these Kanji characters are classified into a group β. The second and third bits of Kanji characters, "会" and "器" of FIG. 18 are both "11", and these Kanji characters are classified into a group γ.

These groups, α, β and γ correspond to the areas, 24, 25 and 26 of FIG. 5, respectively, and are stored in the classification result storage unit 58 as the classification results. In FIGS. 16, 17 and 18, numeric values described below each Kanji characters indicate the JIS code (x, y) of the expressions (1) and (2), and the internal representation value z of the expression (3). For example, the JIS code of a Kanji " 王 " shown in FIG. 16 is (50, 38), and the internal representation value is 1,603.

The displacement amount calculator unit 59 calculates the most appropriate displacement amount on the CHECK 62 for each group referring to the classification results, and stores the amount in the displacement amount storage unit 60. The registration position calculator unit 61 calculates the registration position of Kanji characters belonging to each group using the displacement amounts, and the character string retrieval apparatus registers the index of the prefix in the obtained registration position on the CHECK 62.

Figure 19:
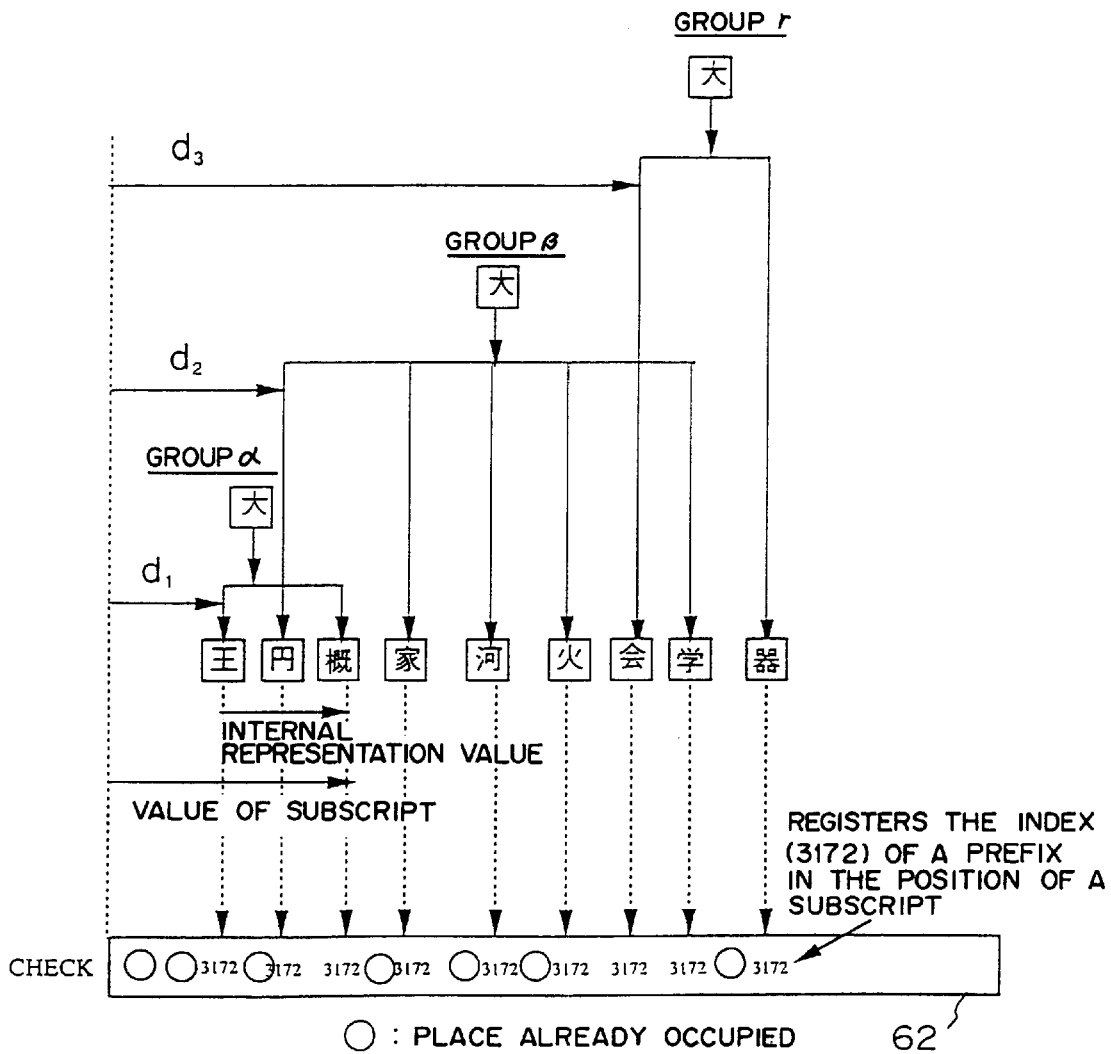
FIG. 19 shows the calculation process of a displacement amount for each group.

FIG. 19 shows the calculation process of a displacement amount for each group shown in FIGS. 16, 17 and 18. Here, the displacement amounts are calculated in an order of groups, α, β and γ. First, the displacement amount calculator unit 59 shifts in parallel two Kanji characters belonging to a group α, "王" and "概" on the CHECK 62, searches positions for registering them, and calculates a corresponding displacement amount $d_1$. The registration position calculator 61 adds the internal representation value of each Kanji to $d_1$, and calculates the subscripts of the registration positions.

Then, the displacement amount calculator unit 59 shifts in parallel the five Kanji characters belonging to a group β, "円", "家", "河", "火" and "学" on the CHECK 62, searches positions for registering them, and calculates a corresponding displacement $d_2$. The registration position calculator 61 adds the internal representation value of each Kanji to $d_2$, and calculates the subscripts of the registration positions.

Then, the displacement amount calculator unit 59 shifts in parallel the two Kanji characters belonging to a group γ, "会" and "器" on the CHECK 62, searches positions for registering them, and calculates a corresponding displacement $d_3$. The registration position calculator 61 adds the internal representation value of each Kanji to $d_3$, and calculates the subscripts of the registration positions.

Then, the character string retrieval apparatus registers the index of the prefix "大", 3,172 in the registration positions of all the Kanji characters belonging to the groups α, β and γ. For a prefix whose classification registration is not performed, the displacement amount calculator unit 59 calculates a displacement amount common to all the following Kanji characters, and the registration position calculator 61 adds the internal representation value of each Kanji to the displacement amount, and calculates the registration positions. By repeating such a process to all the prefixes, necessary Kanji characters can be registered on the CHECK 62.

Then, the character string retrieval apparatus stores the displacement amount of each group of a corresponding prefix in a position having the serial number stored in the BASE 52 as a subscript on the BASE' 55. For prefixes whose classification registration is not performed, the character string retrieval apparatus stores the displacement amounts in positions corresponding to the indexes of the prefixes on the BASE 52.

Figure 20:
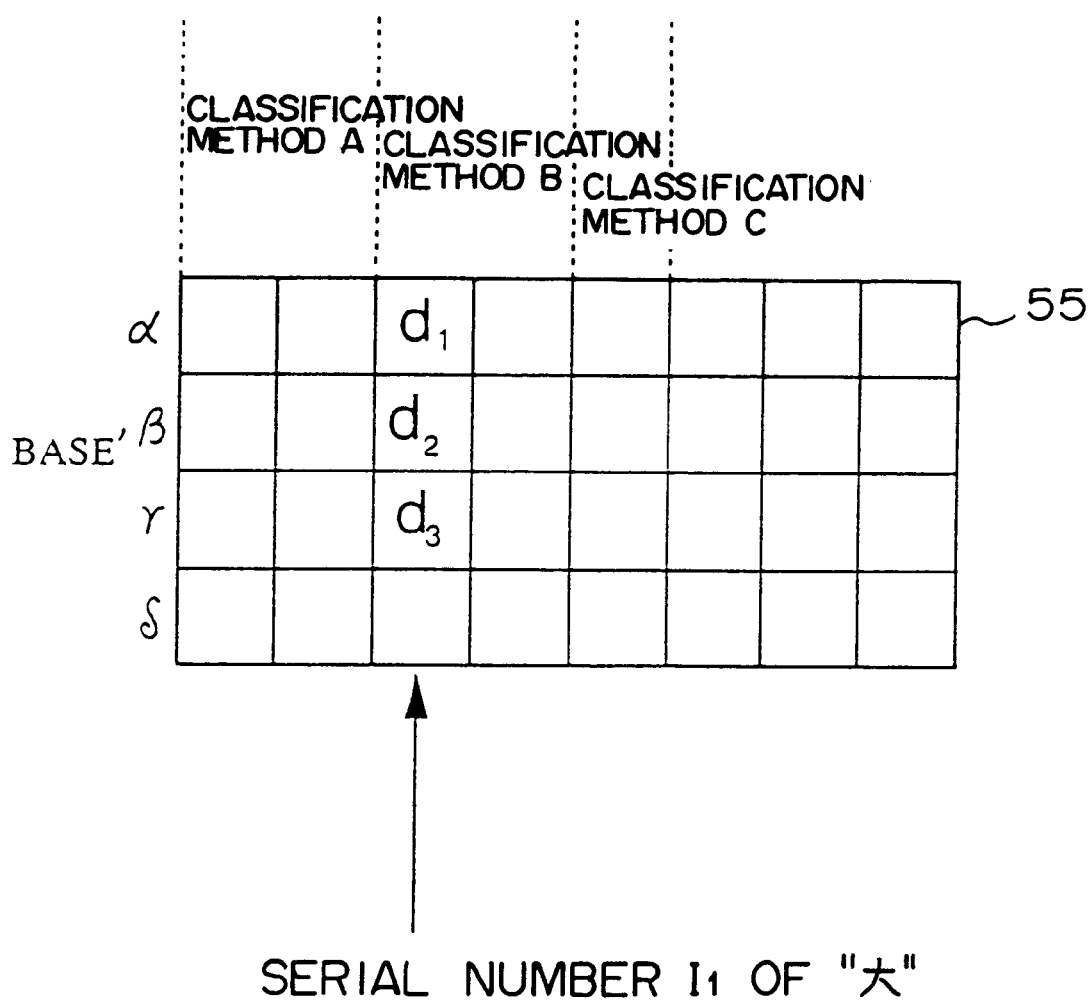
FIG. 20 shows an example of a BASE'.

FIG. 20 shows an example of a BASE' 55. The BASE' 55 shown in FIG. 20 indicates a classification method based on the range of the value of a subscript like the prefix register unit 53 shown in FIG. 14, and stores a unique displacement amount for each of the classified groups. For example, the displacement amounts, $d_1$, $d_2$ and $d_3$ of the above groups, α, β and γ, respectively, are stored in a position corresponding to the serial number $I_1$ of the Kanji "大" shown in FIG. 15, which shows that these groups are obtained by a classification method B.

Figure 13:
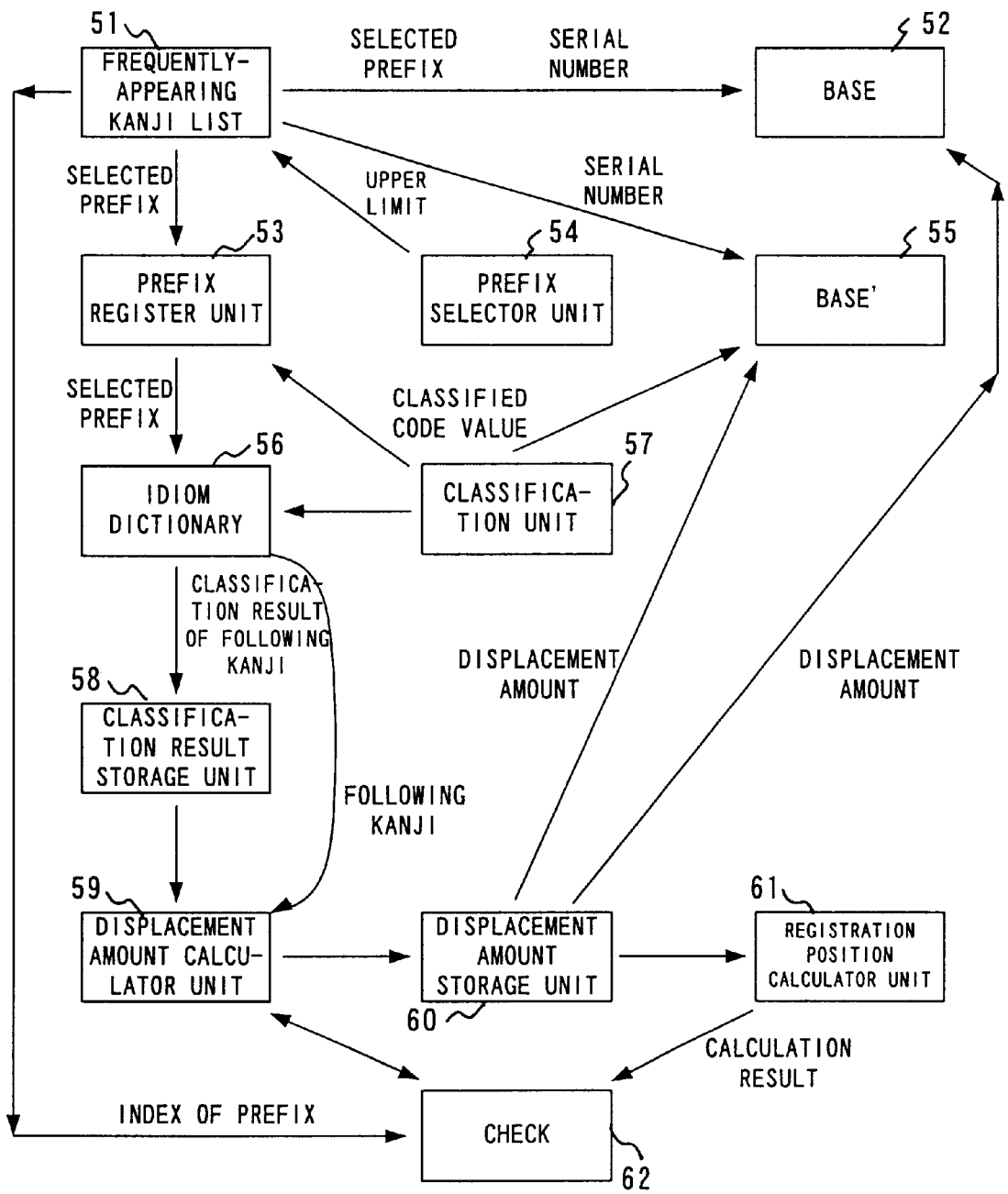
FIG. 13 shows the configuration of a character string retrieval apparatus at the time of registration.

In this way, by adopting the configuration shown in FIG. 13, Kanji characters following a prefix can be classified into a plurality of groups, and a classification method corresponding the prefix can be identified by the range of the value of the subscript of an array. Then, by providing a unique displacement amount for each group and overlapping those groups with each other, each Kanji can be provided with an empty registration position. Therefore, the extension of the CHECK 62 can be suppressed compared with a case where a certain displacement amount is provided with all Kanji characters following the prefix.

Figure 21:
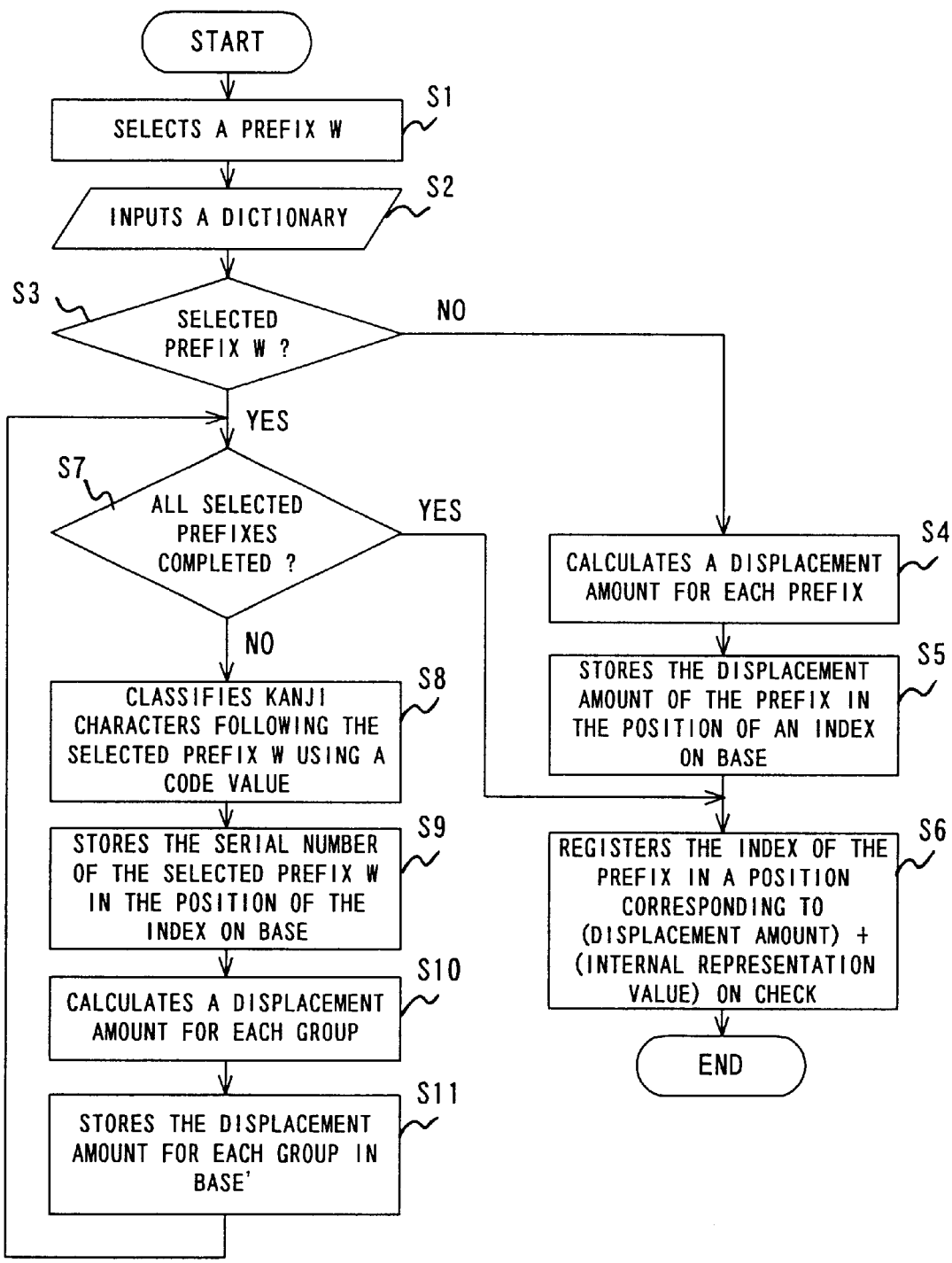
FIG. 21 is a flowchart showing a registration process.

FIG. 21 is a flowchart showing the registration process of the character string retrieval apparatus shown in FIG. 13. First, the prefix selector unit 54 selects one or more prefixes W according to an instruction from a user (step S1).

For example, approximately 500 kinds of Kanji characters used in 10 or more kinds of idioms are registered in a frequently-appearing Kanji list 51, and the prefix selector unit 54 selects Kanji characters to be processed out of these Kanji characters. The prefix selector unit 54 also selects prefixes with two or more characters, used in many idioms with three or more characters. For example, in idioms, such as "" (free competition), "自由主義" (liberalism), "自由時間" (free time), etc. "自由" (free) is selected as a prefix. Furthermore, prefixes with a wide character interval between following characters as shown in FIG. 12 are also selected, if necessary. Then, the indexes (internal representation values) of these prefixes are stored in the prefix register unit 53.

Then, the character string retrieval apparatus inputs a character string of an idiom from an idiom dictionary 56 containing Kanji characters to be registered in a TRIE dictionary (step S2), and judges whether or not a focused prefix in the input character string is the selected prefix W by referring to the prefix register unit 53 (step S3).

If the prefix is not the selected prefix W, the displacement amount calculator unit 59 calculates a displacement amount common to all the Kanji characters following the prefix (step S4), and the character string retrieval apparatus stores the displacement amount in a position corresponding to the index of the prefix on the BASE 52 (step S5). Then, the registration position calculator 61 adds the internal representation value of each Kanji to the displacement amount and calculates the registration position on the CHECK 62. The character string retrieval apparatus registers the index of the prefix in the registration position (step S6) and terminates the process.

When in step S3, a prefix W is detected from the input character string, the character string retrieval apparatus judges whether or not the input character string has been compared with all the prefixes (step S7). If the process is not completed for all the prefixes W, the classification unit 57 classifies Kanji characters following the detected prefix W based on the code values by referring to the idiom dictionary 56 (step S8). At this time, the character string retrieval apparatus determines a serial number corresponding to an adopted classification method, and re-stores the index of the prefix W in the prefix register unit 53 based on the serial number.

Then, the character string retrieval apparatus stores a serial number in the BASE' 55 assigned to the prefix, in a position corresponding to the index of the prefix W on the BASE 52 (step S9). Then, the displacement amount calculator unit 59 calculates the most appropriate displacement amount for each of the obtained groups by adding an arbitrary addition value to the internal representation value of each of the Kanji characters belonging to a group, checking a position on the CHECK 62 corresponding to each of the obtained addition results, and calculating the minimum out of the addition values in which all the addition results correspond to empty positions on the CHECK 62 and all the Kanji characters of the group are accommodated in empty areas (step S10). And the character string retrieval apparatus stores the obtained displacement amount in a position corresponding to the serial number stored in the BASE 52, in the BASE' 55 (step S11).

Then, when the character string retrieval apparatus repeats the processes of step S7 and after and completes comparing the input character string with all the prefixes W, the registration position calculator unit 61 adds the displacement amount of each group to the internal representation value of each Kanji, and calculates the registration position on the CHECK 62 (step S6). Then, the character string retrieval apparatus registers the index of the prefix in the registration position, and terminates the process.

By repeating such a process for all the idioms registered in the idiom dictionary 56, these idioms are registered in a TRIE dictionary including the BASE 52, BASE' 55 and CHECK 62. At this time, the registration position obtained in step S6 is used as the index of a next prefix in steps S5 and S9.

Figure 22:
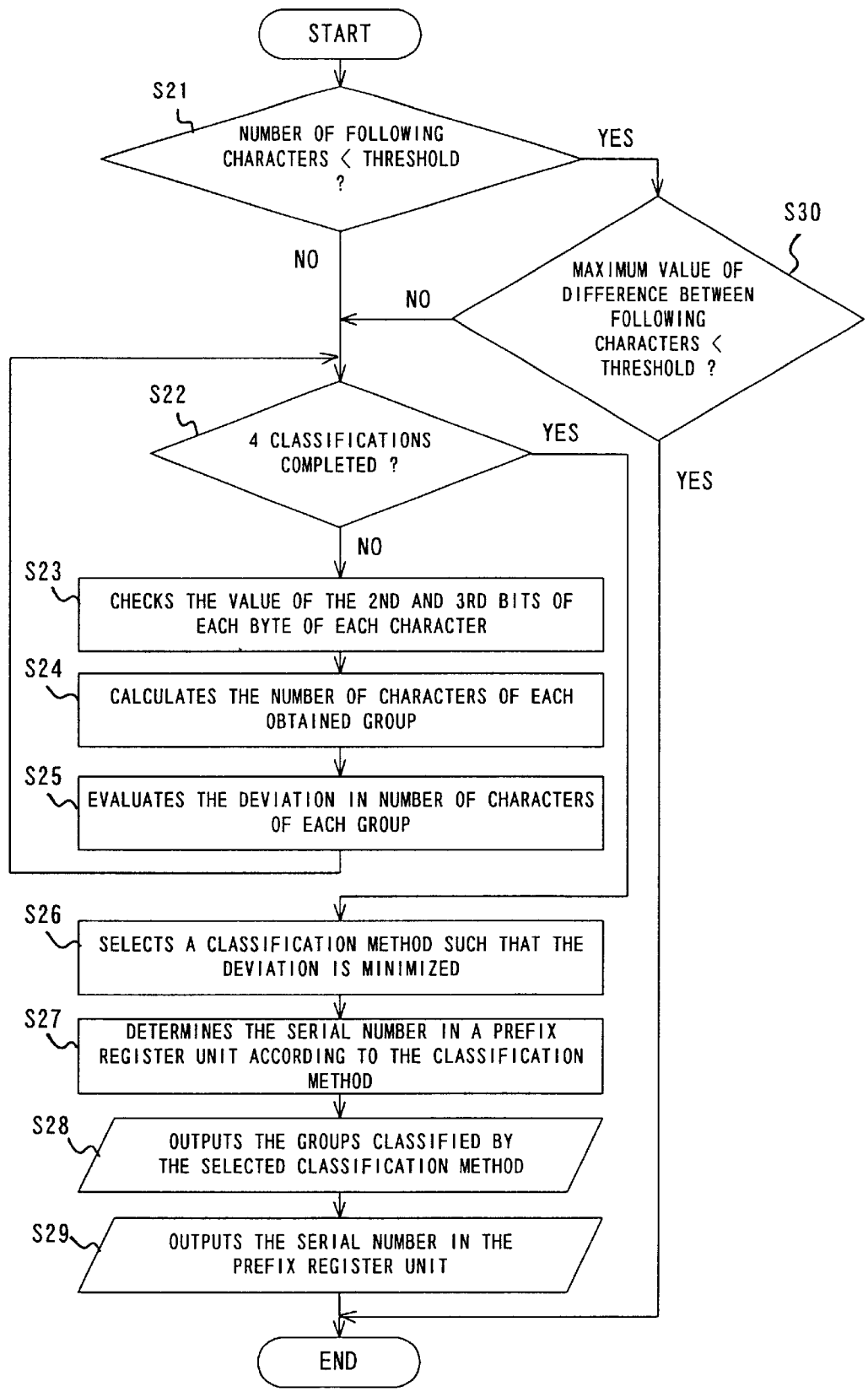
FIG. 22 is a flowchart showing a classification process.

FIG. 22 is a flowchart showing an example of a classification process executed in step S8 shown in FIG. 21. In this example, four kinds of classification methods shown in FIGS. 4, 5, 6 and 7, or FIGS. 8, 9, 10 and 11 are applied to a given aggregate of characters, the number of characters belonging to each of the obtained groups is calculated, and a classification method in which a deviation among the numbers becomes a minimum, is selected.

First, the classification unit 57 compares the number of characters following a prefix W with a predetermined threshold (step S21), and if the number equals or exceeds the threshold, then the classification unit 57 classifies these characters. In this example, first, whether or not all the four classification methods are completed, is judged (step S22), and if they are not completed, the classification unit 57 checks the values of the second and third bits of the first and second bytes of each character and classifies the characters according to a specific classification method (step S23).

Then, the classification unit 57 calculates the number of characters belonging to each of the obtained groups (step S24), and evaluates the deviation among the numbers (step S25). For the evaluation of the deviation, a statistical process based on the dispersion of the number of characters, a standard deviation, etc. is used.

If such a process is repeated for each classification method and is completed for the four classification methods, then the classification unit 57 selects a classification method in which the deviation among the numbers becomes a minimum (step S26). Then, the classification unit 57 determines the serial number in the prefix register unit 53 according to the selected classification method (step S27), outputs each group obtained by the classification method (step S28), outputs the serial number of the prefix register unit 53 (step S29), and terminates the process.

If in step S21, the number of characters following the prefix W is less than the threshold, then the classification unit 57 compares the maximum difference in internal representation value between those characters with the predetermined threshold (step S30). If the maximum difference equals or exceeds the threshold, the classification unit 57 classifies those characters executing the processes of step S22 and after. If the maximum difference is less than the threshold value, the classification unit 57 does not perform the classification and terminates the process.

The serial number in the prefix register unit 53 outputted in step S29 indicates an adopted classification method, is converted to the serial number in the BASE' 55 in step S9 shown in FIG. 21, and is stored in the BASE 52. Thus, information on the adopted classification method is stored in the BASE 52 and is used when an unknown input character string is retrieved in a TRIE dictionary.

Although the classification methods shown in FIGS. 4 through 11 are used here, generally speaking, an arbitrary classification method other than these can also be used, and classification methods to be targeted for the evaluation of a deviation are not limited to the four. Classification methods can also be designated by a user for each prefix.

Next, the configuration to retrieve and the process of retrieving a character string using a TRIE dictionary generated as described above are described.

FIG. 23 shows the configuration of a character string retrieval apparatus at the time of retrieval. The character string retrieval apparatus shown in FIG. 23 comprises the BASE array 52, the BASE' array 55, the classification unit 57, the displacement amount storage unit 60, the registration position calculator unit 61 and the CHECK array 62 shown in FIG. 13, a document input unit 71, a judgement unit 72, and a collation unit 73.

The document input unit 71, the judgement unit 72 and the collation unit 73 correspond to software components described by a program, and are stored in a specific program code segment of the storage unit of a computer.

The document input unit 71 inputs characters one by one from a given document. The judgement unit 72 extracts a registered value corresponding to the index of a prefix to be processed, and judges which of a serial number or a displacement amount the registered value indicates. If characters following the prefix are classified and registered, the registered value corresponds to the serial number, and if not, the registered value corresponds to the displacement amount.

If the registered value is a serial number, the classification unit 57 classifies the code values of the input character according to a corresponding classification method. The character string retrieval apparatus extracts a displacement amount corresponding to the group of the input character from the BASE' 55 based on the serial number, and stores the displacement amount in the displacement amount storage unit 60. If the registered value is a displacement amount, the character string retrieval apparatus stores the displacement amount in the displacement amount storage unit 60.

Then, the registration position calculator 61 extracts the displacement amount from the displacement amount storage unit 60, adds the internal representation value of the input character to the displacement amount, and calculates the registration position on the CHECK 62. Then, the collation unit 73 collates a numeric value registered in the position with the index of the prefix, and sets up a new prefix according to the collation result.

By repeating such a process, the characters in the document are collated with the characters of the TRIE dictionary one by one, and words registered in the dictionary are extracted in order. At this time, the existence/non-existence of a classification and the classification method are identified by referring to the registered value in the BASE 52, and the displacement amount of each group can be obtained by referring to the BASE' 55.

Figure 24:
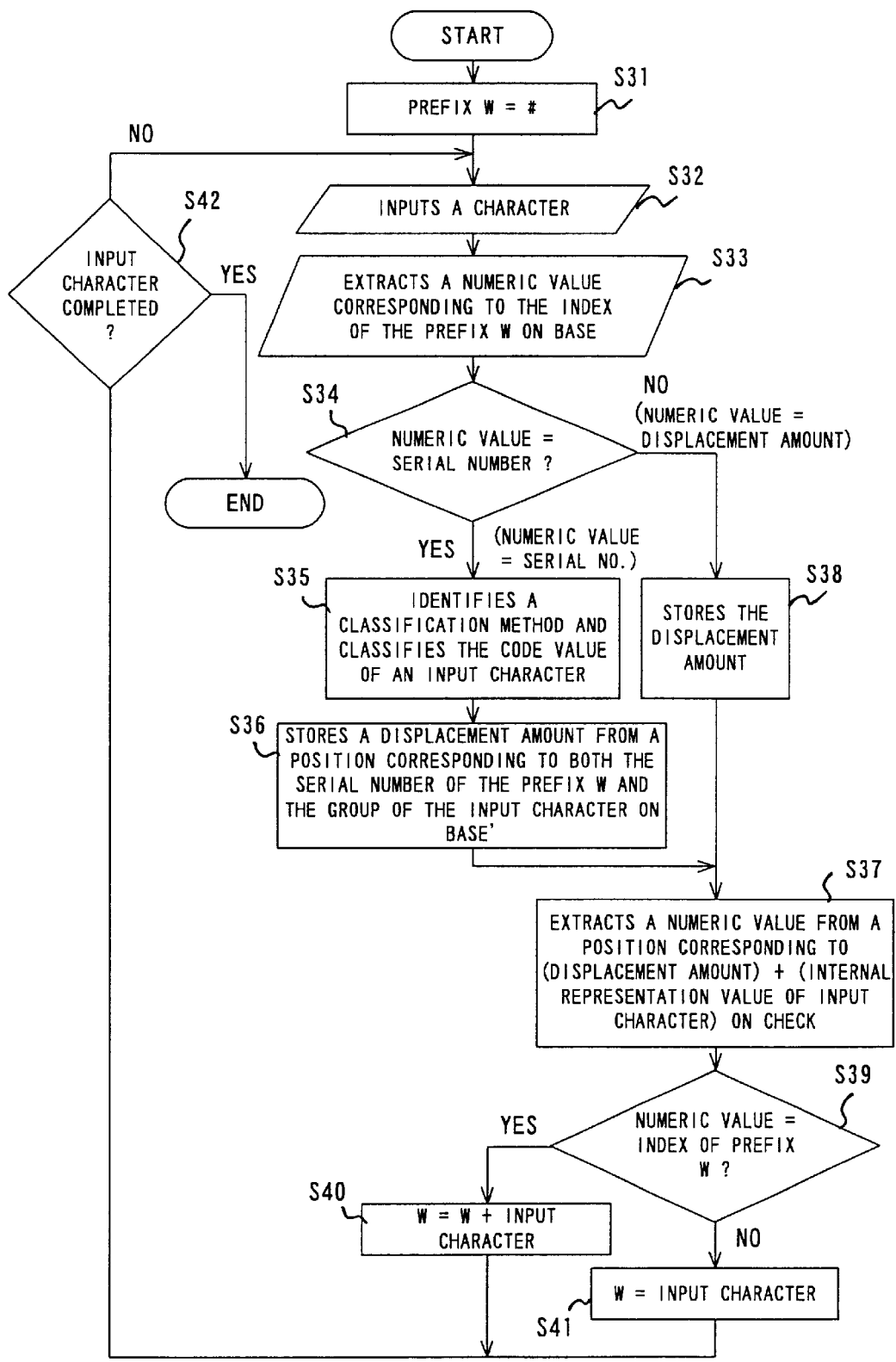
FIG. 24 is a flowchart showing a retrieval process.

FIG. 24 is a flowchart showing the retrieval process of the character string retrieval apparatus shown in FIG. 23. First, the character string retrieval apparatus sets up a "#" corresponding to the root node of a TRIE as a prefix W (step S31), and the document input unit 71 inputs a character to be processed from a document input by a user (step S32).

Then, the judgement unit 72 extracts a numeric value from a position corresponding to the index of the prefix W on the BASE 52 (step S33), and judges which of a serial number or displacement amount the numeric value indicates (step S34). If the numeric value extracted from the BASE 52 is equal to or less than the size of the BASE 52, the numeric value is regarded as a displacement amount, while, if the numeric value exceeds the size of the BASE 52, the numeric value is regarded as a serial number.

If the numeric value is a serial number, the classification unit 57 identifies the classification method from the value, classifies the code value of the input character according to a corresponding classification method, and calculates a group to which the input character belongs (step S35). Then, the character string retrieval apparatus extracts the displacement amount from a position corresponding to both the serial number of the prefix W and the group of the input character on the BASE' 55, and stores the displacement amount in the displacement amount storage unit 60 (step S36).

Then, the registration position calculator unit 61 adds the internal representation value of the input character to the obtained displacement amount, and calculates the registration position on the CHECK 62. The character string retrieval apparatus extracts the numeric value from the position (step S37). If in step S34, the numeric value is a displacement amount, the character string retrieval apparatus stores the displacement amount as it is in the displacement amount storage unit 60 (step S38), and executes the process of step S37.

Then, the collation unit 73 collates the numeric value extracted from the CHECK 62 with the index of the prefix W, with the numeric value as a key (step S39). If the numeric value coincides with the index of the prefix, it is regarded that a character string obtained by combining the prefix W and the input character is registered in the TRIE dictionary, and it sets up the character string for a new prefix W to check whether or not a further character string is registered (step S40).

If the numeric value on the CHECK 62 does not coincide with the index of the prefix W, it is regarded that a character string obtained by combining the prefix W and the input character is not registered in the TRIE dictionary, and it sets up only the input character as the prefix W (step S41). Thus, the input character becomes the leading character of a next word.

Then, the document input unit 71 judges whether or not the input of characters is completed (step S42), and when a next character is left, the document input unit 71 repeats the processes of step S32 and after. If no character is left, the document input unit 71 terminates the process.

When in step S32, a first character is inputted, a prefix W is "#", in step S40, the input character is automatically set up for the prefix W, and a next character is inputted. If the prefix W is a Kanji with one character and an input character is also a Kanji, there is a possibility that the prefix and the input character make a two-character idiom.

For example, if a Kanji "王" is inputted when a prefix W is "大", the judgement unit 72 extracts a registration value I1 from a position corresponding to the index of "大", 3,172 on the BASE 52 shown in FIG. 15 (step S33). It is found in this example that I1 is larger than the size of the BASE 52, and indicates the serial number of the BASE' 55 shown in FIG. 20.

Furthermore, it is found that I1 corresponds to a classification method B, and thus the classification unit 57 checks the second and third bits of the second byte of an input Kanji "王", and classifies the input Kanji according to the classification method B (step S35). As a result, it is found that this Kanji belongs to the group a shown in FIG. 16.

Then, the character string retrieval apparatus extracts a displacement amount $d_1$, from a position corresponding to both a serial number $I_1$, and a group α on the BASE' 55 shown in FIG. 20 (step S36). The registration position calculator unit 61 adds the internal representation value of the input character "自由主義", 1,603 to the displacement amount d1, and calculates a registration position on the CHECK 62 shown in FIG. 19 (step S37). Then, the collation unit 73 compares the numeric value registered in the position with the index of "大", 3,172 (step S39).

In this example, since the index of "大", 3,172 is registered in the registration position corresponding to the input Kanji "王", it is found that an idiom "大王" is registered in the TRIE dictionary. Then, "大王" is set up for a new prefix W (step S40), and it is checked whether or not a longer character string is registered.

When another Kanji, "気", "円", "家", "河", "火", "学", "会" or "器" succeeding a prefix "大" is inputted, in the same way a two-character idiom is recognized, and the idiom is set up for a new prefix W. When a prefix W is a Kanji with more than two characters, the same character string retrieval is performed.

Here, a case is taken where the sizes of a BASE and a CHECK are 64,000 words, the number of the serial numbers of a BASE' is 500 and the maximum number of groups is 4. At this time, if each displacement amount stored in the BASE' is one word, the necessary memory capacity of the BASE' becomes 2,000 words, which is only 1/64 of the total memory capacity of the BASE and CHECK. On the other hand, when in the conventional registration method both BASE and CHECK are extended, it is estimated that the necessary increment of a memory capacity will be far larger.

However, by adopting the classification registration of the present invention, the space area which cannot be occupied by the conventional method can be efficiently occupied, and the increase of the memory capacity of a double-array can be appropriately suppressed. Furthermore, at the time of retrieval, only when characters are classified and registered, only one step of referring to a BASE' is added, and the number of the entire process steps remains almost the same. Therefore, the high speed of retrieval using a double-array is hardly reduced.

Next, the character code registration retrieval apparatus of the present invention is described.

As shown in the BASE array configuration of FIG. 15, in the character code registration retrieval apparatus, two kinds of values are inputted in a BASE array. One value is a conventional parallel shift amount d, and this is applied to Kanji codes not frequently used (with a low use frequency). On the other hand, for frequently-appearing Kanji, codes $I_1$ and $I_2$ different from those values are registered. These $I_1$ and $I_2$ correspond to subscripts (serial numbers) for the horizontal direction of a second BASE array.

Figure 26:
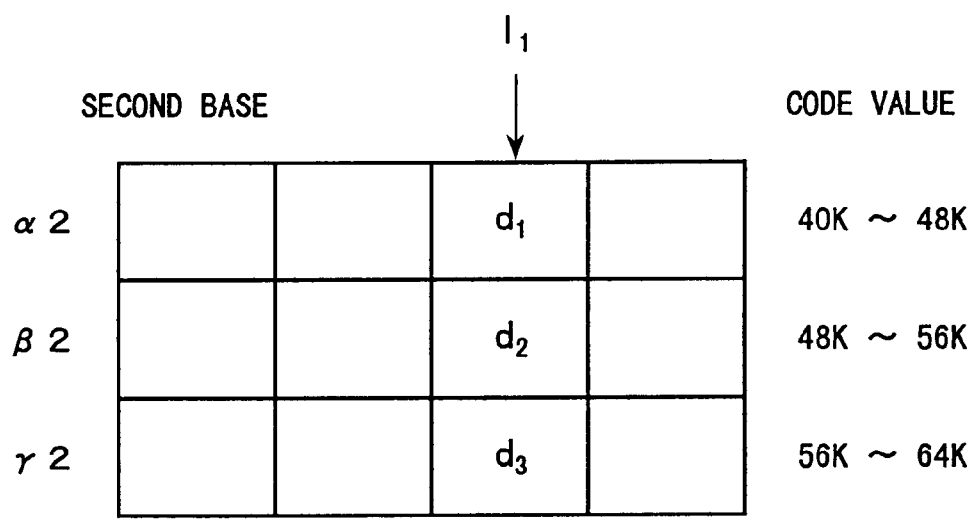
FIG. 26 shows the second BASE array in the case of an 8-bit code.

Next, FIGS. 25 and 26 show examples of the second BASE array. In FIG. 25, the area 11 shown in FIG. 3A is split into three blocks based on the code value, and Kanji codes are classified into three groups of α1, β1 and γ1. In FIG. 26, the area 12 shown in FIG. 3B is also split into three blocks based on the code value, and Kanji codes are classified into three groups of α2, β2 and γ2.

In this way, when the subscript of the second BASE array is determined, characters following a frequently-appearing Kanji code are classified into three groups according to the code value, each of which is provided with a unique parallel shift amount.

Figure 27:
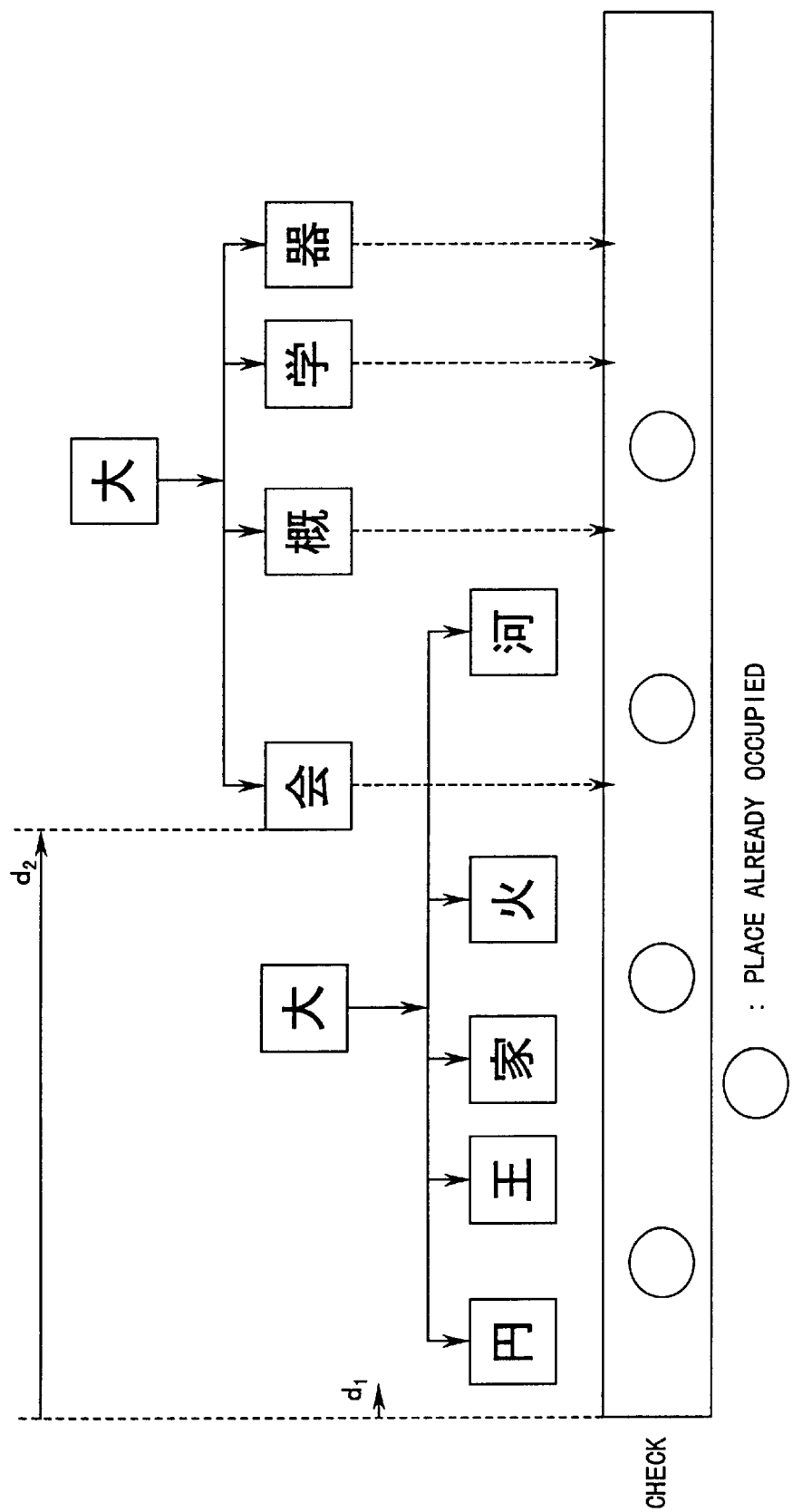
FIG. 27 shows a registration to a CHECK array.

Namely, as shown in the CHECK array configuration of FIG. 27, by providing unique parallel shift amounts $d_1$, $d_2$ and $d_3$ based on the code values (ranges, such as a 7-bit code or an 8-bit code) of character codes (that is, child nodes) following the same character (that is, a parent node) and overlapping the groups with each other on a CHECK array, each Kanji code can be provided with an empty registration position.

In other words, even Kanji codes "円", "王", "家", "火", "会", "河", "", "学" and "器" (child nodes) following the same characters "大" (parent node) are provided with unique parallel shift amounts d1 or d2 on the CHECK array based on the code values.

To be more specific, each child node of the Kanji codes "円", "王", "家", "火" and "河" following a parent node "大" is provided with a parallel shift amount d1 on the CHECK array, since these codes are included in 8K to 16K. In the same way, each child node of the Kanji codes "会", "概", "学" and "器" following the parent node "大" is provided with a parallel shift amount $d_2$, since these codes are included in 16K to 24K. In this way, by overlapping the Kanji codes "円", "王", "家", "火", "会", "河", "", "学" and "器" (child nodes) following the same character "大" (parent node) with each other on the CHECK array, each Kanji code can be provided with an empty registration position.

Thus, compared with a conventional case where a parallel shift amount is uniformly provided with each Kanji code on the CHECK array, the increase of the CHECK array can be suppressed and thereby the spatial efficiency of a double-array can be improved.

Figure 28:
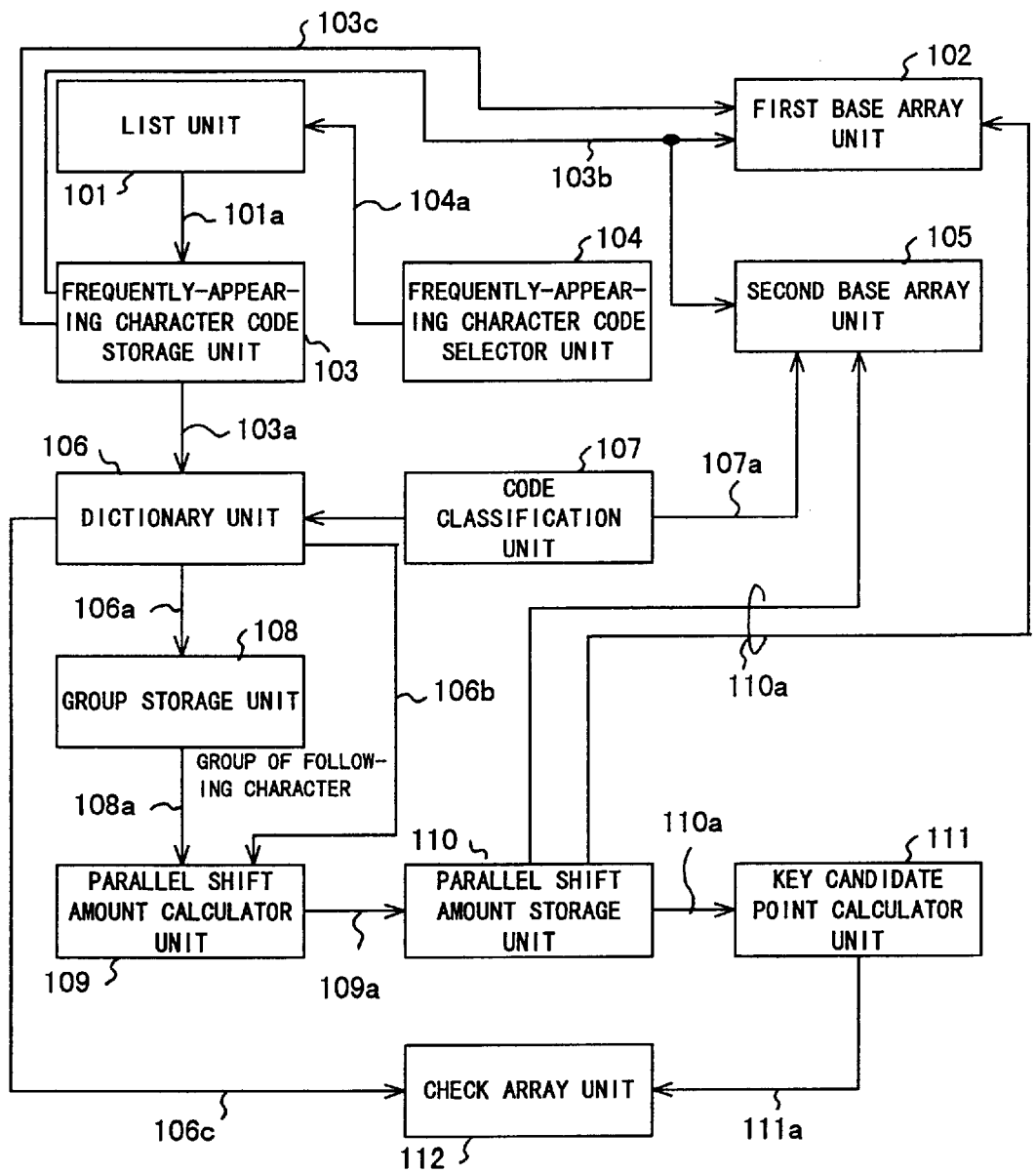
FIG. 28 shows the configuration of a first character code registration retrieval apparatus.

FIG. 28 shows the configuration of the first embodiment of the character code registration retrieval apparatus of the present invention.

The character code registration retrieval apparatus shown in FIG. 28 registers character strings, such as Kanji codes to be retrieved using a key in a double-array configuration being one-dimensional array of a data structure and thereby retrieves the character strings. The character code registration retrieval apparatus comprises a list unit 101, a frequently-appearing character code storage unit 103, a frequently-appearing character code selector unit 104, a dictionary unit 106, a group storage unit 108, a first BASE array unit 102 (a first array), a code classification unit 107, a parallel shift amount calculator unit 109, a parallel shift amount storage unit 110, a key candidate point calculator unit 111, a second BASE array unit 105 (a second array) and a CHECK array unit 112 (a third array). Each of these components are implemented by programming using a microcomputer.

The list unit 101 generates the list of Kanji codes frequently used in idioms, and outputs selection character codes 101 a selected from the list of Kanji codes.

The frequently-appearing character code selector unit 104 outputs a frequency threshold regarding up to what frequency order number of Kanji codes should be selected.

The frequently-appearing character code storage unit 103 stores the frequently-appearing character code selected by the list unit 101, and outputs the selected frequently-appearing character code 103a and the index 103c of the selected frequently-appearing character code.

The dictionary unit 106 is a character code dictionary registering idioms composed of Kanji codes, and classifies jobs based on whether or not a focused character is the prefix of an idiom based on the selected Kanji codes, and outputs each of groups 106a obtained by classifying a Kanji code following the frequently-appearing character code in the prefix. If the focused character is not such a prefix, the dictionary unit 106 outputs a group of Kanji 106b that follow the focused character.

The group storage unit 108 stores the groups 106a obtained by classifying a Kanji code following the frequently-appearing Kanji code in the prefix inputted from the dictionary unit 106.

The first BASE array unit 102 calculates the serial number 103b of the selected character code 101a, and simultaneously stores the serial number 103b in a position corresponding to the index 103c of the Kanji code on the first BASE array.

The code classification unit 107 classifies the second Kanji code of an idiom using several bits of the Kanji code in order to classify characters following the frequently-appearing Kanji code in the prefix.

The parallel shift amount calculator unit 109 calculates the minimum parallel shift amount 109a such as all of values obtained by adding an arbitrary parallel shift amount 109a to the code value of each Kanji code of the same group 108a for each of groups 108a outputted by the group storage unit 108 may indicate empty positions on the CHECK array. For Kanji code group 106b, the parallel shift amount calculator unit 109 calculates corresponding parallel shift amounts 109a.

The parallel shift amount storage unit 110 stores the parallel shift amounts 109a inputted from the parallel shift amount calculator unit 109 in subscript positions corresponding to the indexes of the prefix of the first BASE array unit 102 as parallel shift amounts 110a.

The key candidate point calculator unit 111 registers for each group the index of the prefix being the parent of the Kanji codes of the same group in a subscript position on the CHECK array, corresponding to the sum 111a of the parallel shift amount 110a inputted from the parallel shift amount storage unit 110 and the internal representation value of each Kanji code of the group, and designates the value of the sum for the index of a next prefix consisting of ((prefix)+focused character)).

The second BASE array 105 stores the parallel shift amounts 110a of each of the groups outputted by the parallel shift amount storage unit 110 based on both the code value 107a inputted from the code classification unit 107 and the serial number 103b inputted from the list unit 101.

The CHECK array unit 112 registers the index of the prefix 106c inputted from the dictionary unit 106 in a place corresponding to the sum 111a calculated by the key candidate point calculator unit 111 on the CHECK array.

As described above, in the character code registration retrieval apparatus shown in FIG. 28, by introducing, as a new data structure obtained by further developing a double-array structure being a one-dimensional array of a conventional high-speed and low capacity dictionary data, a new data structure having a CHECK array unit 112 for registering the index 106c of a prefix in a place corresponding to the sum of a parallel shift amount 110a and the internal representation value of each Kanji code on a CHECK array, a first BASE array unit 102 for calculating the serial number 103b of a selected Kanji code 101a and simultaneously storing the serial number 103b in the index 103c of the Kanji code on a first BASE array, and a second BASE array 105 for storing the parallel shift amount 110a of each group outputted by a parallel shift amount storage unit 110 based on both a code value 107a inputted from the code classification unit 107 and the serial number 103b inputted from a list unit 101, by generating two kinds of values to be registered in the first BASE array and applying one value to Kanji codes not frequently used (with a low use frequency) as a conventional parallel shift amount and the other value to frequently-appearing Kanji codes as one of subscripts of the second BASE array, and by classifying the characters following the prefix in the subscripts of the second BASE array into three kinds according to the code value of a character following the frequently-appearing Kanji code and providing each of the kinds with a unique parallel shift amount, each Kanji code can be provided with an empty registration position in such a way as the Kanji codes are overlapped with each other on the CHECK array. As a result, all the Kanji codes as keys can be registered in spaces on the CHECK array at one time with the extension of the CHECK array suppressed to the lowest possible level, all the Kanji codes can also be registered with a relative positional relation between the Kanji codes following a certain Kanji code maintained and with the extension of the CHECK array suppressed to the lowest possible level, and furthermore the occurrence of sparse areas can be avoided as much as possible. Thus, a dictionary storing quasi-static key aggregates consisting of known keys as retrieval targets can be generated, and the memory capacity of a TRIE array structure which can be extended later by properly adding and registering keys, can be minimized.

Figure 29:
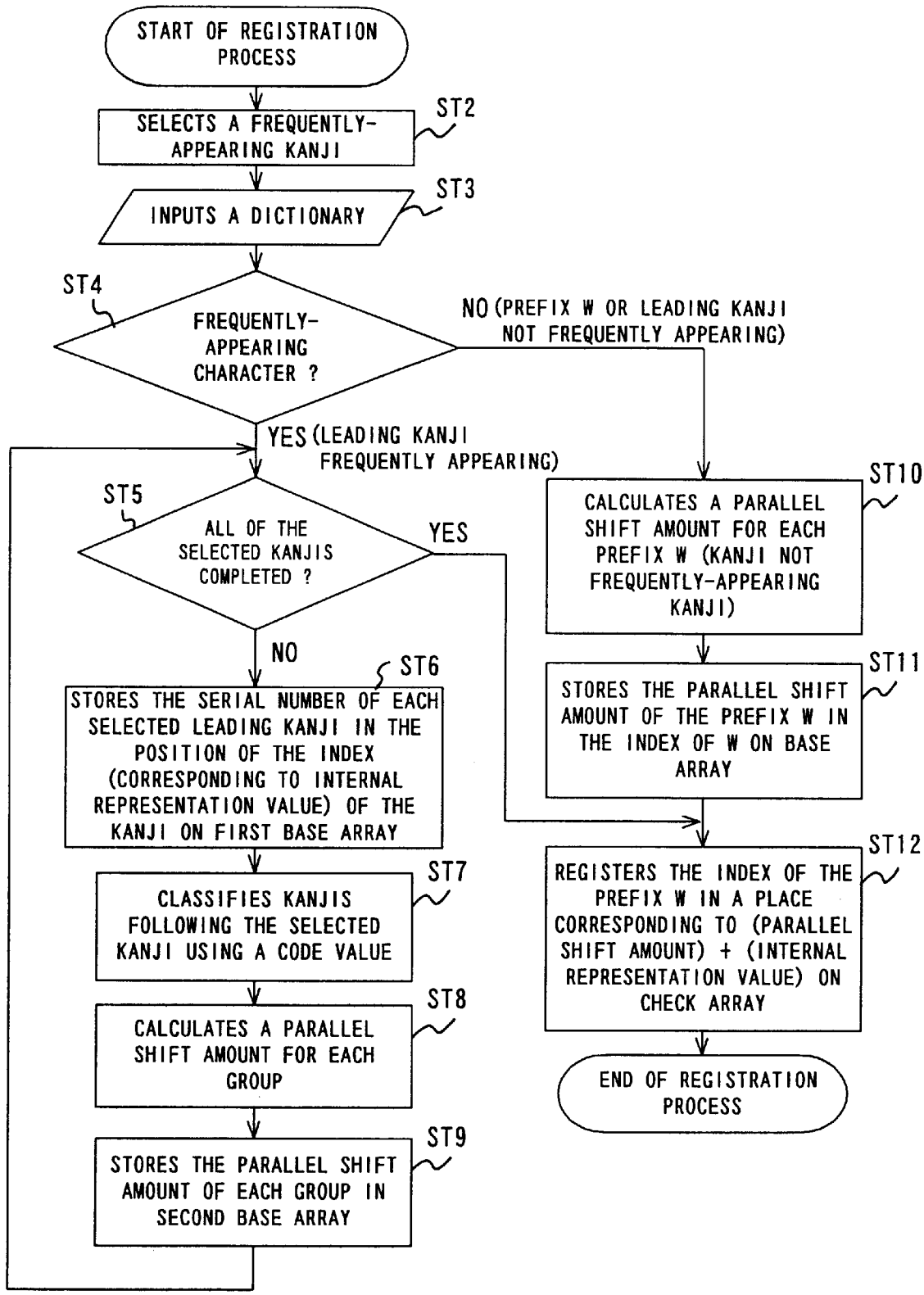
FIG. 29 is a flowchart explaining a first character code registration method.

FIG. 29 is a flowchart explaining one preferred embodiment of a Kanji code registration using a character code registration retrieval method implemented in the character code registration retrieval apparatus shown in FIG. 28.

The preferred embodiment of the character code registration retrieval method shown in FIG. 29 is implemented in the character code registration retrieval apparatus shown in FIG. 28, and logically comprises step ST2 including a list step, a frequently-appearing character code selection step and a frequently-appearing character code storage step, a dictionary step (step ST3), a classification result storage step (step ST9), a first BASE array step (a first array step) (steps ST6 and ST11), a code classification step (step ST7), a parallel shift amount calculation step (steps ST8 and ST10), a parallel shift amount storage step (steps ST8, ST10 and ST11), a key candidate point calculation step (steps ST9 and ST12), a second BASE array step (a second array step) (step ST9) and a CHECK array step (a third array step) (step ST12), which are described using a program code applicable to the character code registration retrieval apparatus.

The list step (step ST2) generates the list of Kanji codes frequently used in idioms and outputs selection Kanji codes 101a selected from the list of the Kanji codes, which is a step mainly executed by a list unit 101.

The frequently-appearing character code selection step (step ST2) outputs a frequency threshold regarding up to what order number of Kanji codes should be selected, which is a step mainly executed by a frequently-appearing character code selector unit 104.

The frequently-appearing character code storage step (step ST2) stores frequently-appearing Kanji codes selected in the list step (step ST2), and outputs both the selected frequently-appearing character code 103a and the index 103c of the selected frequently-appearing character codes, which is a step mainly executed by a frequently-appearing character code storage unit 103.

The dictionary step (step ST3) is a character code dictionary registering idioms composed of Kanji codes, which classifies a job according to whether or not a focused character is the prefix of an idiom based on a selected Kanji code, and outputs groups 106a obtained by classifying a Kanji code following the frequently-appearing Kanji code in the prefix, which is a step mainly executed by a dictionary unit 106.

The classification result storage step (step ST9) stores a group 106a obtained by classifying a Kanji code following the frequently-appearing Kanji code in the prefix generated by the dictionary step (step ST3), which is a step mainly executed by a group storage unit 108.

The first BASE array step (steps ST6 and ST11) calculates the serial number 103b of a selected character code 101a, and simultaneously stores the serial number in the index 103c of the Kanji code on the first BASE array, which is a step mainly executed by a first BASE array unit 102.

The code classification step (step ST7) classifies the second Kanji code of an idiom using several bits of the Kanji code in order to classify characters following the frequently-appearing Kanji code in the prefix, which is a step mainly executed by a code classification unit 107.

The parallel shift amount calculation step (steps ST8 and ST10) calculates a minimum parallel shift amount 109a so that each of values obtained by adding an arbitrary parallel shift amount 109a to the internal representation value of each Kanji code may indicate an empty position on the CHECK array, which is a step mainly executed by a parallel shift amount calculator unit 109.

The parallel shift amount storage step (steps ST8, ST10 and ST11) stores the parallel shift amount 109a generated in the parallel shift amount calculation step (steps ST8 and ST10), in a subscript position corresponding to the index of the prefix of the first BASE array unit 102 as a parallel shift amount 110a, which is a step mainly executed by a parallel shift amount storage unit 110.

The key candidate point calculation step (steps ST9 and ST12) registers the index of the prefix being the parent of the Kanji codes of the group in a subscript position on the CHECK array, corresponding to the sum of the parallel shift amount 110a inputted in the parallel shift amount storage step (steps ST8, ST10 and ST11) and the internal representation value of each Kanji code of the group, and designates the value of the sum for the index of a next prefix consisting of ((prefix)+focused character)), which is a step mainly executed by a key candidate point calculator unit 111.

The second BASE array step (step ST9) stores the parallel shift amount 110a of each group outputted in the parallel shift amount storage step (steps ST8, ST10 and ST11) based on both the code value 107a generated in the code classification step (step ST7) and the serial number 103b generated in the list step (step ST2), which is a step mainly executed by a second BASE array unit 105.

The CHECK array step (step ST12) registers the index of a prefix 106c in a place on the CHECK array corresponding to the sum 111a calculated in the key candidate point calculation step, which is a step mainly executed by a CHECK array unit 112.

As described above, in the preferred embodiment of the character code registration retrieval method shown in FIG. 29, by introducing, as a new data structure obtained by further developing a double-array structure being an one-dimensional array of a conventional high-speed low capacity dictionary data structure, a new data structure generated by executing the CHECK array step (step ST12) of registering the index 106c of a prefix in a place on the CHECK array corresponding to the sum of the parallel shift amount 110a and the code value of each Kanji code, the first BASE array step (steps ST6 and ST11) of calculating the serial numbers 103b of a selected Kanji code 101a and simultaneously storing the serial number in the indexes 103c of the Kanji code on the first BASE array and the second BASE array step (step ST9) of storing the parallel shift amount 110a of each of groups outputted in the parallel shift amount storage step (steps ST8, ST10 and ST11), and by designating two kinds of values to be registered in the BASE array and applying one value to Kanji codes not frequently used (with a low use frequency) as a conventional parallel shift amount and the other value to frequently-appearing Kanji codes as one of the subscripts of the second BASE array, and by classifying the characters in the subscripts of the second BASE array into three kinds based on the code value of a character following a frequently-appearing Kanji code and providing each kind with a unique parallel shift amount, each Kanji code can be provided with an empty registration position on the CHECK array. As a result, all the Kanji codes as keys can be registered in spaces on the CHECK array at one time, with the extension of the CHECK array suppressed to the lowest possible level, all the Kanji codes can also be registered with relative positional relations between the Kanji codes following a certain Kanji code maintained and with the extension of the CHECK array suppressed to the lowest possible level, and furthermore the occurrence of sparse areas can be avoided as much as possible. Thus, a dictionary storing quasi-static key aggregates consisting of known keys as retrieval targets can be generated, and thereby the memory capacity of a TRIE array structure which can be extended later by properly adding and registering keys, can be minimized.

FIG. 30 shows the configuration of the second embodiment of the character code registration retrieval apparatus of the present invention.

The character code registration retrieval apparatus shown in FIG. 30 registers character strings, such as Kanji codes to be retrieved using keys, in a double-array structure being an one-dimensional array of a data structure, and thereby retrieves character strings. The character code registration retrieval apparatus mainly comprises a document input unit 201, a first BASE array unit 102, a registration value judgement unit 202, a code classification unit 107, a second BASE array unit 105, a parallel shift amount storage unit 110, a key candidate point calculator unit 111, a CHECK array unit 112 and a key/prefix collation unit 203. Each of these components are implemented by programming using a microcomputer.

The document input unit 201 first designates the root of a TRIE structure for a prefix, simultaneously sets up an end mark # in a prefix W as an end symbol, then instructs to input a Kanji code b as a character to be retrieved, and detects the prefix W of the inputted Kanji code b.

The document input unit 201 outputs the index 201a of the prefix W or a Kanji code, extracts a numeric value 102a from a corresponding place on a first BASE array, and inputs the numeric value 102a in a registration judgement unit 202.

The registration value judgement unit 202 judges whether a numeric value 102a inputted from the first Base array unit 102 is the serial number of a frequently-appearing prefix character code or a parallel shift amount. If the numeric value 102a is out of the range of an index composing a TRIE, the registration value judgement unit 202 outputs this numeric value 102a as the serial number 202a of the frequently-appearing character code, and if the numeric value 102a inputted from the first BASE array unit 102 is within the range of the index, it outputs the numeric value 102a as a parallel shift amount 202b.

If the serial number 202a of the frequently-appearing prefix character code is outputted, the code classification unit 107 classifies a Kanji code b following this leading Kanji using several bits of the Kanji code.

The second BASE array unit 105 outputs a parallel shift amount 105a from a place corresponding to the serial number 202a of a frequently-appearing character code outputted from a registration value judgement unit 202 and the group of code value of the Kanji code b, on the second BASE array.

The parallel shift amount storage unit 110 stores a parallel shift amount 202b outputted from the registration value judgement unit 202 or a parallel shift amount 105a outputted from the second BASE array unit 105, and outputs the parallel shift amount 202b or 105a as a parallel shift amount 110a.

The key candidate point calculator unit 111 calculates and outputs the sum 111a of the parallel shift amount 110a and the internal representation value of a following character b.

The CHECK array unit 112 extracts a numeric value in a place corresponding to the sum 111a outputted from the key candidate point calculator unit 111 as a key on the CHECK array, and inputs the numeric value to the key/prefix collation unit 203.

The key/prefix collation unit 203 judges whether or not the key inputted by the CHECK array unit 112 coincides with the index 201a of a prefix character internal representation value or the prefix W, and if the inputted key coincides with the index 201a of a prefix character internal representation value or the prefix W, it judges that the idiom is registered in the dictionary.

As described above, in the character code registration retrieval apparatus shown in FIG. 30, by introducing, as a new data structure obtained by further developing a double array structure being an one-dimensional array of a conventional high-speed low-capacity dictionary data structure, a new data structure having a CHECK array unit 112 for extracting a key from a place corresponding to the sum 111a outputted from a key candidate point calculator unit 111, a first BASE array unit 102 for outputting a numeric value 102a from a place corresponding to the index 201a of a prefix W or a Kanji internal representation value and a second BASE array unit 105 for outputting a parallel shift amount 105a from a place corresponding to both the serial number 202a of a frequently-appearing character code outputted by a registration value judgement unit 202 and the classification of the code value of a Kanji code b, a dictionary storing predetermined quasi-static key aggregates as retrieval targets can be generated, and thereby the memory capacity of a TRIE array structure which can be extended later by properly adding and registering keys, can be suppressed to the lowest possible level. As a result, keys can be stored in a double-array structure (that is, a TRIE array structure) being the one-dimensional array of a data structure with the minimum memory capacity, and the pattern matching can be performed in high speed by using this TRIE array structure as a retrieval key.

Figure 31:
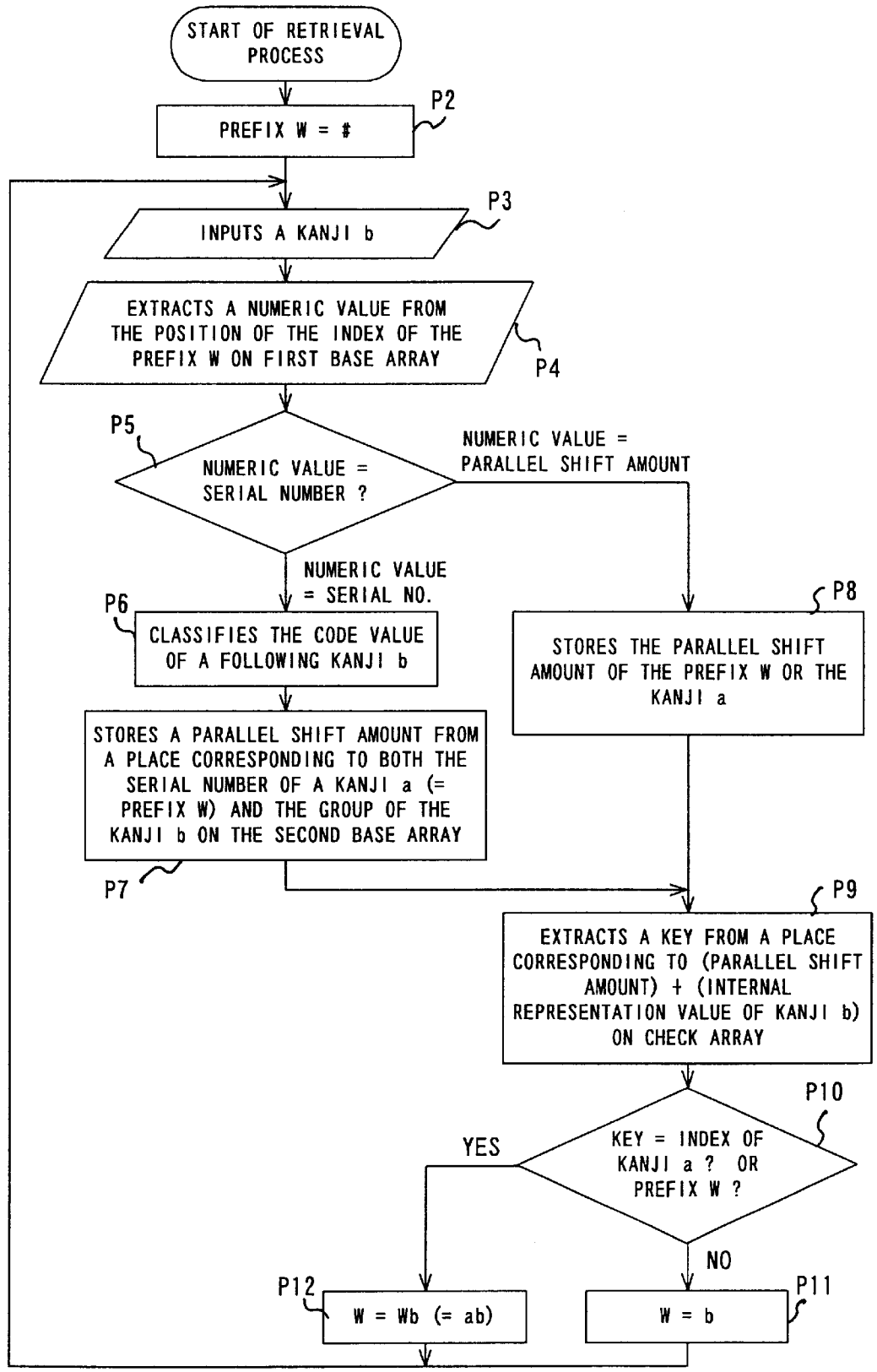
FIG. 31 is a flowchart explaining a second character code registration method.

FIG. 31 is a flowchart explaining one preferred embodiment of a Kanji code retrieval using a character code registration retrieval method implemented by the character code registration retrieval apparatus shown in FIG. 30.

The preferred embodiment of the character code registration retrieval method shown in FIG. 31 is implemented by the character code registration retrieval apparatus shown in FIG. 30. The character code registration retrieval method mainly comprises a document input step (steps P2 and P3), a first BASE array step (step P4), a registration value judgement step (step P5), a code classification step (step P6), a second BASE array step (step P7), a parallel shift amount storage step (steps P7 and P8), a key candidate point calculation step (step P9), a CHECK array step (step P9) and a key/prefix collation step (steps P10, P11 and P12). Each of these components are implemented by programming using a microcomputer.

The document input step (steps P2 and P3) first designates the root of a TRIE structure for a prefix, simultaneously sets up an end mark # in a prefix W as an end symbol, and then instructs to input a Kanji code b as a character to be retrieved, and detects the prefix W of the inputted Kanji code b, which is a step mainly executed by the document input unit 210.

The first BASE array step (step P4) extracts a numeric value 102a from a place corresponding to the index 201a of a prefix W or the Kanji internal representation value on a first BASE array, which is a step mainly executed by the first BASE array unit 102.

The registration value judgement step (step P5) judges whether a numeric value 102a generated in the first BASE array step (step P4) is the serial number of a frequently-appearing prefix character code or a parallel shift amount. If the given numeric value 102a is out of the range of indexes composing a TRIE, it outputs this numeric value 102a as the serial number 202a of the frequently-appearing character code, and if the numeric value 102a generated in the first BASE array step (step P4) is within in the range of indexes, it outputs the numeric value 102a as a parallel shift amount 202b, which is a step mainly executed by the registration value judgement unit 202.

If the numeric value 102a extracted in the first BASE array step (step P4) is the serial number 202a of the frequently-appearing character code, the code classification step (step P6) classifies the Kanji code b following this leading Kanji using several bits of the Kanji code, which is a step mainly executed by the code classification unit 107 in order to classify the characters following the frequently-appearing Kanji code in the prefix.

The second BASE array step (step P7) extracts a parallel shift amount 105a from a place corresponding to both the serial number 202a of a frequently-appearing character code generated in the registration value judgement step (step P5) and the classification of the code value of the Kanji code b on the second BASE array, and stores the parallel shift amount 105a in the parallel shift amount storage unit 110, which is a step mainly executed by the second BASE array unit 105.

The parallel shift amount storage step (steps P7 and P8) stores a parallel shift amount 202b obtained in the registration value judgement step or the parallel shift amount 105a obtained in the second BASE array step, and outputs the parallel shift amount 202b or 105a as a parallel shift amount 110a, which is a step mainly executed by the parallel shift amount storage unit 110.

The key candidate point calculation step (step P9) calculates and outputs the sum 111a of the parallel shift amount 110a and the internal representation value of the following character b on the CHECK array, which is a step mainly executed by the key candidate point calculator unit 111.

The CHECK array step (step P9) extracts a numeric value in a place on the CHECK array corresponding to the sum 111a outputted in the key candidate point calculation step as a key, and inputs the numeric value to the key/prefix collation step, which is a step mainly executed by the CHECK array unit 112.

The key/prefix collation step (steps P10, P11 and P12) judges whether or not the key generated in the CHECK array step (step P9) coincides with the index 201a of a prefix character internal representation value or a prefix W, and if the key coincides with the index 201a of a prefix character internal representation value or a prefix W, it judges that the idiom is registered in the dictionary, which is a step mainly executed by the key/prefix collation unit 203.

As described above, in the preferred embodiment of the character code registration retrieval method shown in FIG. 31, by introducing, as a new data structure obtained by further developing a double array structure being an one-dimensional array of a conventional high-speed low-capacity dictionary data structure, a new data structure having a CHECK array step (step P9) of extracting a key from a place corresponding to the sum 111a outputted in a key candidate point calculation step (step P9), a first BASE array step (step P4) of outputting a numeric value 102a from a place corresponding to the index 201a of a prefix W or a Kanji code and a second BASE array step (step P7) of outputting a parallel shift amount 105a from a place corresponding to both the serial number 202a of a frequently-appearing character code outputted in a registration value judgement step (step P5) and the classification of the code value of a Kanji code b, a dictionary storing predetermined quasi-static key aggregates as retrieval targets can be generated, and thereby the memory capacity of a TRIE array structure which can be extended later by properly adding and registering keys, can be suppressed to the lowest possible level. As a result, keys can be stored in a double-array structure (that is, a TRIE array structure) being the one-dimensional array of a data structure with the minimum memory capacity, and the pattern matching can be performed in high speed by using this TRIE array structure as a retrieval key.

In addition to the character code registration retrieval methods shown in FIGS. 29 and 31, when a specific character following the prefix of a character string is a part of an idiom, as shown in FIG. 12, a step of selecting characters in which the width of the code values of following Kanji codes exceed a predetermined threshold, can also added.

Thus, empty positions that cannot be occupied by the conventional method can be occupied more, and the increase of both first BASE array generated in the first BASE array step (steps ST6 and ST11) and CHECK array generated in the CHECK array step (step ST12) can be properly suppressed. Furthermore, since the number of processes at the time of retrieval increases by only one, corresponding to the second BASE array step (step P7), the number of processes becomes almost the same as that of the conventional method.

As described above, in the present invention, if it is assumed that the sizes of original BASE and CHECK arrays are both 64 KW, the size of selected Kanji codes is 0.5 KW, and the number of the classification is three, the size of the second BASE array becomes 1.5 (=0.5 ℗ 3) KW, which is only 1/64 of the size of the original BASE and CHECK arrays. On the other hand, the increase of the size of the BASE and CHECK arrays by the conventional method is unknown. However, it is clear that empty positions that cannot be occupied by the conventional method, are occupied by the present invention, and the increase of both the BASE and CHECK arrays are suppressed properly. Furthermore, since in the present invention, the second BASE array is referred to, the process frequency of the present invention increases by only one and is almost the same as that of the conventional method.

Although in the preferred embodiments described above, Kanji idioms with two or more characters are targets of classification registration, in the same way, an arbitrary character string including Hiragana, Katakana, alphanumeric characters, etc. can be classified and registered. Furthermore, the language of a character string is not limited to Japanese and Chinese, but an arbitrary language including other Asian languages, such as Korean, etc. and Western languages, such as English, German, French, etc. can also be used. For character codes an arbitrary code can be used.

By the way, the character string retrieval apparatuses shown in FIGS. 13 and 23, and the character code registration retrieval apparatuses shown in FIGS. 28 and 30 can also be configured using an information processing apparatus (computer) shown in FIG. 32. The information processing apparatus shown in FIG. 32 comprises a central processing unit (CPU) 301, a memory 302, an input device 303, an output device 304, an external storage device 305, a medium drive device 306 and a network connection device 307, which are connected with each other by a bus 308.

The memory 302 includes, for example, a read-only memory (ROM), a random access memory (RAM), etc., and stores programs and data to be used for processing. The CPU 301 executes necessary processes by running programs using the memory 302.

The input device 303 includes, for example, a keyboard, a pointing device, a touch panel, etc., and is used to input instructions and data from a user. The output device 304 includes, for example, a display, a printer, etc., and is used to output inquiries to the user, process results, etc.

The external storage device 305 includes, for example, a magnetic disk, an optical disk, a magneto-optical disk, etc. This external storage device 305 stores the above programs and data, which can also be loaded to the memory 302 and used, if necessary.

The medium drive device 306 drives a portable storage medium 309, and accesses the recorded contents. The portable storage medium 309 includes an arbitrary computer-readable storage medium, such as a memory card, a floppy disk, a compact disk read-only memory (CD-ROM), an optical disk, a magneto-optical disk, etc. This portable storage medium 309 stores the above programs and data, which can also be loaded to the memory 302 and used, if necessary.

The network connection device 307 communicates with external apparatuses through an arbitrary network (line), such as a local area network (LAN), etc., and exchanges data accompanying communications. This network can also receive the above programs and data from an external apparatus, which can also be loaded to the memory 302 and used, if necessary.

Figure 33:
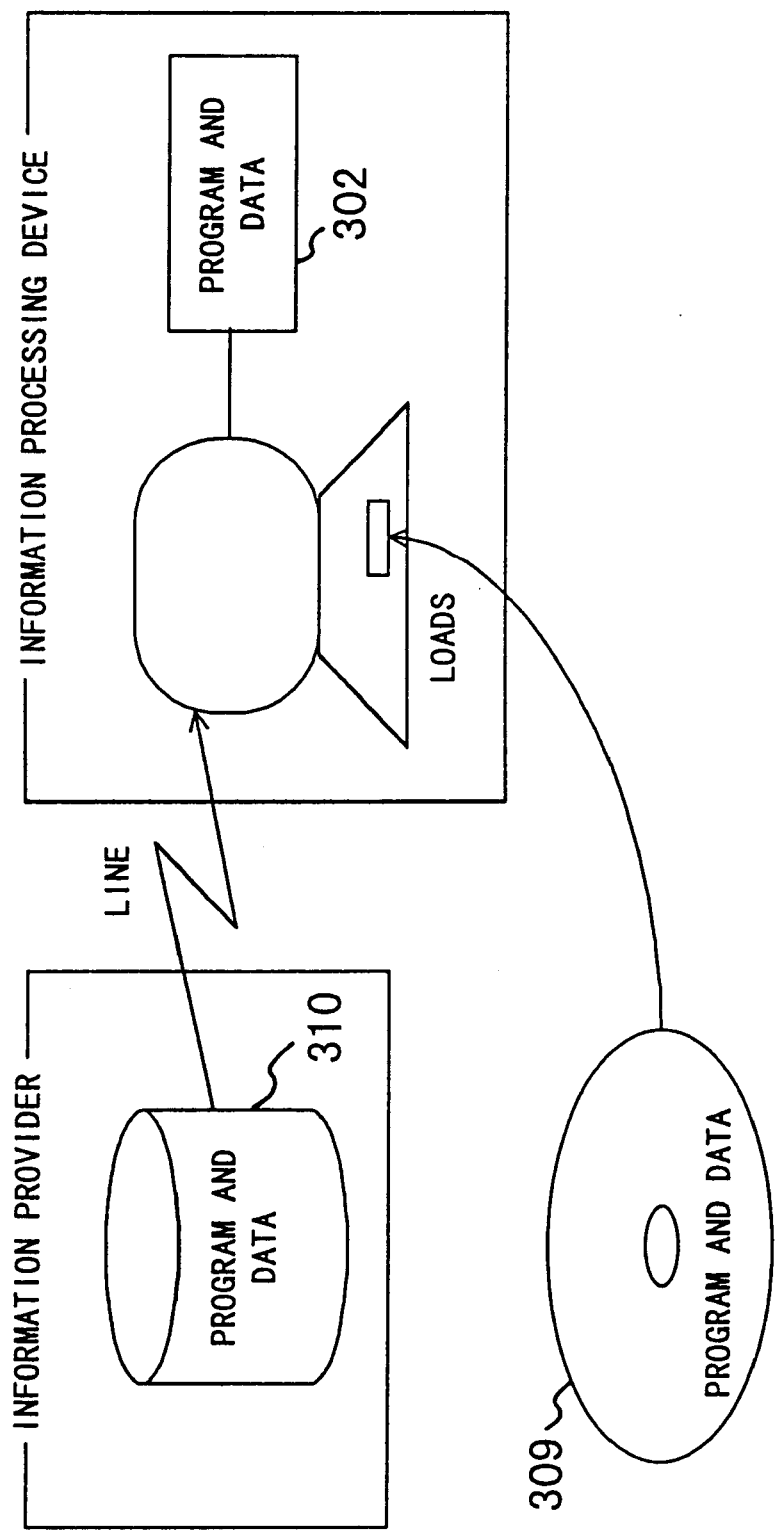
FIG. 33 shows storage media.

FIG. 33 shows computer-readable storage media capable of supplying the information processing device shown in FIG. 32 with programs and data. Programs and data stored in the portable storage medium 309 and in the external database 310 are loaded to the memory 302. Then, the CPU 301 executes the necessary processes by running the programs using the data.

If the present invention is adopted, character strings, such as Kanji idioms, etc. can be efficiently registered using the space areas of a TRIE dictionary, and the data structure of the dictionary can be compressed. The memory capacity of the dictionary can also be reduced without a loss of speed in retrieval based on a TRIE dictionary with a double-array.

What is claimed is:

1. A string retrieval apparatus for retrieving a given string out of registration strings, comprising:
    a first array unit registering number information corresponding to a prefix at a position of a first subscript, with an index of the prefix followed by a plurality of characters as the first subscript;
    a second array unit registering a displacement amount corresponding to each of a plurality of groups obtained by classifying the plurality of characters following the prefix at a position of a second subscript, with the number information corresponding to the prefix as the second subscript;
    a third array unit registering the index of the prefix at a position of a third subscript, with a sum of the displacement amount and an internal representation value of a character following the prefix as the third subscript; and
    a retrieving unit retrieving the given string using said first, second and third array units.

2. The string retrieval apparatus according to claim 1, wherein, when one or more characters following a prefix is registered without classification,
    said first array unit registers a displacement amount common to the one or more characters, in a subscript position identical to the index of the prefix followed by the one or more characters,
    said third array unit registers the index of the prefix followed by the one or more characters, in a subscript position identical to a sum of the displacement amount common to the one or more characters and an internal representation value of a character, and
    said retrieving unit includes an identifying unit judging which of number information or a displacement amount is a value registered in the first array unit.

3. The string retrieval apparatus according to claim 1, wherein, when the number of the plurality of characters following the prefix exceeds a predetermined value,
    said first array unit registers the number information corresponding to the prefix.

4. The string retrieval apparatus according to claim 1, wherein, when a range of values of the plurality of characters following the prefix exceeds a predetermined value,
    said first array unit registers the number information corresponding to the prefix.

5. The string retrieval apparatus according to claim 1, further comprising
    a prefix registering unit registering the prefix, with the number information corresponding to the subscript of said second array unit as a subscript.

6. The string retrieval apparatus according to claim 1, further comprising
    a calculating unit adding the displacement amount and the internal representation value of the character following the prefix, wherein
        said third array unit uses the sum of the displacement amount and the internal representation value of the character following the prefix as an index of a next prefix.

7. The string retrieval apparatus according to claim 1, further comprising
    a classifying unit classifying the plurality of characters following the prefix and calculating the plurality of groups.

8. The string retrieval apparatus according to claim 7, wherein, when the given string contains the prefix and a next character is inputted succeeding the prefix,
    said classifying unit calculates a group corresponding to the next character, and
    said retrieving unit extracts a displacement amount corresponding to the group of the next character from said second array unit using number information registered in said first array unit and checks whether or not the index of the prefix is registered in a position of said third array unit where a sum of the extracted displacement amount and an internal representation value of the next character is designated for a subscript.

9. The string retrieval apparatus according to claim 7, wherein
said classifying unit classifies the plurality of characters following the prefix using one or more bits contained in codes of the plurality of characters following the prefix.

10. The string retrieval apparatus according to claim 7, wherein
said classifying unit adopts a classification method out of two or more classification methods such as a deviation in number among characters contained in each of obtained groups may be a minimum.

11. The string retrieval apparatus according to claim 10, wherein
said first array unit registers number information corresponding to the classification method adopted by said classification unit as the number information corresponding to the prefix.

12. The string retrieval apparatus according to claim 1, further comprising
a calculating unit calculating a displacement amount for registering one or more characters contained in each of the plurality of groups in said first and third array unit corresponding to each of the plurality of groups.

13. The string retrieval apparatus according to claim 12, wherein
said calculating unit adds an arbitrary addition value to values of the one or more characters contained in each group, calculates an addition value such as all of one or more obtained sums may correspond to empty positions in said third array unit, and calculates the minimum addition value out of obtained addition values as the displacement amount.

14. A string retrieval apparatus for retrieving a given string out of a plurality of registration strings, comprising:
a registering unit classifying a plurality of characters, which follow a prefix and respectively belong to different character strings with the same prefix, into a plurality of groups, each of the plurality of characters following the same prefix, and each of the different character strings being a registration string that has the same prefix as a leading part, assigning different displacement amounts to the respective groups and registering characters in each of the groups with each of the displacement amounts; and
a retrieving unit retrieving the given string using said registering unit.

15. A computer-readable storage medium recording a program to enable said computer to retrieve a given string out of registration strings, said program comprising:
when the given string contains a prefix followed by a plurality of characters and a next character is inputted succeeding the prefix, calculating a group corresponding to the next character out of a plurality of groups obtained by classifying the plurality of characters following the prefix;
referring to a first array registering number information corresponding to the prefix at a position of a first subscript, with an index of said prefix as the first subscript;
referring to a second array registering a displacement amount corresponding to each of said plurality of groups at a position of a second subscript, with the number information corresponding to the prefix as the second subscript and obtaining a displacement amount corresponding to the group of the next character; and referring to a third array and checking whether or not the index of the prefix is registered in a position where a sum of an obtained displacement amount and an internal representation value of said next character is designated as a subscript.

16. A computer-readable storage medium recording a program to enable a computer to retrieve a given string out of a plurality of registration strings, said program comprising a process of referring to an array in which a plurality of characters following a prefix are classified into a plurality of groups, the plurality of characters respectively belonging to different character strings with the same prefix, each of the plurality of characters following the same prefix, and each of the different character strings being a registration string that has the same prefix as a leading part, assigning different displacement amounts to the respective groups, and registering characters in each of the groups with each of the displacement amounts.

17. A computer-readable storage medium recording data of registration strings, said data comprising:
first array data registering number information corresponding to a prefix followed by a plurality of characters, in a subscript identical to an index of the prefix;
second array data registering a displacement amount corresponding to each of a plurality of groups obtained by classifying the plurality of characters following the prefix, in a subscript position identical to the number information corresponding to the prefix; and
third array data registering the index of the prefix, in a subscript position identical to a sum of the displacement amount and an internal representation value of a character following the prefix.

18. A string retrieval method of retrieving a given string out of registration strings, comprising:
registering number information corresponding to a prefix followed by a plurality of characters in a first array, in a subscript position identical to an index of the prefix;
registering a displacement amount corresponding to each of a plurality of groups obtained by classifying the plurality of characters following the prefix in a second array, in a subscript position identical to the number information corresponding to the prefix;
registering the index of the prefix in a third array, with a sum of the displacement amount and a value of a character following the prefix as a subscript;
when the given string contains the prefix and a next character is inputted succeeding the prefix, calculating a group corresponding to the next character out of the plurality of groups;
referring to said first array, with the index of the prefix as a subscript and obtaining the number information corresponding to the prefix;
referring to said second array, with the number information corresponding to the prefix as a subscript and obtaining a displacement amount corresponding to the group of the next character; and
referring to the third array and checking whether or not the index of the prefix is registered in a position where a sum of the obtained displacement amount and an internal representation value of the next character is designated for a subscript.

19. A string retrieval method of retrieving a given string out of a plurality of registration strings, comprising:
classifying a plurality of characters, which follow a prefix and respectively belong to different character strings with the same prefix, into a plurality of groups, each of the plurality of characters following the same prefix, and each of the different character strings being a registration string that has the same prefix as a leading part;

assigning different displacement amounts to the respective groups;

registering characters in each of the groups with each of the displacement amounts in an array; and referring to said array and retrieving the given character string.

20. A character code registration retrieval apparatus for registering character code character strings to be retrieved using keys in a double-array structure being an one-dimensional array of a data structure, comprising:

a parallel shift amount calculating unit calculating a parallel shift amount needed to register a character of each of the character strings to be retrieved using keys;

a first array having as a subscript an index of a prefix being a prefix of each of the character strings to be retrieved using keys;

an identifying unit identifying a registration value in said first array;

a second array registering information on a specific character following the prefix of the character string;

a key candidate point calculating unit calculating a sum of a parallel shift amount registered in said first and second arrays, and an internal representation value corresponding to a character following the prefix of the character string; and a third array registering the index of the prefix of the character string, with the sum obtained by the key candidate point calculating unit as a subscript.

21. The character code registration retrieval apparatus according to claim 20, further comprising:

a list unit generating a list of character codes frequently used in idioms and outputting a selection character code selected from the list of character codes;

a frequently-appearing character code selecting unit outputting a frequency threshold regarding up to what order number of character codes should be selected;

a frequently-appearing character code storing unit storing the selection character code selected from the list and outputting the selection character code and an index of the selection character code;

a dictionary unit being a character code dictionary registering idioms composed of character codes, classifying a job according to whether or not a focussed character is a prefix of an idiom composed of the selection character code and outputting each of groups obtained by classifying a character code following the selection character code of the prefix;

a group storing unit storing the groups obtained by classifying the character code following the selection character code of the prefix inputted from said dictionary unit;

a first BASE array unit to store said first array with number information of the selection character code;

a code classifying unit classifying the second character code of the idiom using at least one bits of the second character code in order to classify the characters following the selection character code of the prefix;

a parallel shift amount calculating unit calculating for each of the groups a minimum parallel shift amount, so that all values obtained by adding the minimum parallel shift amount to an internal representation value of each character of the group may indicate empty positions on said third array;

a parallel shift amount storing unit storing the parallel shift amount inputted from said parallel shift amount calculating unit and outputting the parallel shift amount to said second array;

a key candidate point calculating unit registering for each of said groups an index of the prefix being a parent of the character codes of the group in a subscript position, with a sum of the parallel shift amount and the internal representation value of each character of the group as a value of the subscript position on said third array and designating a value of the sum for an index of a next prefix consisting of ((prefix)+(focussed character));

a second BASE array unit to store said second array with the parallel shift amount for each of the groups outputted by said parallel shift amount storing unit based on both the code value outputted from said code classifying unit and the number information outputted from said list unit; and a CHECK array unit as said third array for registering the index of the prefix in a place corresponding to the value of the sum.

22. The character code registration retrieval apparatus according to claim 20, further comprising:

a document inputting unit first designating a root of a TRIE structure as a prefix, setting up an end mark in the prefix as an end symbol, then instructing to input a character code as a character to be retrieved, and detecting a prefix of the inputted character code;

a first BASE array unit to store said first array with a numeric value from a place corresponding to the index of the prefix;

a registration value judging unit judging which of number information of a frequently-appearing prefix character code or a parallel shift amount is the numeric value inputted from said first BASE array unit, and when the numeric value is out of a range of indexes composing a TRIE, outputting the numeric value as the number information of the prefix character code, and when the numeric value is within the range of indexes, outputting the numeric value as the parallel shift amount;

a code classifying unit, when the numeric value inputted from said first BASE array unit is the number information of the prefix character code, classifying the inputted character code using at least one bit of the character code;

a second BASE array unit as said second array outputting a parallel shift amount from a place corresponding to both the number information of the prefix character code inputted from the registration value judging unit and a classification of the character code;

a parallel shift amount storing unit, when the numeric value inputted from said first BASE array unit is a parallel shift amount, storing the parallel shift amount;

a key candidate point calculating unit calculating a sum of the parallel shift amount and an internal representation value, of the inputted character;

a CHECK array unit as said third array outputting a key from a place corresponding the sum inputted from said key candidate point calculating unit; and a key/prefix collating unit judging whether or not the key inputted from said CHECK array unit coincides with the index of the prefix, and when the inputted key is judged to coincide with the index of the prefix, judging that an idiom is registered in a dictionary.

23. A character code registration retrieval method of registering character code character strings to be retrieved using keys in a double-array structure being an one-dimensional array of a data structure, comprising:
- a parallel shift amount calculation step of calculating a parallel shift amount needed to register a character of each of the character strings to be retrieved using keys;
- a first array step of designating an index of a prefix of each of the character strings to be retrieved using keys as a subscript;
- an identification step of identifying a registration value in the first array step;
- a second array step of registering information on a specific character following the prefix of the character string indicated in the first array step;
- a key candidate point calculation step of calculating a sum of a parallel shift amount registered in the first and second array steps and an internal representation value corresponding to a character following the prefix of the character string; and
- a third array step of registering the index of the prefix of the character string, with the sum obtained in the key candidate point calculation step as a subscript.

24. The character code registration retrieval method according to claim 23, wherein said identification step includes the steps of:
- judging which of number information of a leading specific character code locating at the head of an idiom, or a parallel shift amount of another leading character code or a prefix of a character string is a registration content registered in said first array step; and
- when the registration content registered in said first array step is judged to be the number information of the leading specific character code, calculating a parallel shift amount referring to an array place designated by the number information in said second array step.

25. The character code registration retrieval method according to claim 24, further comprising the step of referring said second array step based on both the number information of the leading specific character code of the character string and a classification of a character code following the leading specific character code.

26. The character code registration retrieval method according to claim 25, further comprising the step of classifying the character code following the leading specific character code by utilizing a code value of the following character code.

27. The character code registration retrieval method according to claim 23, wherein said second array step includes the step of selecting a character frequently used to make idioms as the specific character following the prefix of the character string.

28. The character code registration retrieval method according to claim 23, wherein said second array step includes the step of, when characters following the prefix of the character string is a part of idioms, selecting characters in which a width of code values exceeds a predetermined threshold, as specific characters following the prefix of the character string.

29. The character code registration retrieval method according to claim 23, comprising:
- a list step of generating a list of character codes frequently used in idioms and outputting a selection character code selected from the list of character codes;
- a frequently-appearing character code selection step of outputting a frequency threshold regarding up to what order number of character codes should be selected;
- a frequently-appearing character code storage step of storing the selection character code selected in said list step and outputting the selection character code and an index of the selection character code;
- a dictionary step of using a character code dictionary registering idioms composed of character codes, classifying a job~according to whether or not a focussed character is a prefix of an idiom composed of the selection character code and outputting each of groups obtained by classifying a character code following the selection character code of the prefix;
- a group storage step of storing the groups obtained by classifying the character code following the selection character code of the prefix generated in said dictionary step;
- a first BASE array step as said first array step of calculating number information of the selection character code and storing the number information in a position of an index of the selection character code on a first BASE array;
- a code classification step of classifying the second character code of the idiom using at least one bit of the second character code in order to classify the characters following the selection character code of the prefix;
- a parallel shift amount calculation step of calculating for each of the groups a minimum parallel shift amount, so that all values obtained by adding an arbitrary parallel shift amount to an internal representation value of each character of the group may indicate empty positions on a CHECK array;
- a parallel shift amount storage step of storing the parallel shift amount generated in said parallel shift amount calculation step and outputting the parallel shift amount to a second BASE array;
- a key candidate point calculation step of calculating for each of said groups a sum of the
- parallel shift amount and the internal representation value of each character of the group as a subscript of the CHECK array and designating a value of the sum for an index of a next prefix consisting of ((prefix)+(focussed character));
- a second BASE array step as said second array step of storing the parallel shift amount for each of the groups outputted in said parallel shift amount storage step based on both the code value generated in said code classification step and the number information generated in said list step; and
- a CHECK array step as said third array step of registering an index of a prefix being a parent of each character code of the group in a place corresponding to the value of said sum in the CHECK array.

30. The character code registration retrieval method according to claim 29, comprising:
- when characters following the prefix of the character string is a part of idioms, selecting characters in which a width of code values exceeds a predetermined threshold, as specific characters following the prefix of the character string.

31. The character code registration retrieval method according to claim 23, comprising:
- a document input step of first designating a root of a TRIE structure for a prefix, setting up an end mark in the prefix as an end symbol, then instructing to input a character code of a character to be retrieved, and detecting a prefix of the inputted character code;

a first BASE array step as said first array step of extracting a numeric value from a place corresponding to the index of the prefix of a first BASE array;

a registration value judgement step of judging which of number information of a frequently-appearing prefix character code or a parallel shift amount is a numeric value generated in said first BASE array step, and when the numeric value is out of a range of indexes composing a TRIE, outputting the numeric value as the number information of the prefix character code, and when the numeric value is within the range of indexes, outputting the numeric value as a parallel shift amount;

a code classification step of, when the numeric value generated in from said first BASE array step is the number information of the prefix character code, classifying the inputted character code using at least one bit of the character code;

a second BASE array step as said second array step of extracting a parallel shift amount from a place of a second BASE array corresponding to both the number information of the prefix character code generated in the registration value judgement step and a classification of the character code;

a parallel shift amount storage step of, when the numeric value generated in said first BASE array step is a parallel shift amount, storing the parallel shift amount;

a key candidate point calculation step of calculating a sum of the parallel shift amount and an internal representation value of the inputted character;

a CHECK array step as said third array step of extracting a key from a place of a CHECK array corresponding to the sum calculated in said key candidate point calculation step; and a key/prefix collation step of judging whether or not the key generated in said CHECK array step coincides with the index of the prefix, and when the inputted key is judged to coincide with the index of the prefix, judging that an idiom is registered in a dictionary.

32. The character code registration retrieval method according to claim 31, comprising the step of, when characters following the prefix of the character string is a part of idioms, selecting characters such as a width of code values exceeds a predetermined threshold, as specific characters following the prefix of the character string.

33. A string retrieval apparatus for retrieving a given string from a plurality of registered strings, comprising:

a storage unit to store a first array of number information for prefixes followed by strings of characters, a second array of displacement amounts stored at positions corresponding to the number information for a corresponding prefix, the displacement amounts corresponding to groups of characters obtained by classifying the strings of characters following the corresponding prefix;

a third array storing the index of the corresponding prefix in the first array at a position corresponding to a sum of the displacement amount for one of the groups of characters and an internal representation value of a character following the prefix in one of the strings of characters classified in the one of the groups of characters; and a processor, coupled to said storage unit, to retrieve the given string using said first, second and third arrays.

* * * * *

UNITED STATES PATENT AND TRADEMARK OFFICE
CERTIFICATE OF CORRECTION

PATENT NO.   : 6,507,678 B2
DATED        : January 14, 2003
INVENTOR(S)  : Hironori Yahagi It is certified that error appears in the above-identified patent and that said Letters Patent is hereby corrected as shown below:

<u>Column 38,</u>
Line 18, after the word "characters" insert -- at positions corresponding to indexes of the prefixes- --
Line 24, delete ";", insert -- , --
Line 25, delete "the", insert -- an --

Signed and Sealed this

Fifteenth Day of July, 2003

JAMES E. ROGAN
*Director of the United States Patent and Trademark Office*